US008531686B2

(12) United States Patent  (10) Patent No.: US 8,531,686 B2
Umezawa  (45) Date of Patent: Sep. 10, 2013

(54) IMAGE PROCESSING APPARATUS DISPLAYING AN OVERVIEW SCREEN OF SETTING DETAILS OF PLURAL APPLICATIONS

(75) Inventor: Asaki Umezawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 815 days.

(21) Appl. No.: 12/366,663

(22) Filed: Feb. 6, 2009

(65) Prior Publication Data

US 2009/0237699 A1    Sep. 24, 2009

(30) Foreign Application Priority Data

Mar. 18, 2008 (JP) ................................. 2008-069418
Jun. 10, 2008 (JP) ................................. 2008-152116

(51) Int. Cl.
*G06F 3/12* (2006.01)

(52) U.S. Cl.
USPC ....................................................... 358/1.13

(58) Field of Classification Search
None
See application file for complete search history.

(56) References Cited

U.S. PATENT DOCUMENTS

| 7,180,628 B1 * | 2/2007 | Motohashi et al. ............ 358/1.9 |
| 2002/0054326 A1 * | 5/2002 | Morita ........................ 358/1.15 |
| 2002/0067508 A1 * | 6/2002 | Nishikawa et al. .......... 358/1.18 |
| 2005/0248796 A1 * | 11/2005 | Sugahara ..................... 358/1.13 |
| 2006/0274345 A1 * | 12/2006 | Ferlitsch ..................... 358/1.13 |
| 2007/0008573 A1 * | 1/2007 | Yamada ...................... 358/1.15 |
| 2007/0019229 A1 * | 1/2007 | Matsuhara ................... 358/1.15 |

* cited by examiner

*Primary Examiner* — Jeremiah Bryar
(74) *Attorney, Agent, or Firm* — Oblon, Spivak, McClelland, Maier & Neustadt, L.L.P.

(57) ABSTRACT

An MFP includes a receiving unit that receives designation for a plurality of applications having mutually different combinations of an input format for image data and an output format for the image data; and a processing unit that collectively starts execution of the plurality of designated applications.

17 Claims, 49 Drawing Sheets

FIG.2

| JOB ID | JOB NAME | SETTING ID | | | | |
|---|---|---|---|---|---|---|
| | | COPY | TRANSMIT | STORE | SDK | ... |
| 0001 | TRANSMIT TO JOHN | 1001 | 2001 | 3001 | 4001 | ... |
| 0002 | TRANSMIT TO PRESIDENT | 1002 | 2002 | 3002 | 4002 | ... |
| : | : | : | : | : | : | : |

FIG.3

| SETTING ID | PAPER | QUANTITY | SCALE | DUPLEX | PUNCH | ... |
|---|---|---|---|---|---|---|
| 1001 | AUTO PAPER SELECT | 133 | A4→A3 | OFF | — | ... |
| 1002 | A4 | 22 | — | OFF | — | ... |
| : | : | : | : | : | : | : |

REGISTER PRESET TASKS                          ?      CANCEL    OK

INPUT DETAILS TO BE REGISTERED AND PRESS OK KEY

NAME
PRESET TASKS

COMMENT
UP TO 100 ONE-BYTE CHARACTERS CAN BE
REGISTERED THIS PRESET TASKS IS

PUBLIC SETTING

SPECIFY STORAGE
DESTINATION
HARD DISK          ON

SELECT ICON

ACCESS RIGHT          APPLICATION KEY
SETTING               ALLOCATION

MESSAGE ENTER
01234567890123456789

KYCM   DOCUMENT BOX   2007/JAN/01    SYSTEM    JOB LIST    USER A
       NOW PRINTING:  15:15:15       STATUS
       %%% MINUTES

US 8,531,686 B2

IMAGE PROCESSING APPARATUS DISPLAYING AN OVERVIEW SCREEN OF SETTING DETAILS OF PLURAL APPLICATIONS

CROSS-REFERENCE TO RELATED APPLICATIONS

The present application claims priority to and incorporates by reference the entire contents of Japanese Patent Application No. 2008-069418 filed in Japan on Mar. 18, 2008 and Japanese Patent Application No. 2008-152116 filed in Japan on Jun. 10, 2008.

BACKGROUND OF THE INVENTION

1. Field of the Invention

The present invention relates to an image processing apparatus, an image processing method, and a computer program product for executing a plurality of functions (applications) associated with image processing.

2. Description of the Related Art

Recently, an image forming apparatus called a "multifunction peripheral (MFP)" having functions of various devices such as a printer, a copier, a facsimile machine, and a scanner built in one enclosure (hereinafter, "multifunction device") is known. The multifunction device has a display unit, a printing unit, an imaging unit, etc. housed in one enclosure. The multifunction device further includes plural kinds of software corresponding to a printer, a copier, and a facsimile machine, and operates as the printer, the copier, or the facsimile machine by switching the corresponding software.

For example, Japanese Patent Application Laid-open No. 2001-238020 proposes an image processing apparatus which selects a desired format from a plurality of input formats and a plurality of output formats to execute image processing. For example, as an input format, the method of the '020 patent makes a selection from draft reading, main body storage data, and external storage data. Also, as an output format, the method of the '020 patent makes a selection from printing, telephone-line transmission, network transmission, data storage in the main body, and data storage in an external section.

However, the method of Japanese Patent Application Laid-open No. 2001-238020 is adapted to independently select input and output formats. Further, in the case where a plurality of input formats and a plurality of output formats are selected, image processing is carried out in all the selected output formats for each of the input formats. In other words, the combination of the input and output formats cannot be particularly specified. For example, it is impossible to output the data inputted in a first input format among the plurality of selected input formats, in a first output format among the plurality of selected output formats. Similarly, it is impossible to output the data inputted in a second input format among the plurality of selected input formats, in a second output format among the plurality of selected output formats.

SUMMARY OF THE INVENTION

It is an object of the present invention to at least partially solve the problems in the conventional technology.

According to an aspect of the present invention, there is provided an image processing apparatus including a receiving unit that receives designation for a plurality of applications having mutually different combinations of an input format for image data and an output format for the image data; and a processing unit that collectively starts execution of a plurality of designated applications.

According to another aspect of the present invention, there is provided an image processing method including receiving designation for a plurality of applications having mutually different combinations of an input format for image data and an output format for the image data, with the aid of receiving means; and processing a plurality of the designated applications in a collective manner, with the aid of a processing unit.

According to still another aspect of the present invention, there is provided a computer program product including computer program codes stored on a computer-readable recording medium which when executed on a computer cause the computer to execute the image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of a data configuration of data stored in a job information table;

FIG. 3 is an example of a data configuration of setting information stored in a setting information table;

FIG. 10 is a schematic diagram for explaining an example of a detailed setting screen;

FIG. 11 is a schematic diagram for explaining another example of the detailed setting screen;

FIG. 35 is still another example of the detailed setting screen according to the modification;

FIG. 42 is an example of a routine-work registration screen according to the modification;

DETAILED DESCRIPTION OF THE PREFERRED EMBODIMENTS

Figure 1:
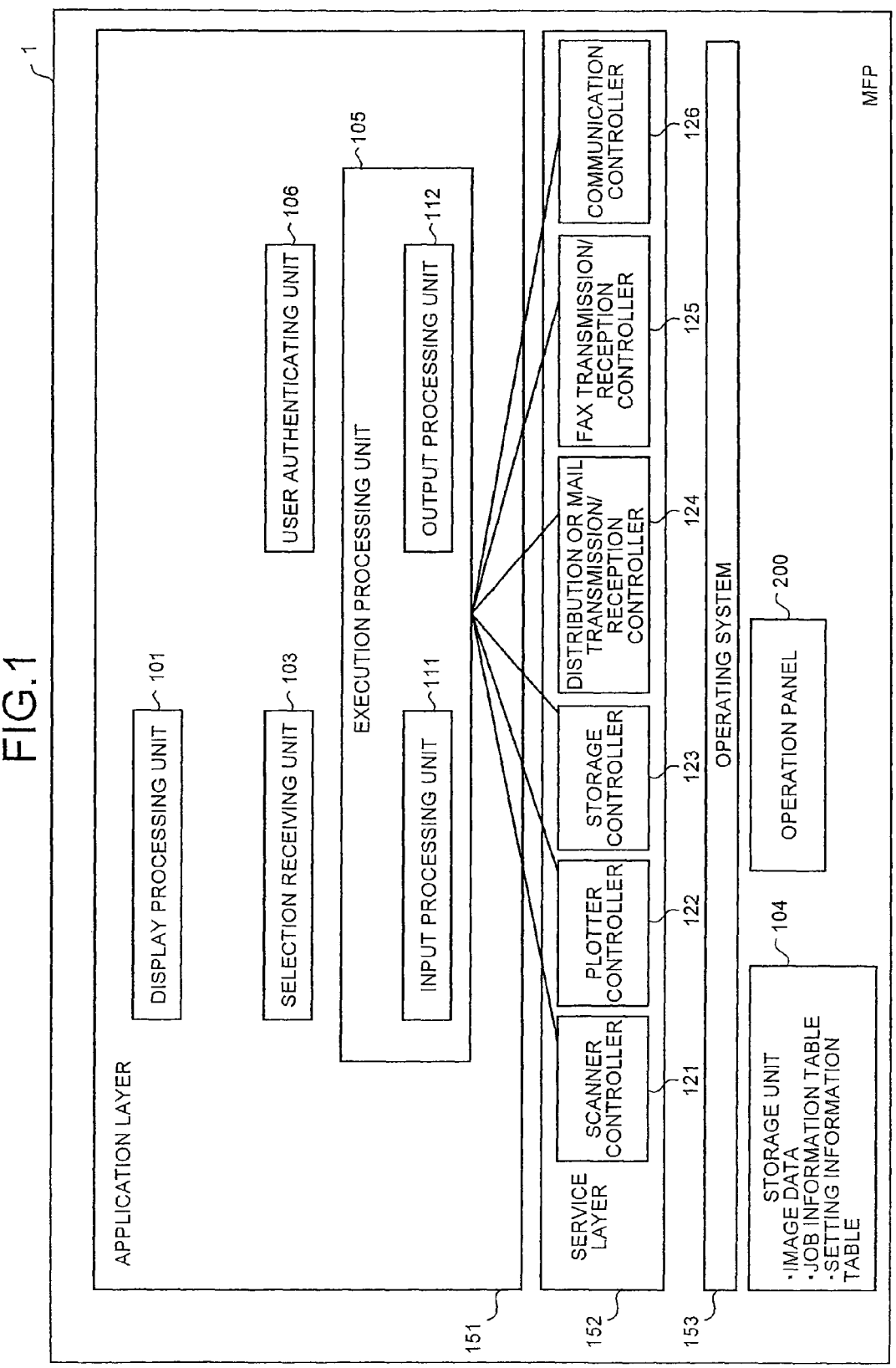
FIG. 1 is a functional block diagram of an MFP that can execute functions of a display processing apparatus according to a first embodiment of the present invention.

Exemplary embodiments of the present invention will be explained below in detail with reference to accompanying drawings.

A display processing apparatus according to a first embodiment of the present invention displays, when the job is selected, overviews of setting details of corresponding functions (applications) included in a job as a process unit, such as a copy function (copy application), a transmitting function (transmitting application) including a mail transmitting function (mail transmitting application), a storage function (storage application), and a software development kit (SDK) function (SDK application), each overview being associated with each function (application).

An application is software that enables the performance, for example, of a series of processes of inputting data in at least one of plural predetermined input formats and outputting the data in at least one of plural predetermined output formats. The input formats include reading by a scanner, reading from a storage unit in an image processing apparatus, etc. The output formats include printing on paper by a plotter, facsimile (FAX) transmission or e-mail transmission via a network, storage into a storage unit, etc. Different applications can be realized by changing combinations of the input and output forms.

For example, the copy application indicates a process of reading an original image by means of a scanner and printing the image on paper by means of a plotter. The transmitting application indicates a process of reading an original image by a scanner, for example, and transmitting the image via e-mail, FAX, etc. A process of transmitting the image via an e-mail corresponds to the mail transmitting application, and a process of transmitting the image via FAX corresponds to a FAX transmitting application. The storage application indicates a process of reading an original image by a scanner, for example, and storing the image in a storage unit. The SDK application is an application that enables a user to designate an arbitrary input form and an arbitrary output form using the SDK. The user can add image data read from the storage unit to another image data read by a scanner, for example, to transmit a resultant image via FAX, and create an SDK application based on an application stored in the storage unit. In this way, one application can be adapted to allow to input data in plural input forms and output data in plural output forms.

Japanese Patent Application Laid-open No. 2001-238020 mentioned above proposes an image processing apparatus that selects a desired one of plural input forms and a desired one of plural output forms, to perform image processing. For example, in the method as described in the above patent document, any one of reading of an original, selecting of data stored in the main unit, and selecting of data stored in an external device can be selected as the input form. In the method as described in the above patent document, any one of printing, transmitting via telephone lines, transmitting via a network, storing data in the main unit, and storing data in an external device can be selected as the output form.

The method as described in the above patent document is adapted to independently selecting the input form and the output form. When plural input forms and plural output forms are selected, image processing in all of the selected plural output forms is performed with respect to each of the selected input forms. Therefore, combinations of the input and output forms cannot be designated individually. For example, individual designation in such a manner that data inputted in a first input form among the selected plural input forms is outputted in a first output form among the selected plural output forms, while data inputted in a second input form among the selected plural input forms is outputted in a second output form among the selected plural output forms cannot be performed.

Hence, the first embodiment enables the designation of a process that is performed as a job including at least one application that is defined by a combination of input and output forms. Accordingly, it becomes possible to arbitrarily designate a combination of input and output forms for a process to be executed.

In the first embodiment, an example is explained where a display processing apparatus according to the present invention is applied to an MFP, which is one type of image forming apparatus. However, the present invention is not limited to this example, and can be applied to various apparatuses that perform a display process.

FIG. 1 is a functional block diagram of an MFP 1 that can execute the functions of the display processing apparatus according to the first embodiment. The MFP 1 includes an operating system 153, a service layer 152, an application layer 151, a storage unit 104, and an operation panel 200.

The functions of the MFP 1 have a hierarchical relation. The service layer 152 is constructed on the operating system 153, and the application layer 151 including a characterizing portion of the first embodiment (which is explained below) is constructed on the service layer 152.

The operating system 153 manages resources including hardware resources of the MFP 1, and provides functions using the resources to the service layer 152 or the application layer 151.

The service layer 152 corresponds to a driver that controls the hardware resources included in the MFP 1. In response to a request for an output process from an execution processing unit 105 (which is explained below) in the application layer 151, the service layer 152 controls the hardware resources included in the MFP 1 through a scanner controller 121, a plotter controller 122, a storage controller 123, a distribution or mail transmission/reception controller 124, a facsimile (FAX) transmission/reception controller 125, a communication controller 126, etc., thereby executing various functions.

The storage unit 104 stores therein image data read from a paper original or received via an e-mail or FAX. The storage unit 104 includes a job information table that stores therein information related to functions (applications) including a copy function (copy application), a transmitting function (transmitting application), a storage function (storage application), and a SDK function (SDK application), each function (application) being set in a job. The storage unit 104 further includes a setting information table that stores setting information indicating detailed setting items of each function (application).

The storage unit 104 stores therein data, such as image data, and can be any storage medium. A hard disk drive (HDD), an optical disk, and a memory card are examples of such a storage medium.

FIG. 2 is an example of a data configuration of data stored in the job information table. As shown in FIG. 2, the job information table stores data of a job identification (ID) for identifying a job, a job name, and setting IDs for identifying data in the setting information table, which are associated with each other. As the setting ID, an ID for identifying setting information of each function (application) that can be set in a job, including the copy function (copy application), the transmitting function (transmitting application), the storage function (storage application), and the SDK function (SDK application) is set. When there is any function (application) not included in a job, a setting ID field corresponding to the function (application) is blank. The job information table is referred to when execution of a job is requested, for example, to identify a function (application) to be executed by the requested job, and setting information corresponding to the function (application).

FIG. 3 is an example of a data configuration of the setting information stored in the setting information table. FIG. 3 is an example of a data configuration of the setting information corresponding to a copy function (copy application). As shown in FIG. 3, as the setting information corresponding to the copy function (copy application), detailed setting items to be set for the copy function (copy application), such as paper, quantity, scaling, duplexing, and punching are stored associated with the setting ID. Other than the setting items shown, any setting items to be set for the copy function (copy application) can be stored.

Setting information including setting details corresponding to each function (application) other than the copy function (copy application) is stored in a separate setting information table. The setting information table is referred to when detailed settings of a function (application) to be executed by the requested job are to be identified, when change of the settings of each function (application) is requested, etc.

The data configurations shown in FIGS. 2 and 3 are exemplary. That is, any data configurations that enable identification of a function (application) included in a job, and setting information corresponding to each function (application) can be applied.

Returning to FIG. 1, the operation panel 200 is a user interface that displays an operation screen or receives an input on the operation screen.

Figure 4:
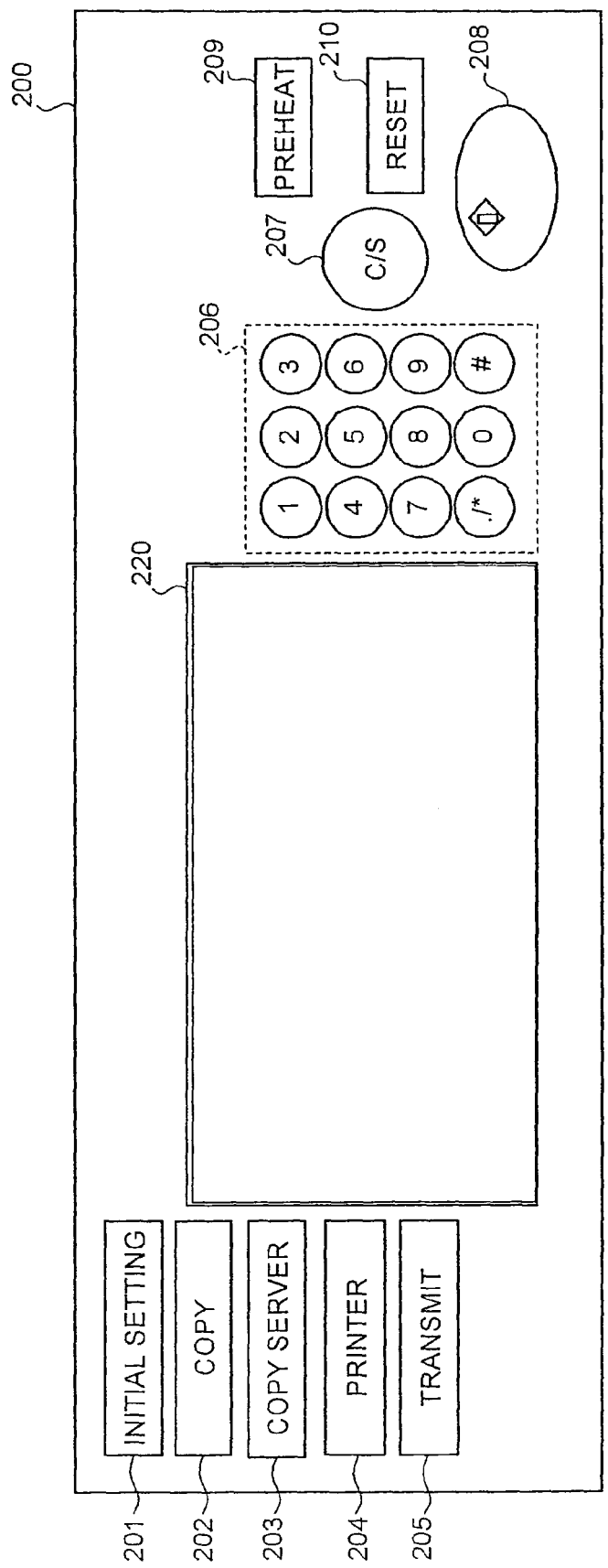
FIG. 4 is an example of an operation panel.

FIG. 4 is an example of the operation panel 200 of the MFP 1. As shown in FIG. 4, the operation panel 200 includes an initial setting key 201, a copy key 202, a copy server key 203, a printer key 204, a transmission key 205, a numeric keypad 206, a clear/stop key 207, a start key 208, a preheating key 209, a reset key 210, and a liquid-crystal touch panel 220. A screen of the present invention is displayed on the liquid-crystal touch panel 220, which is described later.

Although the MFP 1 includes various hardware resources such as a scanner and a plotter, in addition to the storage unit 104 and the operation panel 200, explanations thereof will be omitted.

Returning to FIG. 1, the application layer 151 includes a display processing unit 101, a selection receiving unit 103, the execution processing unit 105, and a user authenticating unit 106.

The user authenticating unit 106 authenticates a user at the time of use of the MFP 1. To authenticate a user, any authenticating method can be adopted regardless of whether it is well-known to persons skilled in the art. When the user authenticating unit 106 successfully authenticates a user, the user is allowed to use predetermined functions (applications) of the MFP 1. The allowed functions (applications) include transmission and reception of e-mails, for example. The user authentication by the user authenticating unit 106 is performed first, and when functions (applications) as described later are to be used, it is assumed in principle that the user authentication has already been completed.

The display processing unit 101 displays an operation screen for executing the various functions (applications) or setting the setting items, on the liquid-crystal touch panel 220. In the first embodiment, the display processing unit 101 displays functions (applications) included in a job, and overview information indicating overview of setting information of the functions (applications), associated with each other, when the job is selected.

The selection receiving unit 103 receives selection of an area indicating a setting item from the screen displayed by the display processing unit 101. More specifically, when a user presses a setting item displayed by the display processing unit 101 on the liquid-crystal touch panel 220 or when the user touches a displayed setting item, the selection receiving unit 103 determines that the corresponding setting item is selected, and receives the selected setting item. The method of designating a setting item is not limited to these methods. Any method can be applied such as a method in which a user selects a desired one of plural displayed setting items displayed in a pull-down menu etc., or a method in which a user inputs code information indicating a setting item as text data, thereby designating the setting item. Pressing of a setting item on the liquid-crystal touch panel 220 hereinafter implies touching to a setting item, etc. The selection receiving unit 103 also receives an input through the various buttons such as the initial setting key 201, which is explained later.

The execution processing unit 105 includes an input processing unit 111 and an output processing unit 112. The execution processing unit 105 performs an input or output process using functions included in the MFP 1, corresponding to the job that is requested to be executed. Based on the process performed by the execution processing unit 105, the corresponding controller included in the service layer 152 controls a hardware resource so that the process using the hardware is executed.

The input processing unit 111 performs an input process for image data using an input function corresponding to the setting item the selection of which is received by the selection receiving unit 103. For example, when the selection receiving unit 103 receives a start request for a job including a copy function (copy application), the input processing unit 111 controls a scanner (not shown) by means of the scanner controller 121, thereby reading a paper original.

The output processing unit 112 performs an output process for image data using an output function corresponding to the setting item the selection of which is received by the selection receiving unit 103. For example, when the selection receiving unit 103 receives a start request for a job including a copy function (copy application), the output processing unit 112 controls a plotter (not shown) by means of the plotter controller 122, thereby controlling printing of a paper original.

Figure 5:
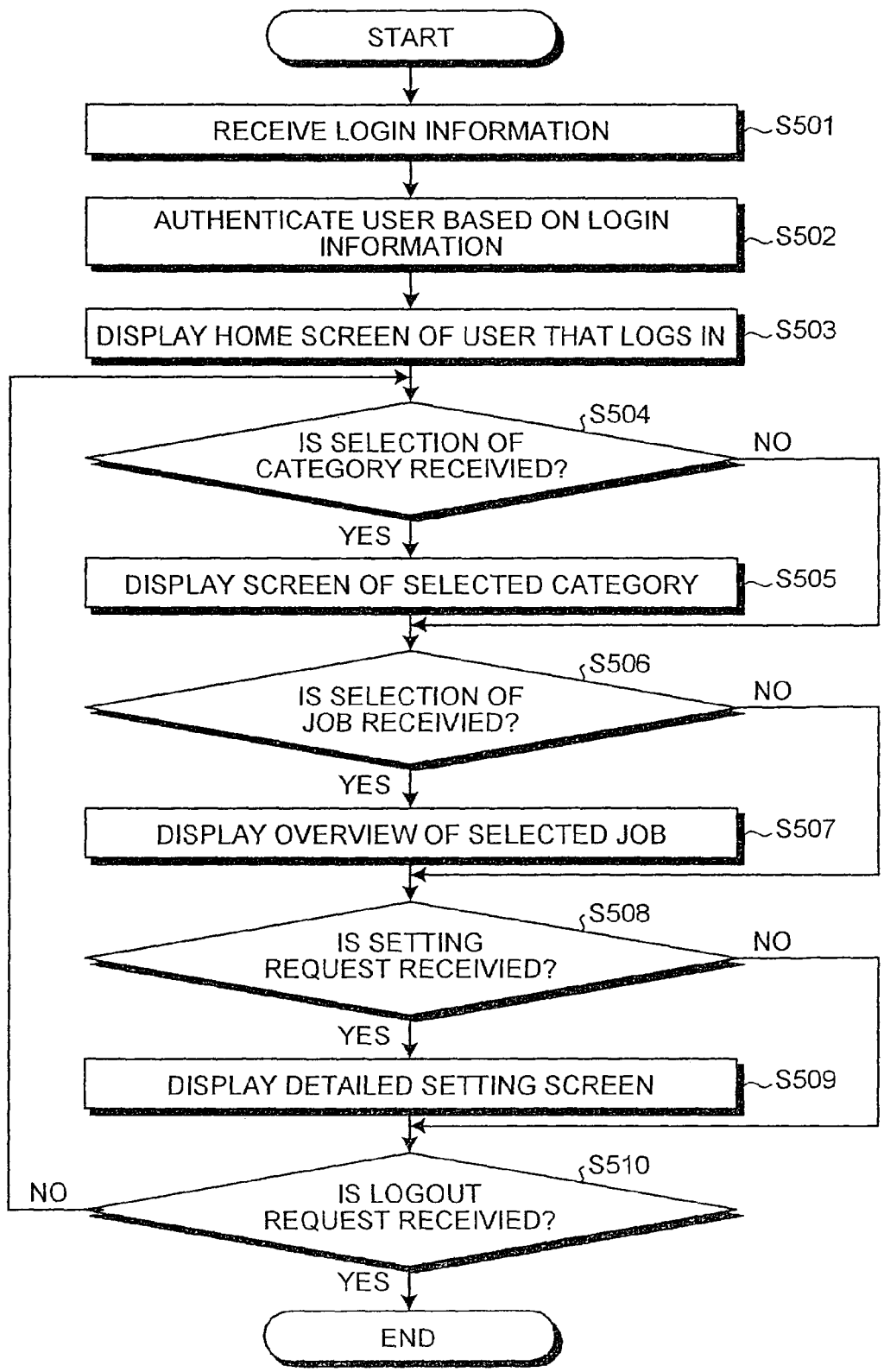
FIG. 5 is a flowchart of a general display process according to the first embodiment.

A display process performed by the MFP 1 thus configured according to the first embodiment is explained next. FIG. 5 is a flowchart of a general display process according to the first embodiment.

First, the selection receiving unit 103 receives login information inputted by a user (Step S501). More specifically, the selection receiving unit 103 receives a user name and a password inputted on a login screen (not shown), as the login information. The login screen is displayed when the user selects a login button displayed on an initial screen (not shown) that is displayed upon start-up of the display processing apparatus, for example.

The user authenticating unit 106 then authenticates the user based on the login information received by the selection receiving unit 103 (step S502).

The display processing unit 101 then displays a favorite screen (home screen) of the user that logs in, on the liquid-crystal touch panel 220 (step S503). The favorite screen is a screen displayed first upon login, on which frequently used functions (applications) that are defined according to users are registered. Details of the favorite screen are explained later.

The selection receiving unit 103 then determines whether selection of another category is received (step S504). Another category indicates a display item for displaying a routine work screen (job screen) that displays jobs specifying routine processes, an application screen that displays functions (such as the copy application, and the FAX transmitting application) of the MFP 1, a history screen that displays a history of processes, etc.

When selection of another category is received (YES at step S504), the display processing unit 101 displays a screen corresponding to the selected category on the liquid-crystal touch panel 220 (step S505).

When selection of another category is not received (NO at step S504), the selection receiving unit 103 determines whether selection of a job is received (step S506). A job can be selected when the routine work screen or the favorite screen including a job is displayed.

When selection of a job is received (YES at step S506), the display processing unit 101 displays an overview of the selected job on the liquid-crystal touch panel 220 in a different display field from a display field that displays jobs (step S507). Details of the routine work screen that displays an overview of a job are explained later.

When selection of a job is not received (NO at step S506), the selection receiving unit 103 further determines whether a setting request is received (step S508). The setting request indicates a request for changing setting items to execute each function (application) of the MFP 1.

When a setting request is received (YES at step S508), the display processing unit 101 displays a detailed setting screen for changing the setting items, on the liquid-crystal touch panel 220 (step S509). Details of the detailed setting screen are explained later.

When no setting request is received (No at step S508), the selection receiving unit 103 determines whether a logout request is received (step S510). When no logout request is received (NO at step S510), the process control is returned to receiving selection of another category to repeat the process (step S504). When a logout request is received (YES at step S510), the display process is terminated.

Thus, in the first embodiment, upon login by a user, various screens are displayed according to functions (applications) or setting requests selected by the user. Details of each screen and screen transition are explained below.

In the screen transition between screens, a screen transition process of displaying another screen in response to selection of a function (application), etc. on an arbitrary screen is performed according to the flowchart as shown in FIG. 5.

Figure 6:
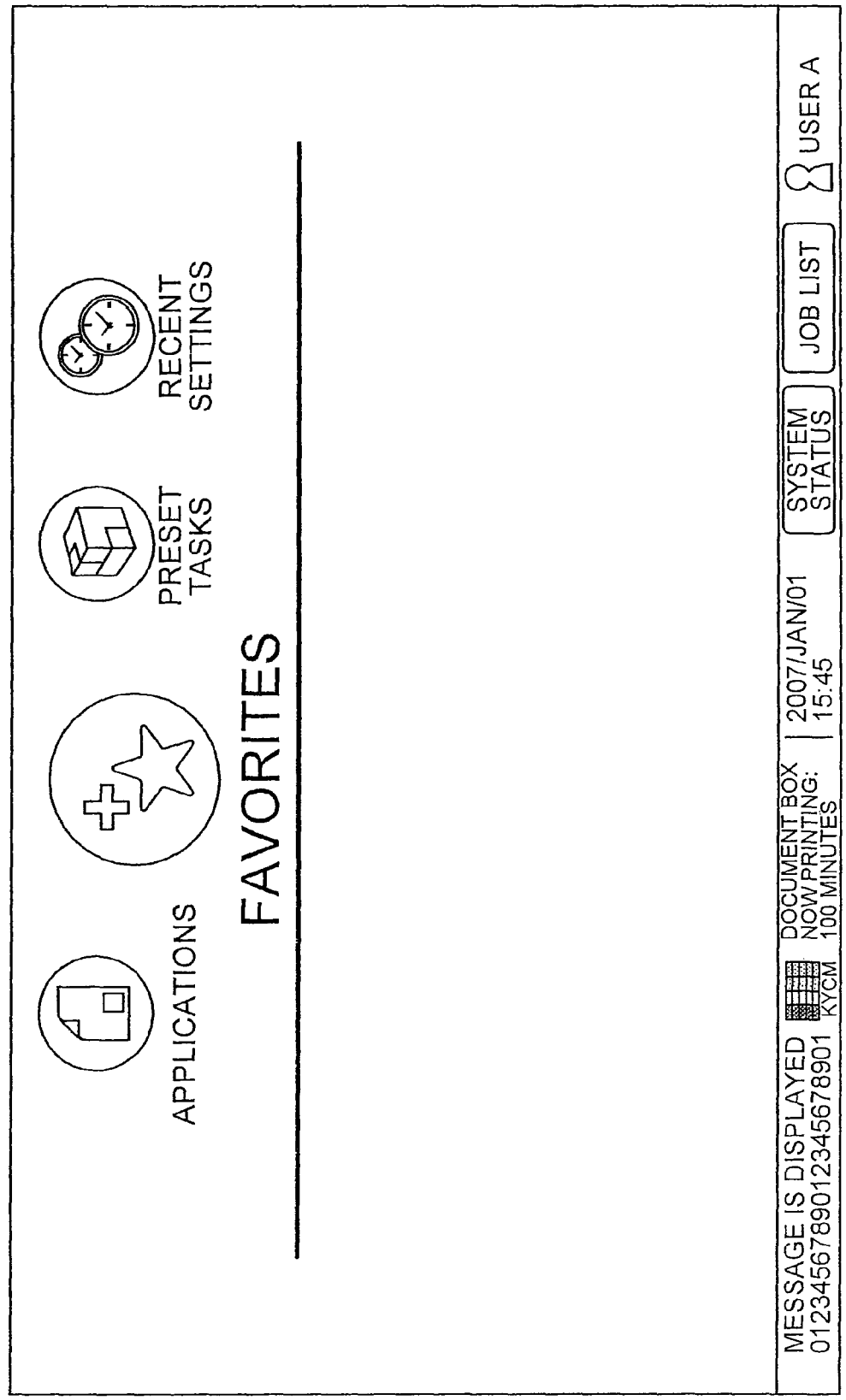
FIG. 6 is a schematic diagram for explaining an example of a favorite screen.

FIG. 6 is a schematic diagram for explaining an example of the favorite screen displayed at step S503. As shown in FIG. 6, the favorite screen displays selectable categories on an upper portion of the screen, and a category currently selected (i.e. the favorite category) is displayed in an enlarged manner (hereinafter, "enlargedly displayed"). Although not shown in FIG. 6, setting items corresponding to functions (applications) previously selected by a user, such as functions (applications) frequently used can be displayed on the favorite screen. By selecting one of the setting items, the user can easily execute a desired function (application). As shown in FIG. 6, the selected item is expressed in a larger form compared to unselected items, and therefore the selection state can be emphasized more.

The user can select one of an application, a job, and a history as another category on the favorite screen, and display the corresponding screen, which is one of the application screen, the routine work screen, and the history screen. The categories are not limited to those as described above, but all other possible categories can be set and selectable.

Figure 7:
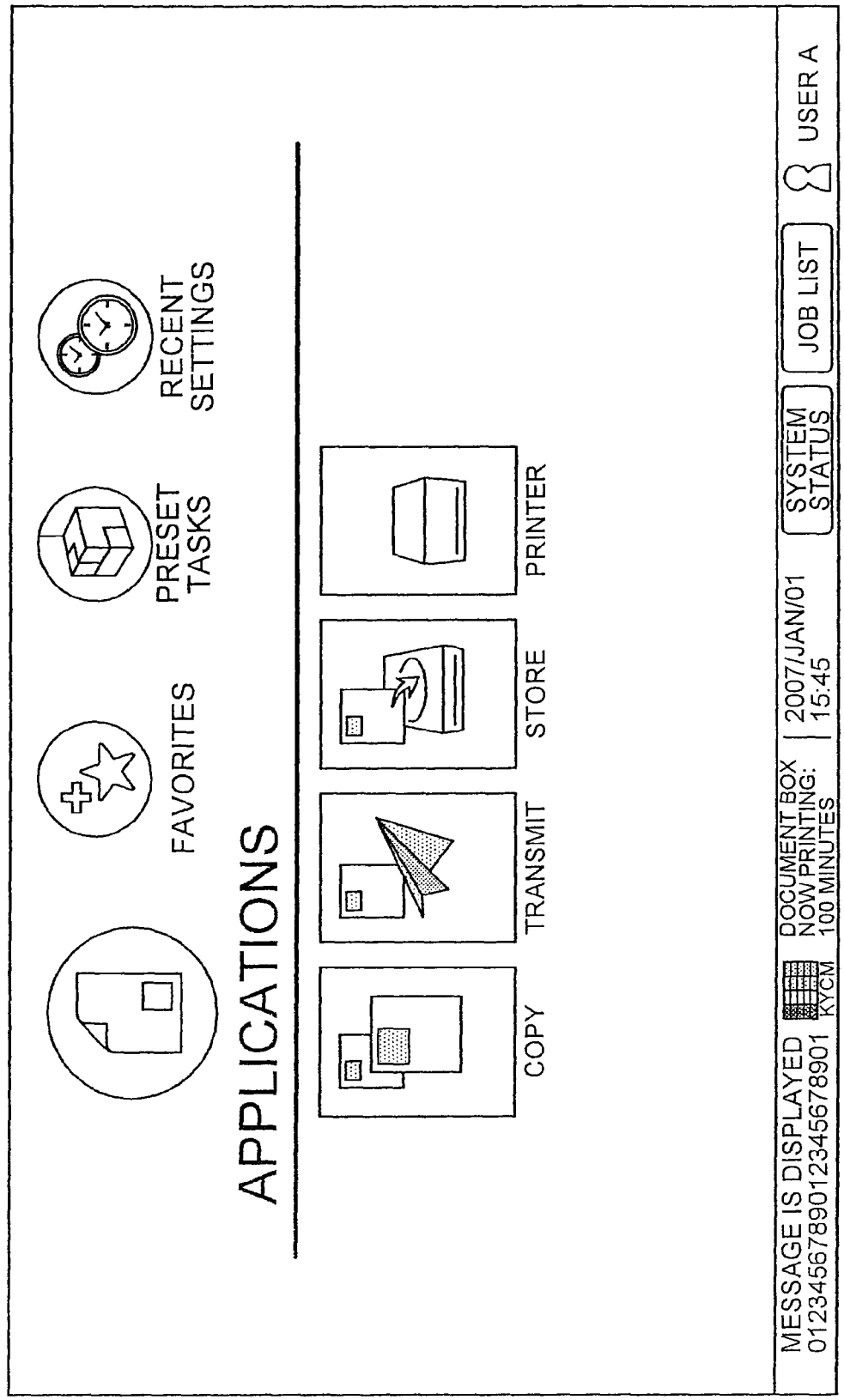
FIG. 7 is a schematic diagram for explaining an example of an application screen.

Details of the application screen are explained next. FIG. 7 is a schematic diagram for explaining an example of the application screen.

As shown in FIG. 7, on the application screen, only the selected category (Application) is displayed in a larger form. The application screen has the same configuration as that of the favorite screen except that the functions (applications) such as the copy function (copy application), the transmitting function (transmitting application), the storage function (storage application), and the printer function (printer application) included in the MFP 1 are selectable.

Figure 8:
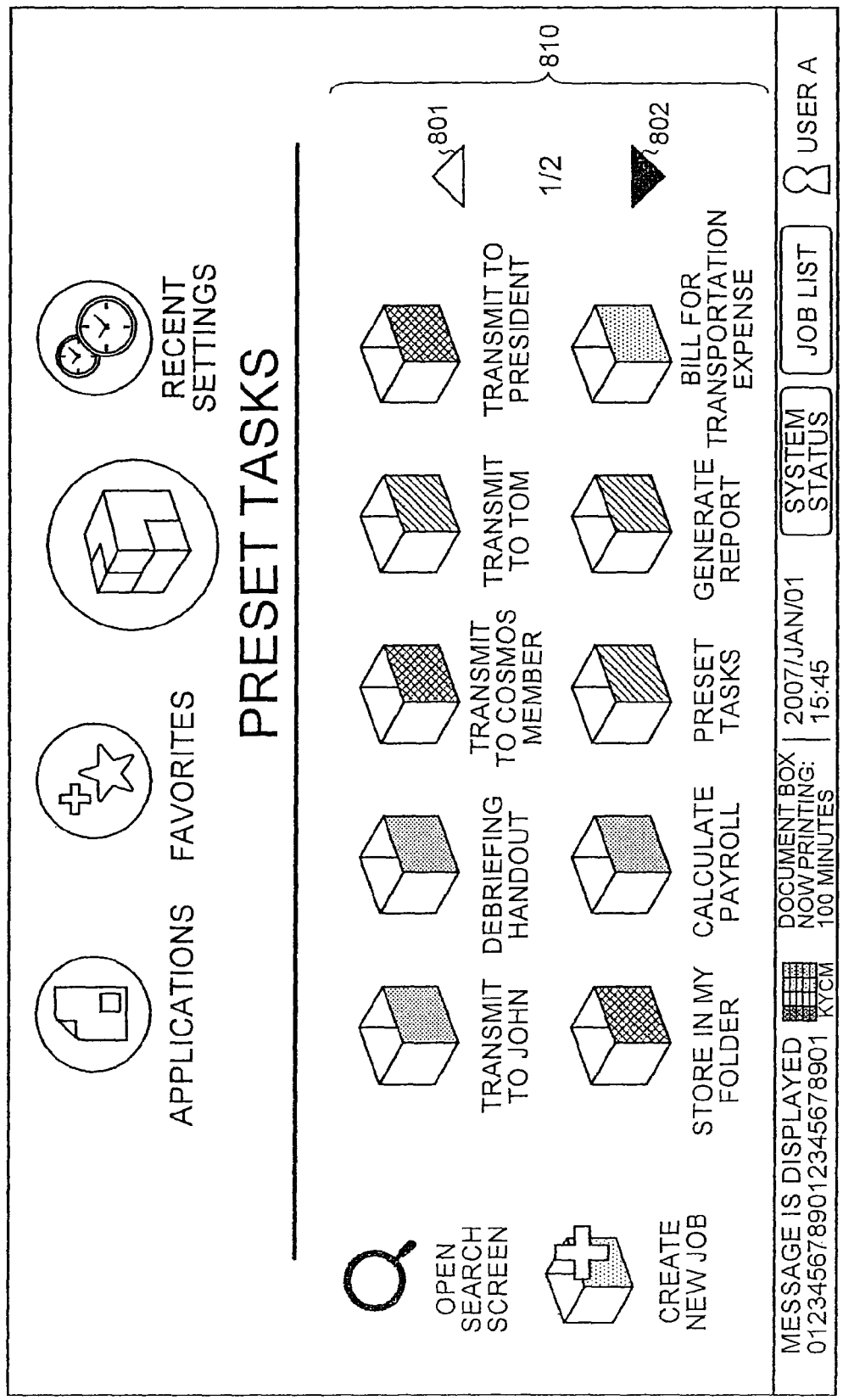
FIG. 8 is a schematic diagram for explaining an example of a routine work screen.

Details of the routine work screen displayed at step S507 are explained next. FIG. 8 is a schematic diagram for explaining an example of the routine work screen.

As shown in FIG. 8, on the routine work screen, only the selected category (Job) is displayed in a larger form. The routine work screen has the same configuration as that of the favorite screen except that only jobs that define routine processes are selectable.

When there are too many jobs to display all the jobs in a display area 810 for displaying jobs on a lower portion of the screen, the jobs can be displayed in units of pages each being capable of displaying a predetermined number of jobs. For example, as shown in FIG. 8, jobs are displayed in each page that can display ten jobs. By pressing a page switch button 801 or 802, displayed pages can be switched. The method for displaying the jobs is not limited to this, and a scroll bar can be provided to enable a scroll display of the jobs, for example.

FIG. 8 is an example of a display when no job is selected yet on the routine work screen. An example of the routine work screen when a job is selected is explained below.

Figure 9:
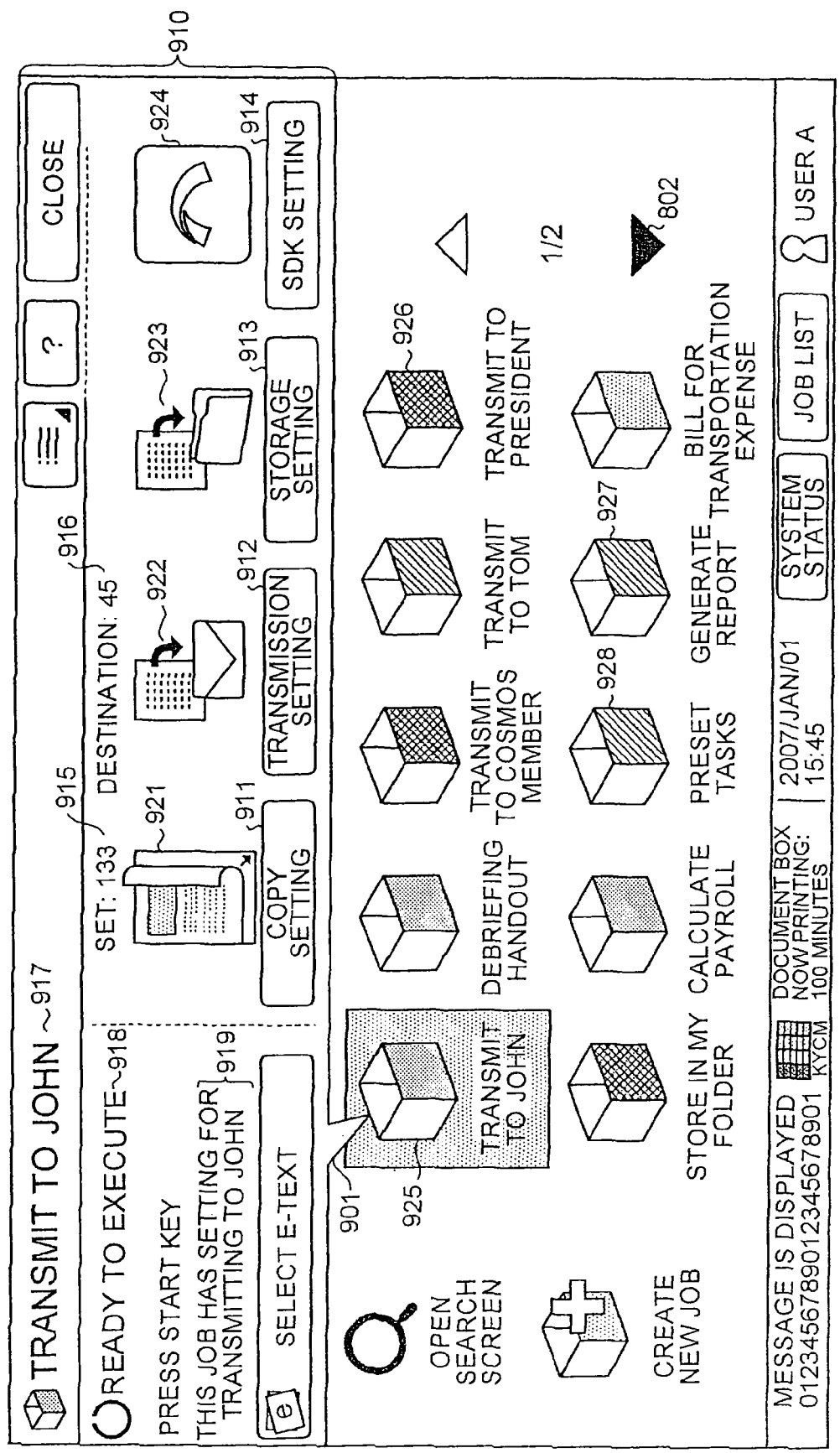
FIG. 9 is a schematic diagram for explaining another example of the routine work screen.

FIG. 9 is a schematic diagram for explaining an example of the routine work screen when a job key 925 corresponding to a job having a job name of "Transmit to John" in FIG. 8 is pressed. As shown in FIG. 9, when one of the jobs is selected by pressing a job key, a display area 910 in the form of a balloon is displayed. In the display area 910, icons 921 to 924, corresponding to functions (applications) that are registered in the selected job, and setting buttons 911 to 914 for displaying detailed setting screens to check or change settings of the corresponding functions (applications), are displayed.

The pressed job key 925 is displayed in a display manner indicating a selected state, and a balloon lead line 901 indicates that the job key 925 is related to the display area 910.

Above the icons corresponding to the functions (applications), overview information 915 and 916 indicating overviews of the corresponding settings of the functions (applications) is displayed in a simplified manner. Thus, the user can check the setting of each function (application). What to be displayed in a simplified manner is previously defined for each function (application). In FIG. 9, only one setting item for each function (application) is displayed; however, the number of setting items is not limited to one, and plural setting items for each function (application) can be displayed. Although the overview information is displayed as text information together with the icon in FIG. 9, only the text information indicating an overview of settings can be displayed without the corresponding icon displayed. The icon can be adapted to be a preview image indicating a result of processing according to the settings, to display the preview image as overview information.

The user can designate what to be displayed in a simplified manner. In such cases, flags are stored according to the designation to indicate whether the setting items in the setting information table are to be displayed in a simplified manner, respectively. Items to be displayed in a simplified manner are then identified by referring to the flags at the time of selection of a job. In this way, any method that can designate items indicating overviews of the corresponding settings of the functions (applications) can be applied as the method of designating what to be displayed in a simplified manner.

In the display area 910, a job name 917 of the selected job, status information 918 indicating a status of the corresponding device, and a guidance 919 that can be optionally registered by the user are further displayed. When information indicating an overview of the function (application) is registered as the guidance 919, the overview of the function (application) can be obtained from the guidance 919 as well as from the overview information 915 and 916. The guidance 919 can be registered for each job.

When the user presses the start key 208 included in the operation panel 200 of the MFP 1 in the display state as shown in FIG. 9, execution of the functions (applications) included in the selected job (Transmit to John) can be simultaneously started. That is, to start the functions (applications), such as the copy function (copy application), the transmitting function (transmitting application), and the storage function (storage application), there is no need to perform a start operation for each of the functions (applications), but one operation starts execution of the plural functions (applications) together. Thus, operability in execution of these functions (applications) can be enhanced.

A trigger that starts execution of these functions (applications) can be arbitrarily set according to progresses of the functions (applications), etc. For example, it is adapted to, upon completion of execution of a function (application), start execution of the next unprocessed function (application). When each function (application) includes plural process steps, upon completion of unprocessed process steps of a function (application), execution of another function (application) can be started. In this case, each time the unprocessed process steps of a function (application) are completed, unprocessed process steps of another function (application) are successively executed, and this processing is repeated until all process steps of all functions (applications) are completed. Part or all of functions (applications) can be executed in parallel. When the functions (applications) can be executed in parallel, the functions (applications) that can be executed in parallel can be started almost at the same time.

According to the conventional method, it is necessary to press the setting buttons 911 to 914 corresponding to the functions (applications) to display detailed setting screens corresponding to the functions (applications), and check details of the job to be executed. In general terms, assuming that a job is a higher setting item, functions (applications) included in the job are intermediate setting items, and detailed settings of the functions (applications) are lower setting items, conventionally the higher setting item and the intermediate setting items can be checked on the same screen, while another screen needs to be displayed to further check the lower setting items.

In contrast, according to the first embodiment, overviews of the respective settings of the functions (applications) can be displayed on the same screen that displays the job and the functions (applications). That is, overviews of the lower setting items as well as the higher setting item and the intermediate setting items can be displayed on the same screen.

Thus, in the first embodiment, only by selecting a job to be executed, details of the job can be readily known. Accordingly, operability in checking the setting items related to the job or executing the job can be enhanced.

Figure 10:
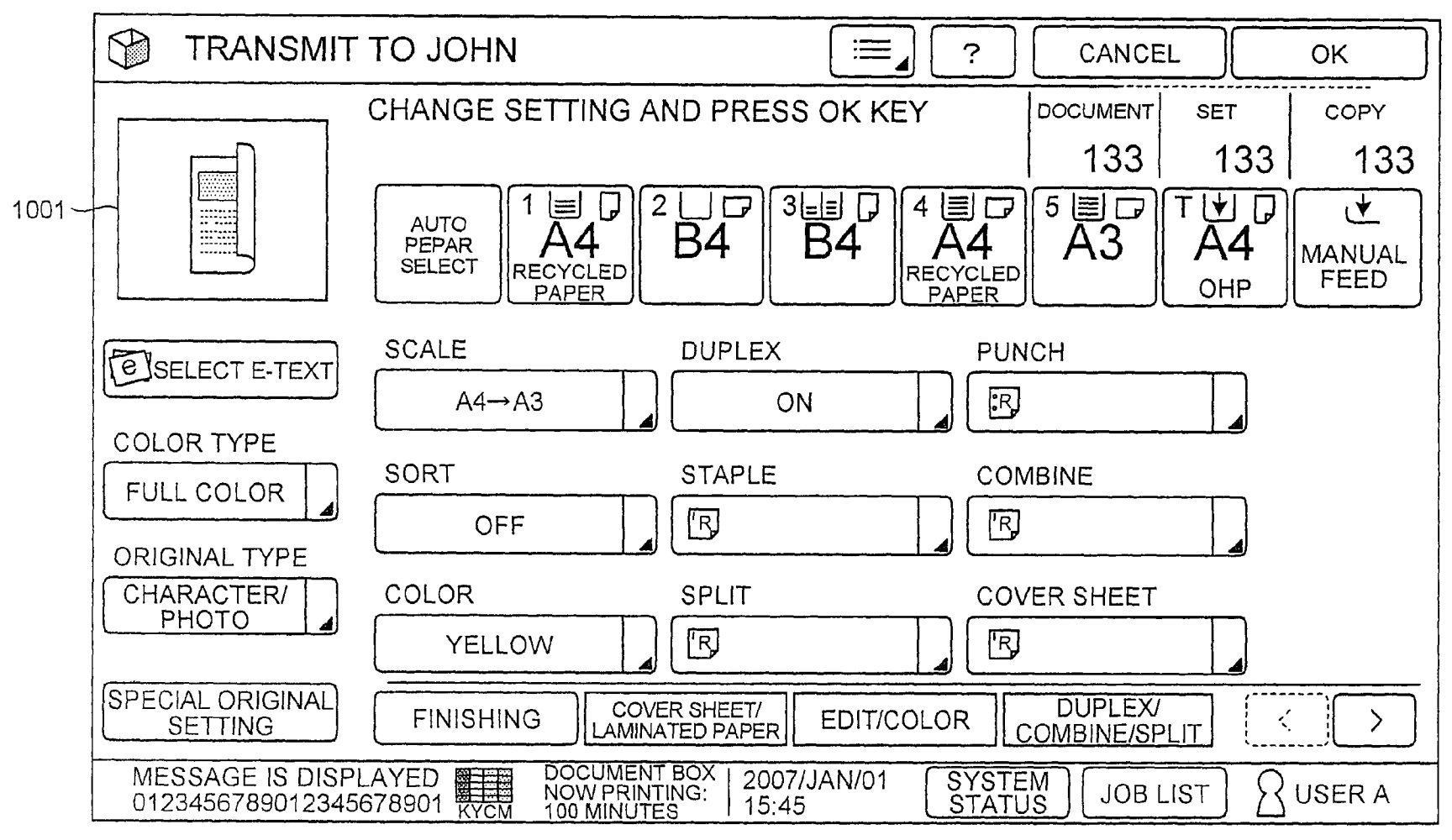
Figure 11:
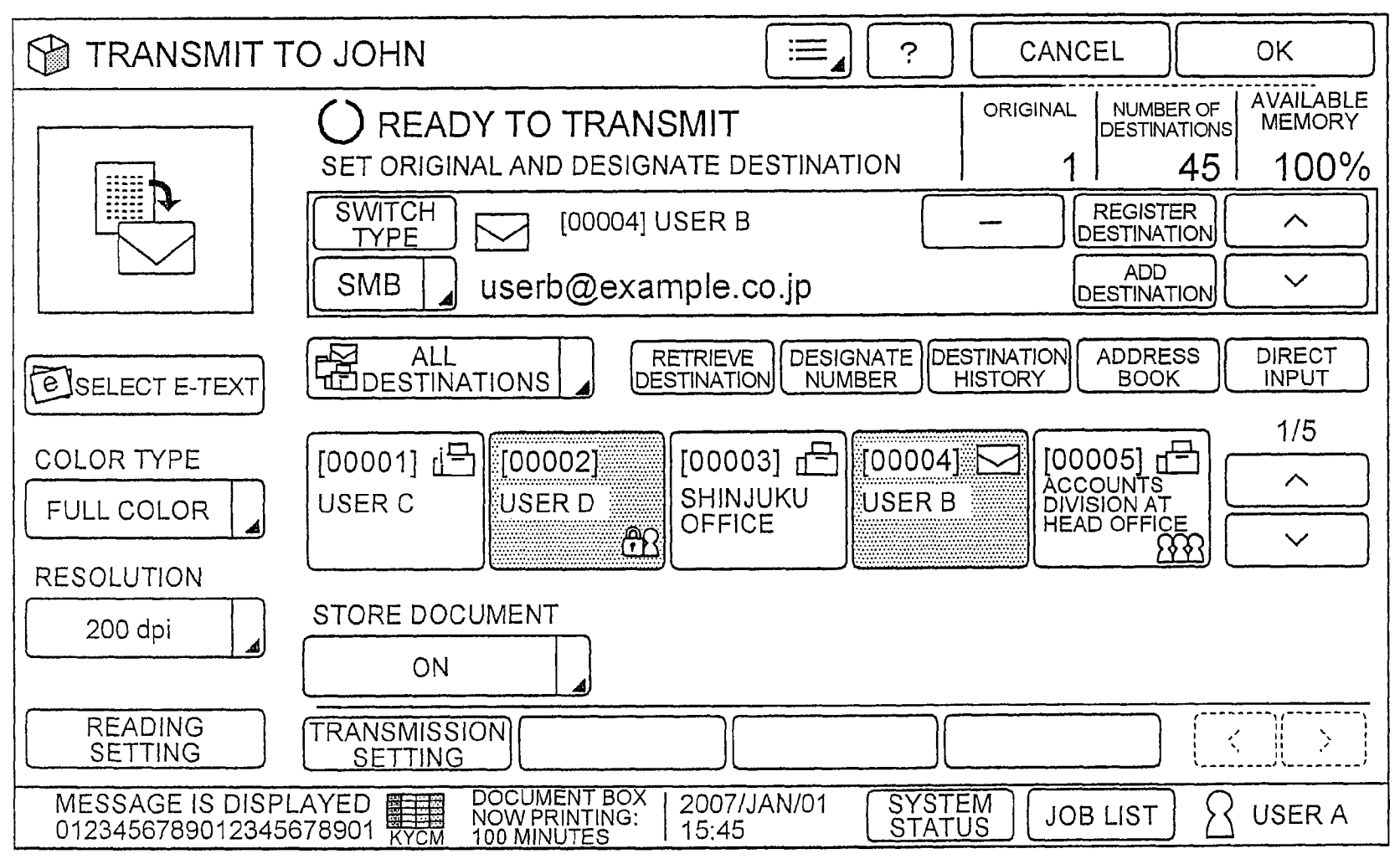

The detailed setting screen for checking or changing the setting items of the functions (applications), displayed at step S509, is explained next with reference to FIGS. 10 and 11. FIG. 10 is a schematic diagram for explaining an example of the detailed setting screen displayed when the setting button 911 corresponding to the copy function (copy application) as shown in FIG. 9 is pressed. FIG. 11 is a schematic diagram for explaining an example of the detailed setting screen displayed when the setting button 912 corresponding to the transmitting function (transmitting application) as shown in FIG. 9 is pressed.

As shown in FIGS. 10 and 11, different setting items are displayed on the detailed setting screens according to the details of the functions (applications) corresponding to the pressed setting buttons, respectively. For example, in FIG. 10, detailed setting items such as paper, scaling, duplexing, sorting, and punching are displayed as the setting items related to the copy function (copy application), to allow changes by the user.

The detailed setting screen includes a preview-image display area 1001. In the preview-image display area 1001, a preview image indicating a result of image processing based on the specified setting items is displayed. When the setting items are changed, a preview image that reflects changes in the settings is displayed in the preview-image display area 1001. In FIG. 10, an example is shown in which a preview image depicting a sheet of paper partly flipping is displayed in the preview-image display area 1001 to indicate duplex printing, because setting of duplexing is changed from OFF to ON.

When an OK button at the upper-right corner of the detailed setting screen as shown in FIG. 10 is pressed, the routine work screen as shown in FIG. 9 is displayed again. In this case, the overview information is updated to reflect the setting item changed in FIG. 10. For example, when the number of copies is changed from 133 to 100 in FIG. 10, the displayed overview information 915 in FIG. 9 is changed from 133 to 100. Similarly, when the number of destinations is changed from 45 to 40 in FIG. 11 for example, the displayed overview information 916 in FIG. 9 is changed from 45 to 40. Also when the overview information is displayed as a preview image indicating a result of image processing, a preview image reflecting changes in the setting items is displayed to update the displayed overview information.

The display processing unit 101 identifies the setting items to be displayed on the detailed setting screen in the following way. That is, the display processing unit 101 first searches the job information table by using a job ID of a job selected by the user as a retrieval key to obtain setting IDs of the corresponding functions (applications) from the job information table. The display processing unit 101 then identifies a setting ID of a function (application) corresponding to a pressed setting button, from among the obtained setting IDs. The display processing unit 101 then searches the setting information table by using the identified setting ID as a retrieval key to obtain the corresponding setting items and details of the settings from the setting information table.

Figure 12:
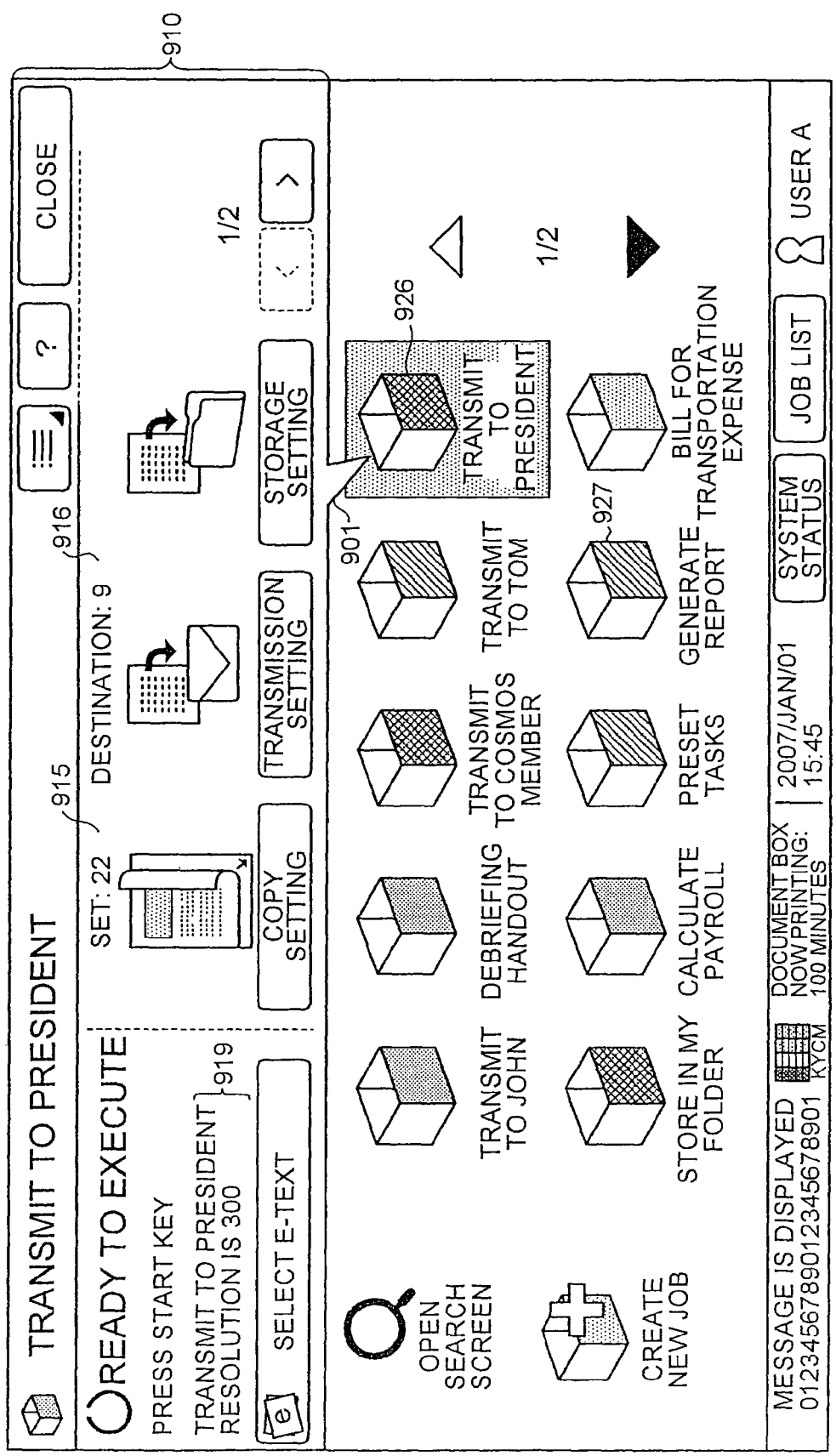
FIGS. 12 to 16 are schematic diagrams for explaining still another example of the routine work screen.

When another job key is pressed in the state where the job key 925 is pressed as shown in FIG. 9, details of the display area 910 are changed according to the pressed job key. FIG. 12 is a schematic diagram for explaining an example of the routing work screen displayed when a job key 926 corresponding to a job having a job name of "Transmit to President" is pressed in the state as shown in FIG. 9. As shown in FIG. 12, the functions (applications) displayed in the display area 910 are changed according to the selected job, and the overview information 915 and 916 of the functions (applications) and the guidance 919 are also changed according to the details of the functions (applications) of the selected job.

Thus, according to the first embodiment, only by selecting another job, functions (applications) included in the selected job and overviews of the respective settings of the functions (applications) can be readily checked.

The pressed job key 926 is displayed in a display manner indicating a selected state, and is related to the display area 910 by the balloon lead line 901. Accordingly, the user can easily know the job the details of which are displayed in the display area 910.

Figure 13:
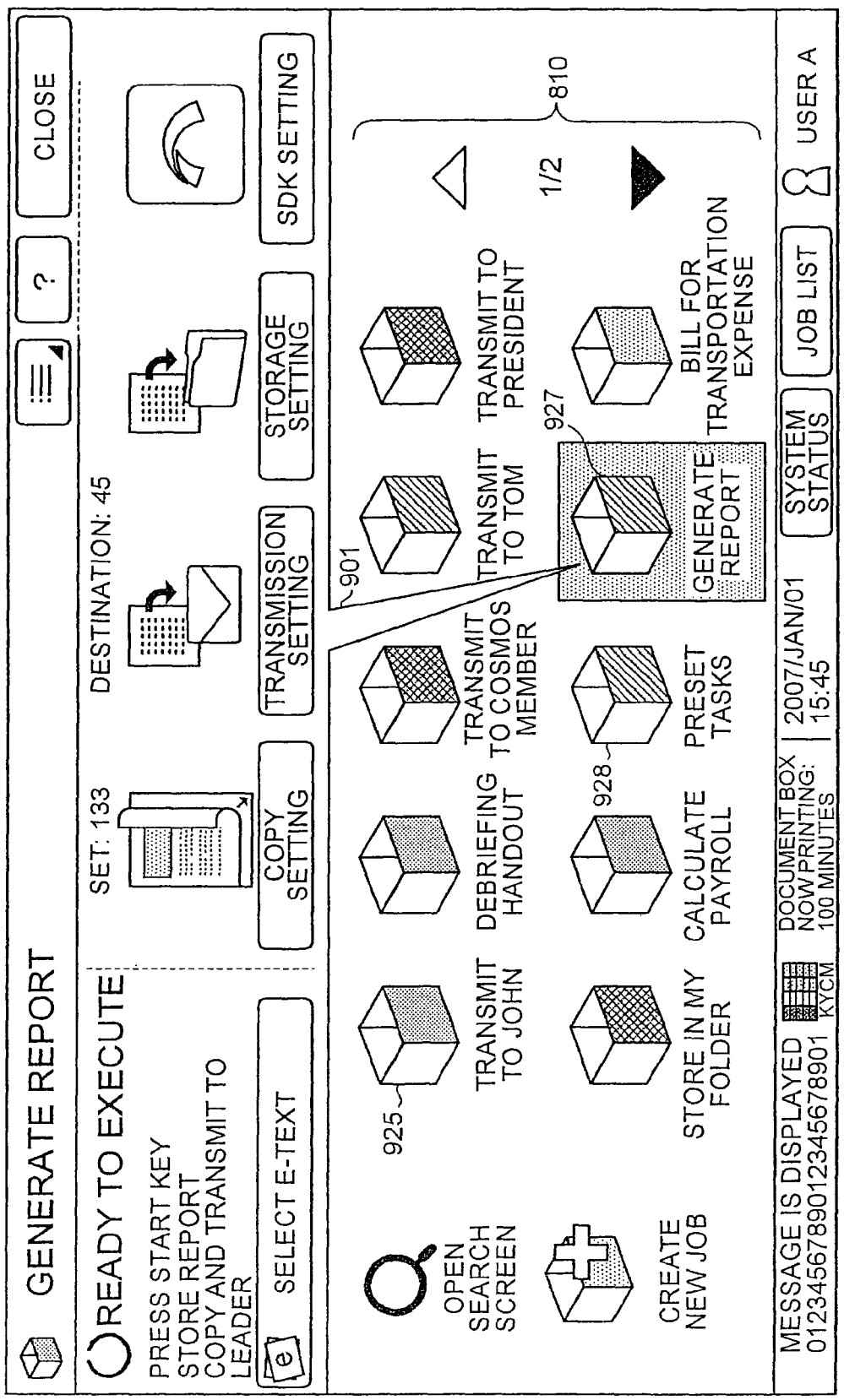

FIG. 13 is a schematic diagram for explaining an example of the routine work screen displayed when a job key 927 corresponding to a job having a job name of "Generate report" is pressed in the state as shown in FIG. 12. As shown in FIG. 13, even when the pressed job key changes among the job keys displayed in two rows in the display area 810, from the job key 926 displayed in the upper row to the job key 927 displayed in the lower row, arrangement of the job keys in the display area 810 does not change.

Conventionally, when detailed settings (corresponding to the functions (applications) in the first embodiment) in the form of tabs, corresponding to an item (corresponding to a job in the first embodiment) associated with the tabs are displayed, location of the selected tab may sometimes change. That is, when there are many items and tabs are displayed in plural rows, arrangement of rows may sometimes change to locate a selected tab to the fore. Accordingly, it is difficult for the user to remember the arrangement of the items to enhance efficiency in the operation of selecting items, which may reduce the operability.

In contrast, according to the present invention, even when the jobs are displayed in plural rows, the selected job can be linked with the corresponding functions (applications) as detailed settings by means of the balloon lead line 901. Accordingly, there is no need to display the job keys by changing its arrangement. Thus, the user easily remembers the positions of the items, which enhances the operability in selecting items.

As shown in FIG. 13, even when a job in the lower row is selected, the balloon lead line 901 is displayed at a position that does not overlap job keys corresponding to other jobs. Thus, visibility of the job keys of the jobs is assured, which enhances the operability at the selection of items. The display processing unit 101 displays the balloon lead line 901 at a predetermined position and in a predetermined form according to the position of the selected job so as not to overlap with the job keys corresponding to other jobs.

Figure 14:
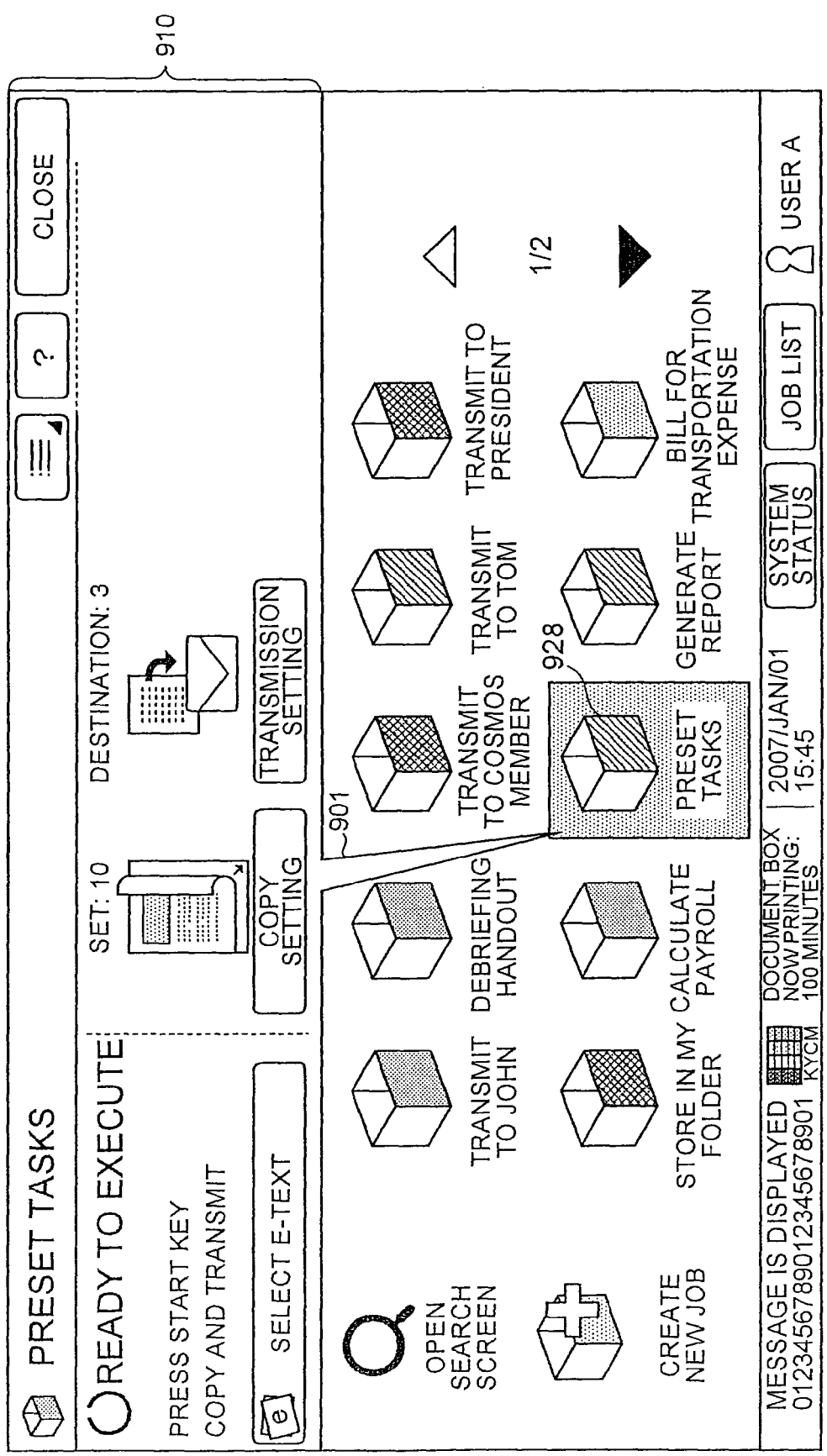

FIG. 14 is a schematic diagram for explaining an example of the routine work screen displayed when a job key 928 corresponding to a job having a job name of "Routine work" is pressed in the state as shown in FIG. 13. As shown in FIG. 14, also when the job key 928 corresponding to a job displayed in the lower row and in another column is selected, the arrangement of the job keys does not change. The display area 910 and the job key 928 of the selected job are linked by means of the balloon lead line 901.

Figure 15:
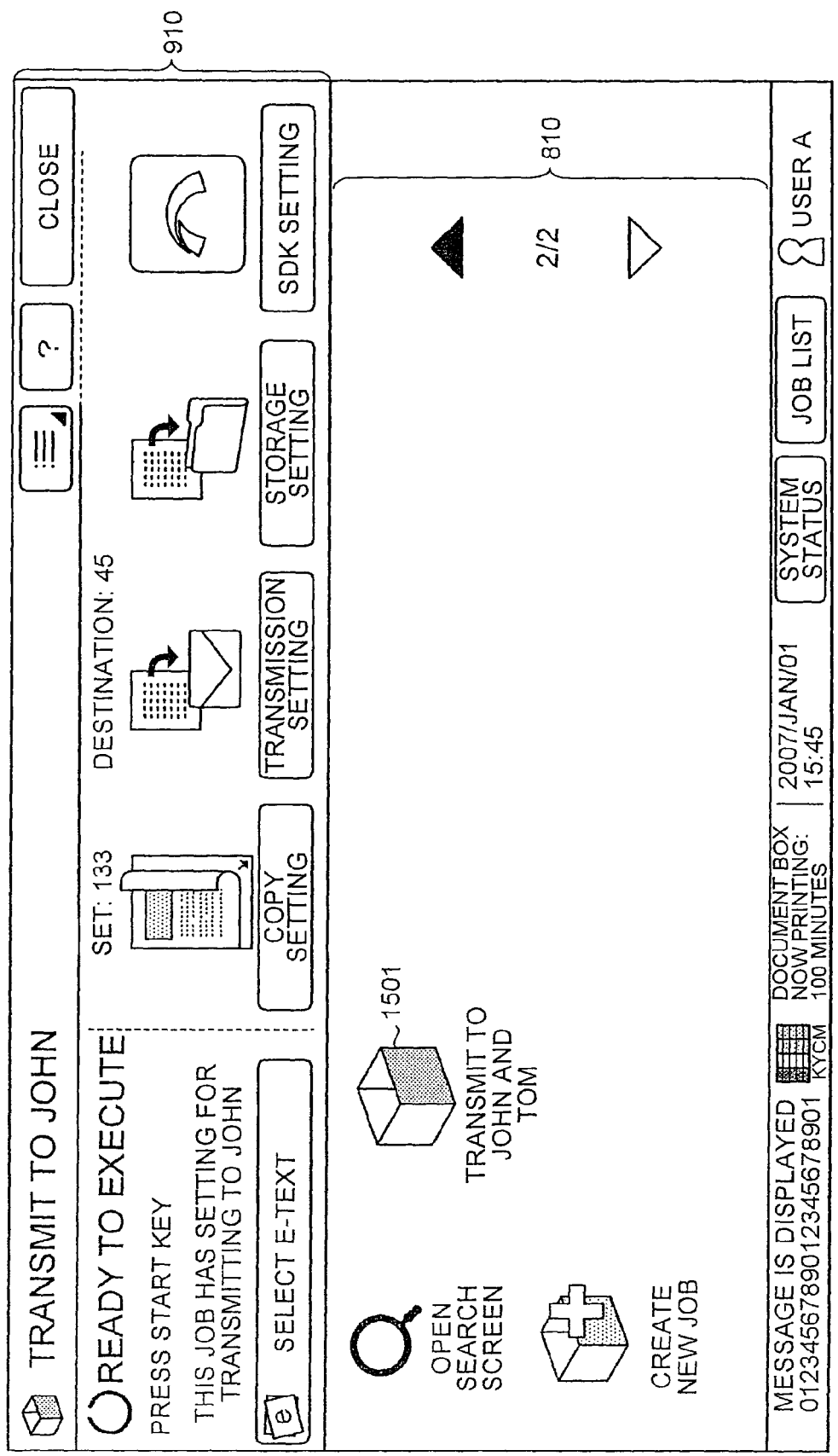

FIG. 15 is a schematic diagram for explaining an example of the routine work screen displayed when display of the next page (second page) is instructed by pressing the page switch button 802 in the state as shown in FIG. 9. In this example, as shown in FIG. 15, contents displayed in the display area 810 are switched into jobs included in the second page. However, because the selection of the job is not changed, the contents displayed in the display area 910 that display the functions (applications) of the selected job are not changed. The balloon lead line 901 is hidden because the job key 925 corresponding to the job having the job name of "Transmit to John", which is to be linked by the balloon lead line 901, is not displayed in the display area 810.

Figure 16:
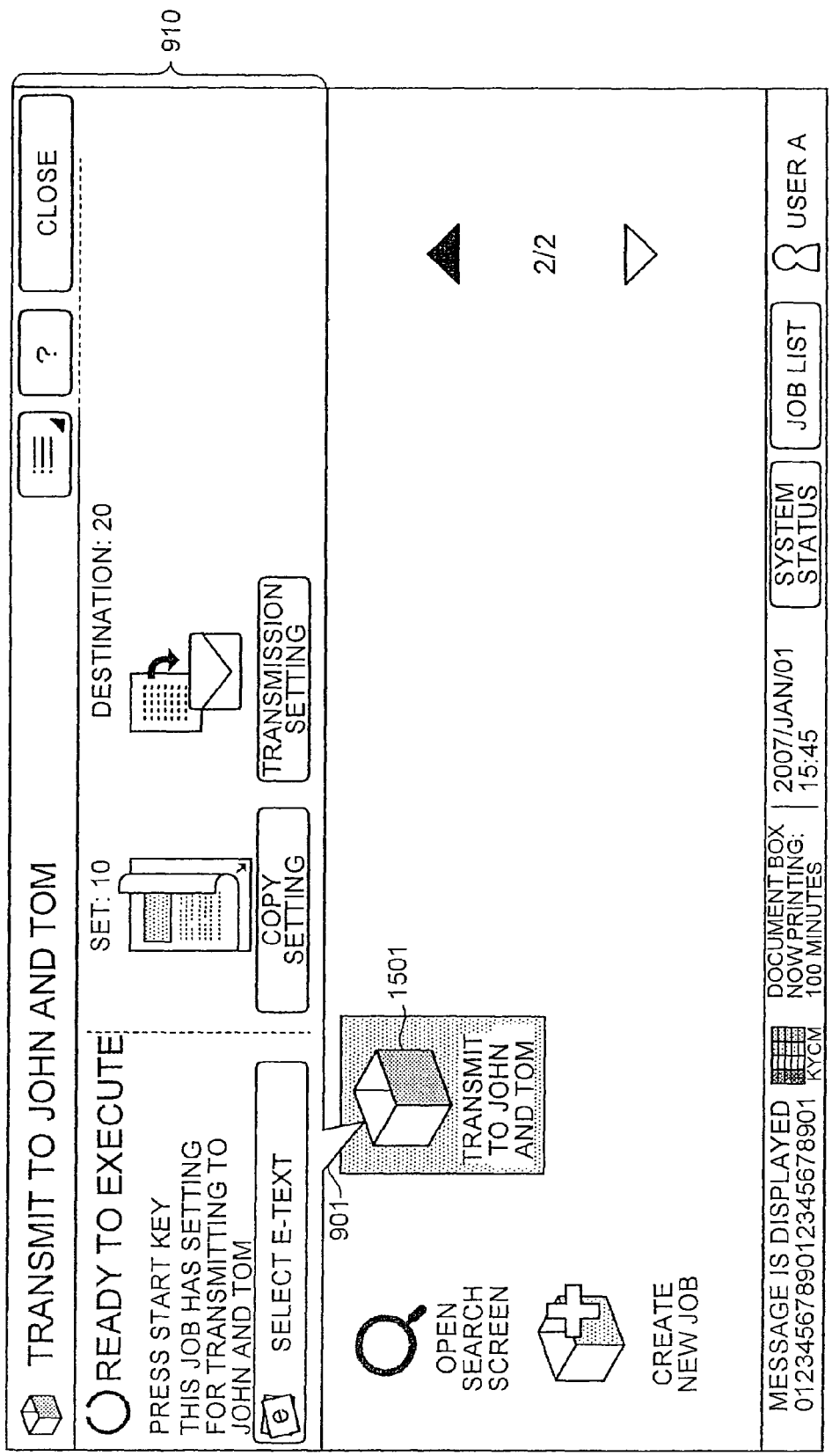

FIG. 16 is a schematic diagram for explaining an example of the routine work screen displayed when a job key 1501 corresponding to a job having a job name of "Transmit to John and Tom" is pressed in the state as shown in FIG. 15. As shown in FIG. 16, the pressed job key 1501 is displayed in a display manner indicating a selected state, and functions (applications) included in the selected job are displayed in the display area 910. The display area 910 and the job key 1501 of the selected job are linked by the balloon lead line 901.

Figure 17:
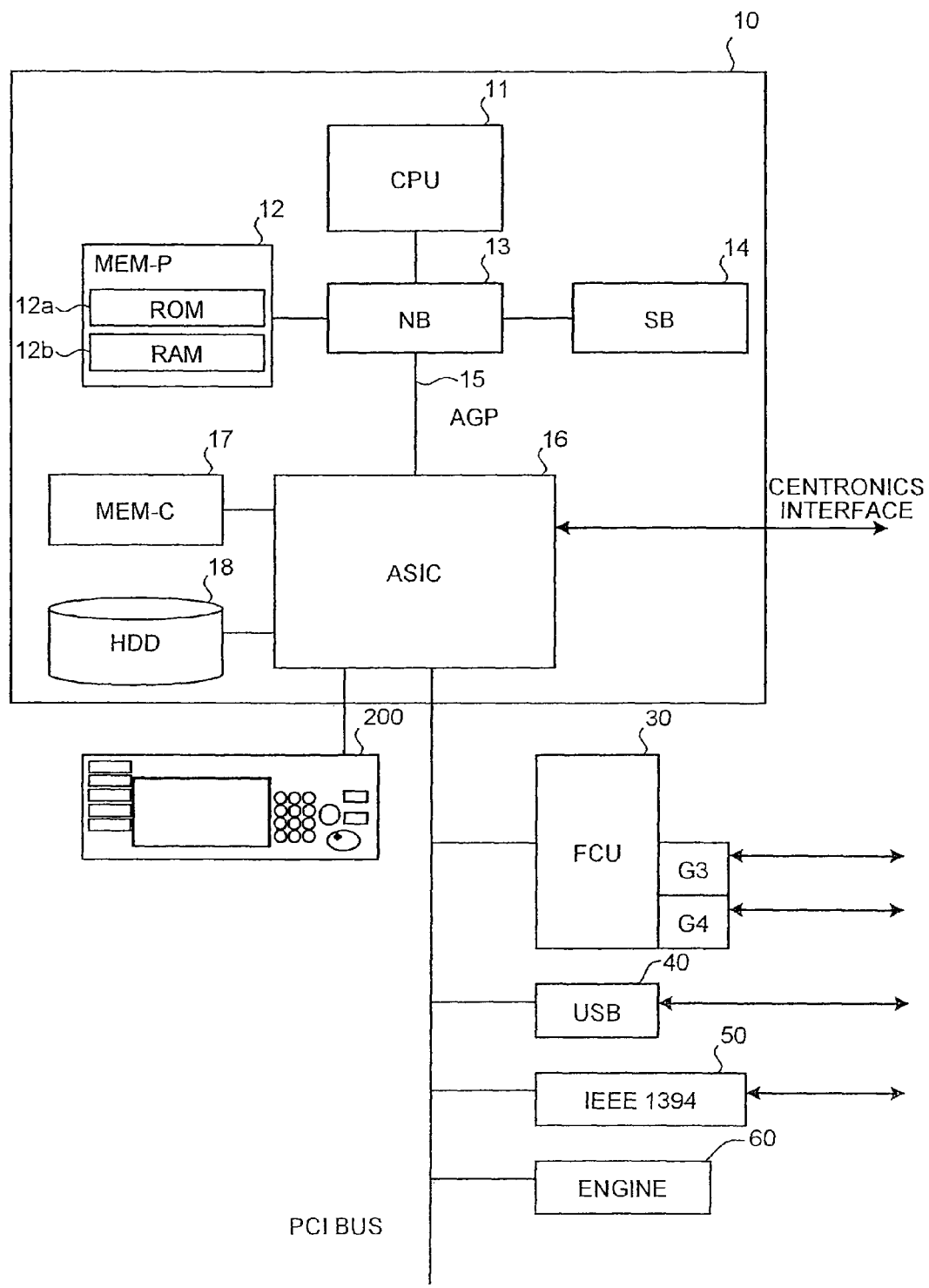
FIG. 17 is a block diagram of a hardware configuration of the MFP according to the first embodiment.

A hardware configuration of the MFP 1 according to the first embodiment is explained next. FIG. 17 is a block diagram of a hardware configuration of the MFP 1. As shown in FIG. 17, the MFP 1 includes a controller 10 and an engine 60, which are connected via a peripheral component interconnect (PCI) bus. The controller 10 performs general control of the MFP 1, and controls drawing, communication, and input through the operation panel 200. The engine 60 is a printer engine connectable to the PCI bus, such as a monochrome plotter, a one-drum color plotter, a four-drum color plotter, a scanner, and a facsimile unit. The engine 60 includes an image processing unit that performs error diffusion or gamma transformation, in addition to a so-called engine unit such as a plotter.

The controller 10 includes a central processing unit (CPU) 11, a north bridge (NB) 13, a system memory (MEM-P) 12, a south bridge (SB) 14, a local memory (MEM-C) 17, an application specific integrated circuit (ASIC) 16, and a hard disk drive (HDD) 18, in which the NB 13 and the ASIC 16 are connected via an accelerated graphics port (AGP) bus 15. The MEM-P 12 includes a read only memory (ROM) 12a, and a random access memory (RAM) 12b.

The CPU 11 performs general control of the MFP 1. The CPU 11 has a chipset including the NB 13, MEM-P 12, and the SB 14, and is connected to another device through the chipset.

The NB 13 is a bridge for connecting the CPU 11 to the MEM-P 12, the SB 14, and the AGP 15. The NB 13 includes a memory controller that controls reading from or writing into the MEM-P 12, a PCI master, and an AGP target.

The MEM-P 12 is a system memory to be used as a memory for storing programs or data, a memory for expanding programs or data, a memory for drawing by a printer, etc., and includes the ROM 12a and the RAM 12b. The ROM 12a is a read only memory to be used as a memory for storing programs or data. The RAM 12b is a readable and writable memory to be used as a memory for expanding programs or data, a memory for drawing by a printer, etc.

The SB 14 is a bridge for connecting the NB 13 to a PCI device and a peripheral device. The SB 14 is connected to the NB 13 via the PCI bus, which is also connected with a network interface (I/F), for example.

The ASIC 16 is an integrated circuit (IC) for an image processing application having hardware components for image processing, and serves as a bridge that connects the AGP 15, the PCI bus, the HDD 18, and the MEM-C 17 one another. The ASIC 16 includes a PCI target, a AGP master, an arbiter (ARB) that constitutes a core of the ASIC 16, a memory controller that controls the MEM-C 17, plural direct memory access controllers (DMAC) that perform rotation, etc., of image data according to hardware logic or, etc., and a PCI unit that transmits or receives data to or from the engine 60 via the PCI bus. The ASIC 16 is connected with a fax control unit (FCU) 30, a universal serial bus (USB) 40, and an IEEE 1394 (the Institute of Electrical and Electronics Engineers 1394) interface 50, via the PCI bus.

The MEM-C 17 is a local memory used as a copy image buffer or a coding buffer. The HDD 18 is a storage that store image data, programs, font data, and forms.

The AGP 15 is a bus interface for a graphic accelerator card that accelerates graphics processes. The AGP 15 accelerates the graphic accelerator card by directly accessing the MEM-P 12 with a high throughput.

Thus, when a job (higher setting item) as a unit of a process is selected, the display processing apparatus according to the first embodiment can display overviews of respective settings (lower setting items) of functions (applications; intermediate setting items) such as the copy function (copy application) and the mail transmitting function (mail transmitting application) included in the selected job, in association with the corresponding functions (applications). That is, plural functions (applications) included in a job can be simultaneously displayed, and respective settings of the functions (applications) can be displayed as a list. Accordingly, the operability in setting items or checking detailed settings is enhanced.

In the first embodiment, the display processing apparatus that is realized as the MFP is explained; however, apparatuses that can be realized as the display processing apparatus are not limited to the MFP. In a second embodiment of the present invention, an example of a configuration of a display processing apparatus that is realized by a general-purpose personal computer (PC) other than the MFP is explained.

Figure 18:
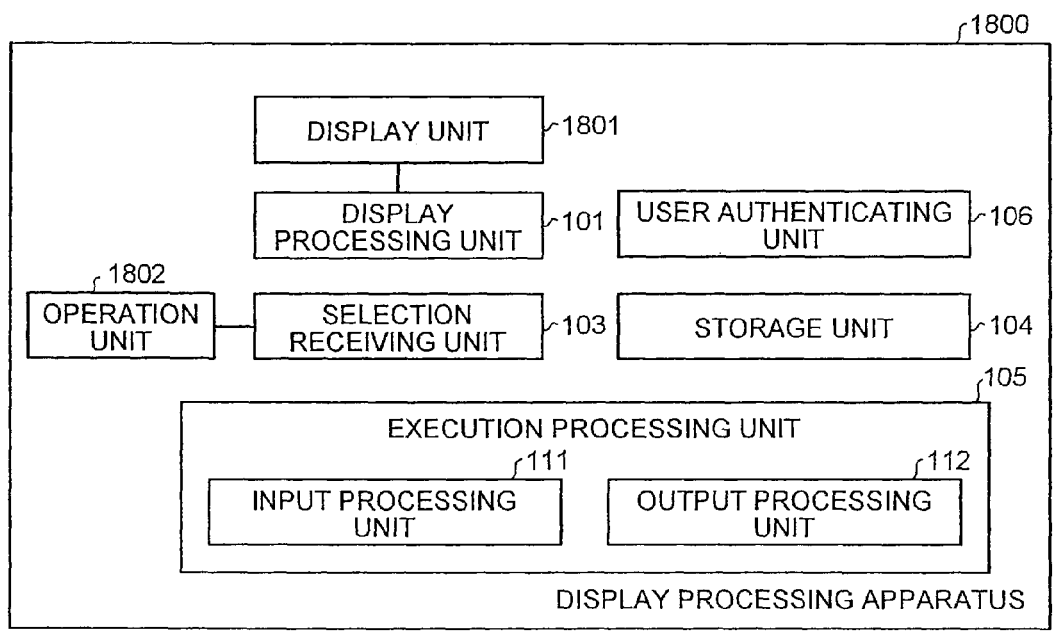
FIG. 18 is a functional block diagram of a display processing apparatus according to a second embodiment of the present invention.

FIG. 18 is a functional block diagram of a display processing apparatus 1800 according to the second embodiment. As shown in FIG. 18, the display processing apparatus 1800 has approximately the same configuration as that in the application layer 151 of the MFP 1 according to the first embodiment. In the second embodiment, the display processing apparatus 1800 includes a display unit 1801 and an operation unit 1802, instead of the operation panel 200 including the liquid-crystal touch panel 220, and the storage unit 104 is included in the configuration of the application layer 151.

The display unit 1801 is a processing unit on which various screens are displayed by the display processing unit 101. The display unit 1801 can be a liquid crystal display to be used in a PC, for example.

Figure 19:
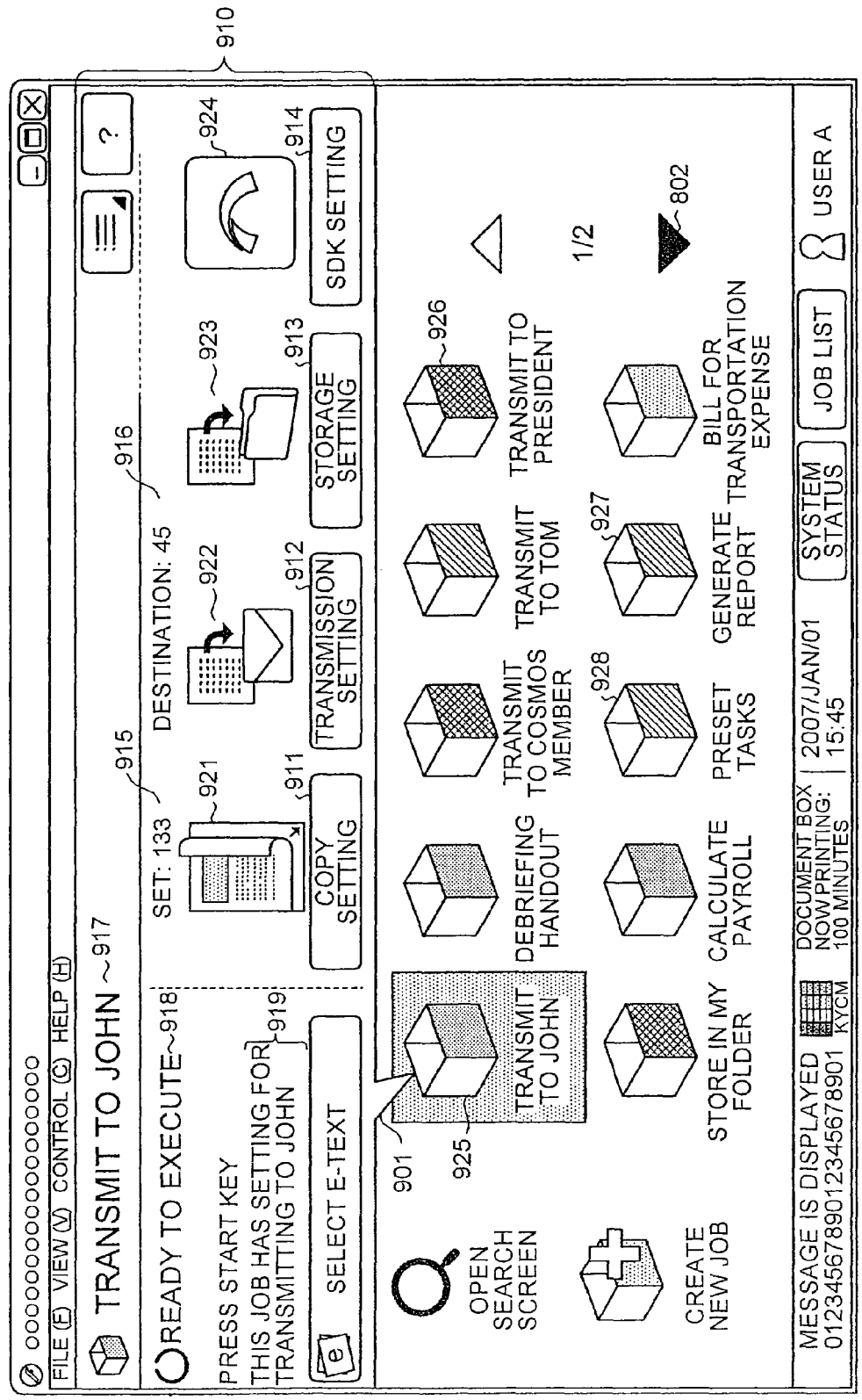
FIG. 19 is a schematic diagram for explaining an example of a display screen according to the second embodiment.
Figure 20:
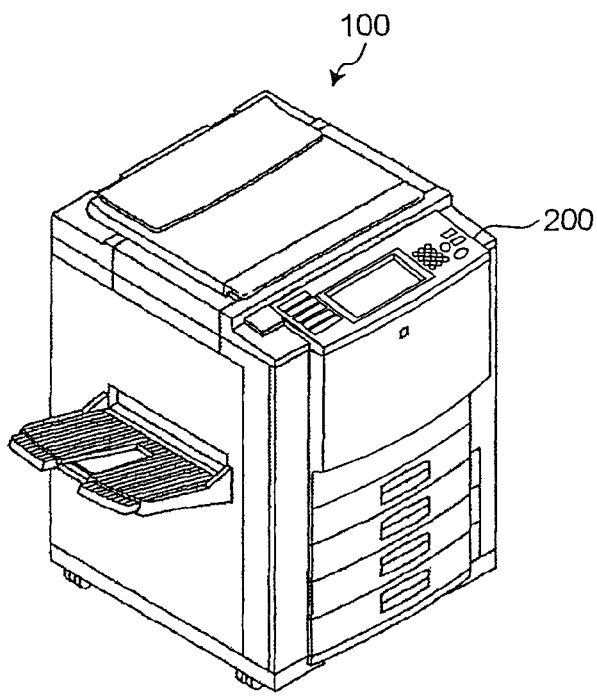
FIG. 20 is a perspective view of the MFP according to the first embodiment.
Figure 21:
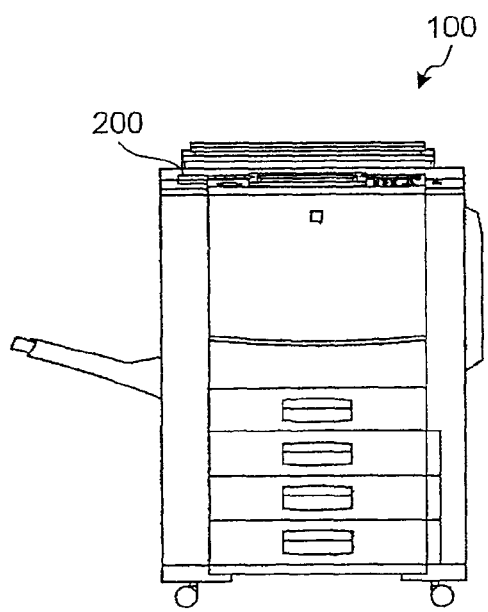
FIG. 21 is a front view of the MFP according to the first embodiment.
Figure 22:
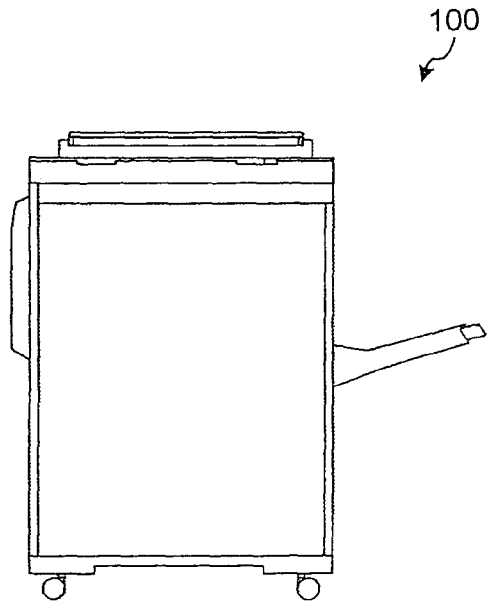
FIG. 22 is a back view of the MFP according to the first embodiment.
Figure 23:
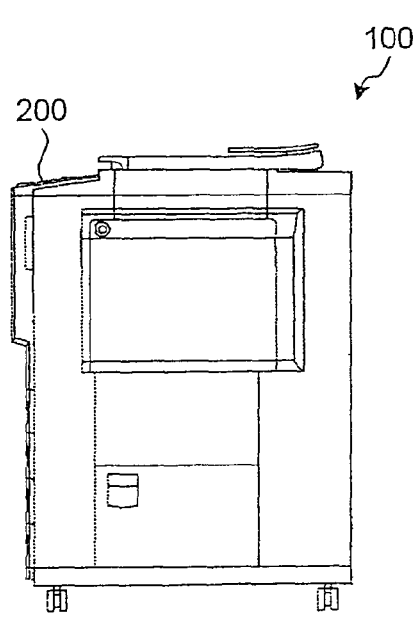
FIG. 23 is a right side view of the MFP according to the first embodiment.
Figure 24:
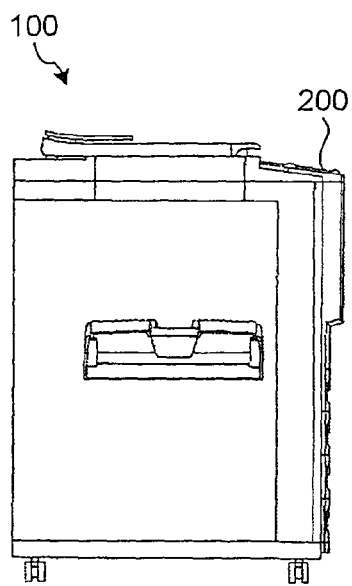
FIG. 24 is a left side view of the MFP according to the first embodiment.
Figure 25:
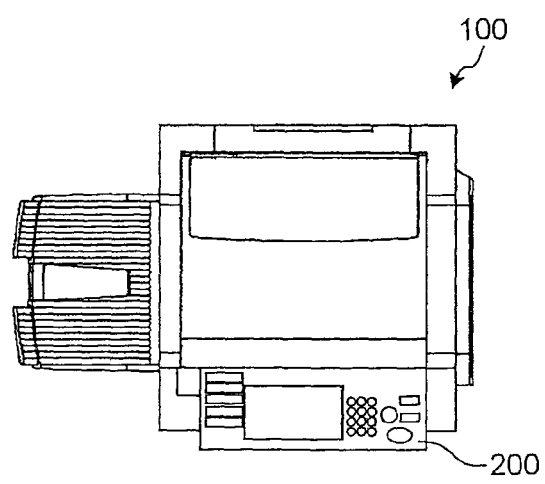
FIG. 25 is a plan view of the MFP according to the first embodiment.
Figure 26:
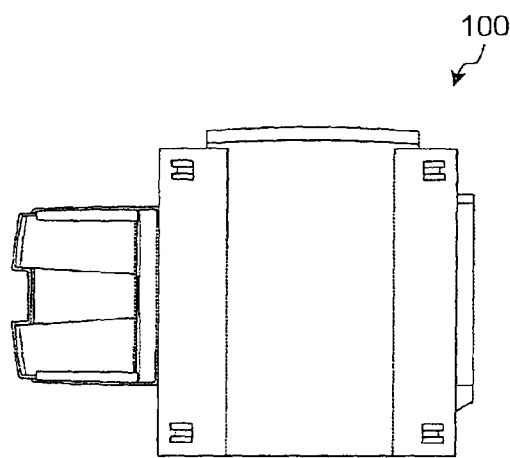
FIG. 26 is a bottom view of the MFP according to the first embodiment.

FIG. 19 is a schematic diagram for explaining an example of a display screen displayed when the display processing apparatus 1800 is realized as a general-purpose PC. FIG. 19 is an example in which the same routine work screen as that according to the first embodiment as shown in FIG. 9 is displayed in a window screen displayed on the display unit 1801. An operation of the display processing apparatus 1800 upon manipulation of an icon etc. in FIG. 19 is the same as that explained with reference to FIG. 9, and therefore like reference numerals are given to like constituent elements and redundant explanations thereof will be omitted.

The operation unit 1802 is an interface provided for the user to operate the display processing apparatus 1800. The operation unit 1802 can be any mechanism as long as it is an interface through which the user can select functions (applications) or setting items.

The selection receiving unit 103 receives selection of a function (application) or setting item by an input through the operation unit 1802. This implies that, even when a liquid crystal panel as in the first embodiment is provided as the display unit 1801, the liquid crystal panel does not need to be a liquid-crystal touch panel that allows inputting by touching to the panel with a user's finger, etc., as in the first embodiment.

Apparatuses such as an image forming apparatus, audio-visual (AV) equipment capable of storing music data and outputting or reproducing the data to another device, and a car navigation system can be embedded with the display processing apparatus 1800 according to the second embodiment. That is, any apparatus that has input and output functions, is capable of displaying on a display unit such as a liquid crystal panel included in the apparatus, and has an interface including a liquid-crystal touch panel or plural buttons for realizing selection of a function (applications) or a setting item can be used.

For example, when the display processing apparatus 1800 is realized as a car navigation system, the setting buttons 911 to 914 as shown in FIG. 19 can be adapted as buttons for setting different destinations 1 to 4, respectively. The overview information 915 and 916 can be adapted to display necessary times to go to the set destinations, etc. Alternatively, the setting buttons 911 to 913 can be adapted as buttons for setting different stopping points 1 to 3, respectively, and the setting button 914 can be adapted as a button for setting a destination.

The display processing apparatus 1800 according to the second embodiment that is adapted to include a display unit and an interface having necessary and sufficient sizes to display plural functions (applications) or setting items can be embedded into a portable device, etc. For example, such a display processing apparatus can be embedded into a portable terminal including a liquid-crystal touch panel, such as a personal digital assistance (PDA) and a portable game console.

Thus, even a portable apparatus having an unsatisfactory display unit and interface easily enables to obtain settings of a selected setting item by applying thereto the method according to the second embodiment, which enhances the operability.

The display processing apparatus according to the second embodiment can use a touch panel as the operation unit, in the same manner as the first embodiment. In an apparatus including a touch panel, plural functions (applications) or setting items are displayed on the display unit. When the user presses a touch panel, the display processing apparatus can receive selection of one of the displayed functions (applications). Thus, even with an apparatus having a limited input interface, intermediate setting items and overviews of lower setting items corresponding to a selected higher setting item can be displayed in association with each other. Therefore, the setting items can be easily checked, and the operability is enhanced.

A display processing program executed by the display processing apparatus as described in the above embodiments is previously embedded in the ROM, etc.

The display processing program executed by the display processing apparatus as described in the embodiments can be provided by being recorded in a computer-readable recording medium such as a compact disc read only memory (CD-ROM), a flexible disk (FD), a CD recordable (CD-R), and a digital versatile disk (DVD), in a file of an installable or executable form.

The display processing program executed by the display processing apparatus as described in the embodiments can be stored in a computer connected to a network such as the Internet, and downloaded through the network. The display processing program executed by the display processing apparatus as described in the embodiments can be provided or distributed through a network such as the Internet.

The display processing program executed by the display processing apparatus as described in the embodiments has a module configuration including the constituent elements above mentioned (the display processing unit, the selection receiving unit, the execution processing unit, and the user authenticating unit). As practical hardware, the CPU reads and executes the display processing program from the ROM, thereby loading the constituent elements into a main memory and generating the elements on the main memory.

An appearance of the MFP 1 according to the first embodiment is explained. FIGS. 20 to 26 are a perspective view, a front view, a back view, a right side view, a left side view, a plan view, and a bottom view of an example of the MFP 1 including an operation panel, respectively.

A modification of the first embodiment is explained below. A display processing apparatus according to the modification displays overview information indicating a list of overviews of settings of applications, associated with the corresponding application, through a different user interface from that described in the first embodiment. A functional block diagram of the modified display processing apparatus is the same as that of the first embodiment as shown in FIG. 1, and thus explanations thereof will be omitted. Details of the interface different from that of the first embodiment are mainly explained below.

Figure 27:
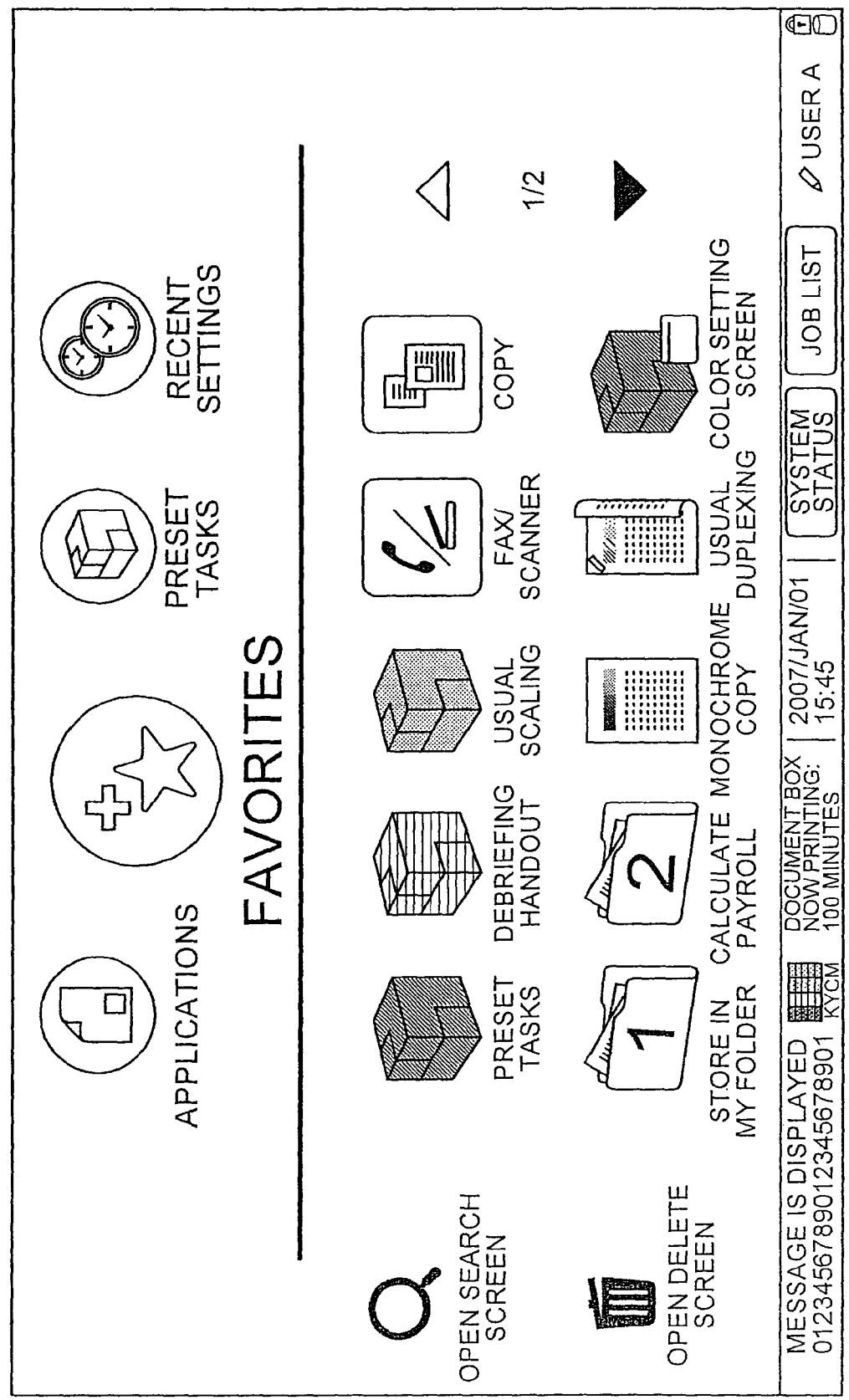
FIG. 27 is an example of a favorite screen according to a modification.

FIG. 27 is an example of a favorite screen according to the modification. As shown in FIG. 27, the selected category (Favorite) is displayed in a larger form on the favorite screen. Applications frequently used by the user, and the like are displayed on the favorite screen.

Figure 28:
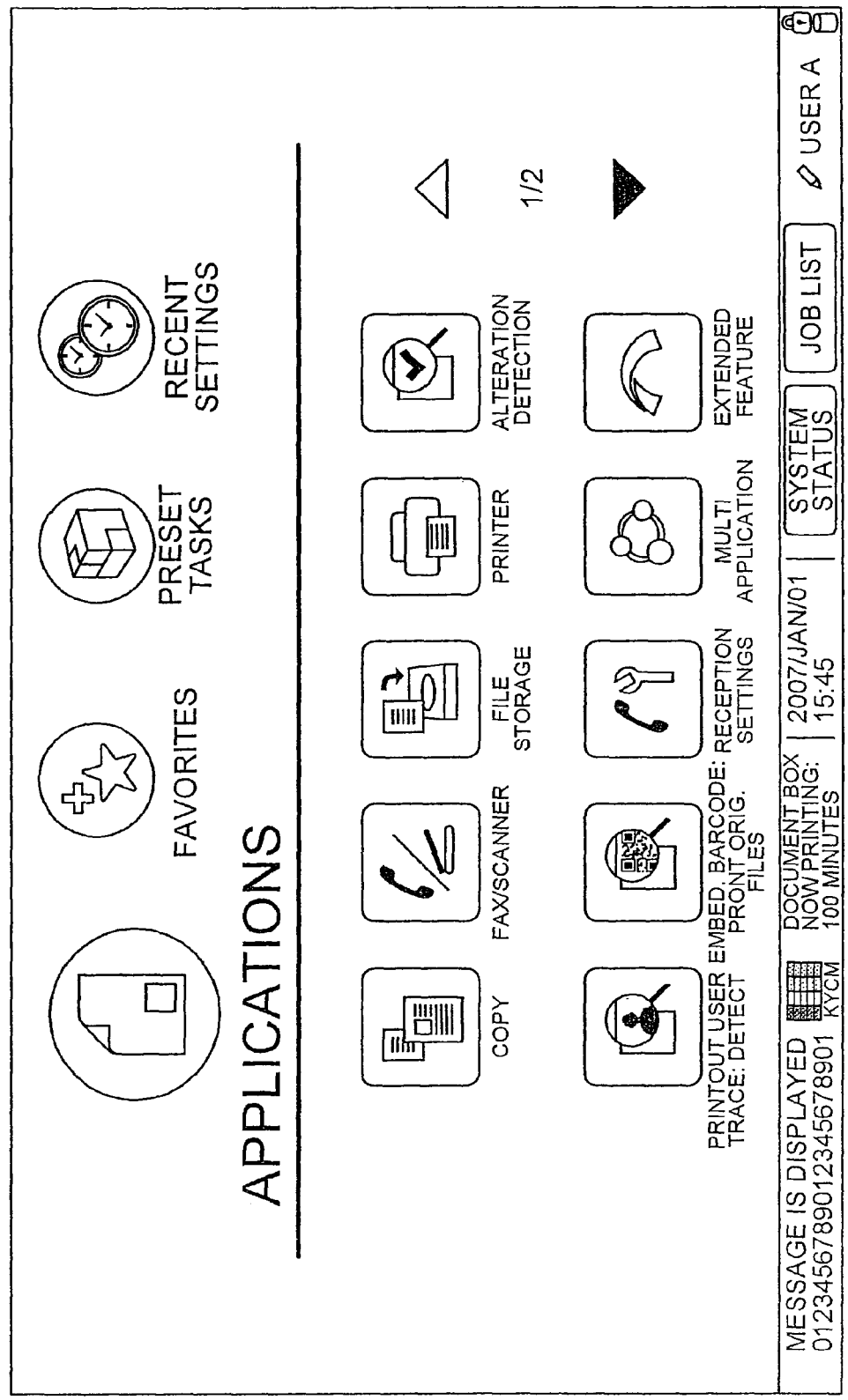
FIG. 28 is an example of an application screen according to the modification.

FIG. 28 is an example of an application screen according to the modification. As shown in FIG. 28, the selected category (Application) is displayed in a larger form on the application screen. Functions (applications) included in the MFP 1 are also displayed selectably on the application screen.

An alteration detecting function (alteration detecting application) shown in FIG. 28 is a function of reading an original that is embedded with image information of the original, and comparing the image information of the original and the embedded image information, to detect alteration of the original.

An outputter-information detecting function (outputter-information detecting application) is a function of reading a paper original that is embedded with marking information, and printing an original document stored in a HDD indicated by the marking information. With this function, even when the read paper original includes handwritten notes etc., an original document without handwritten notes can be obtained.

A barcode reading/detecting function (barcode reading/detecting application) is a function of reading a document that is embedded with a marking image like a barcode, which is obtained by converting information (such as data in extensible markup language (XML) format) to be linked with an original document, and restoring the information by detecting the marking image.

A reception setting function (reception setting application) is a function of outputting a received document to an appropriate output destination. A multi function (multi application) is a function that enables multiple inputs and multiple outputs (including single input and single output) of a document with a single start operation (for example, by pressing a start key).

Figure 29:
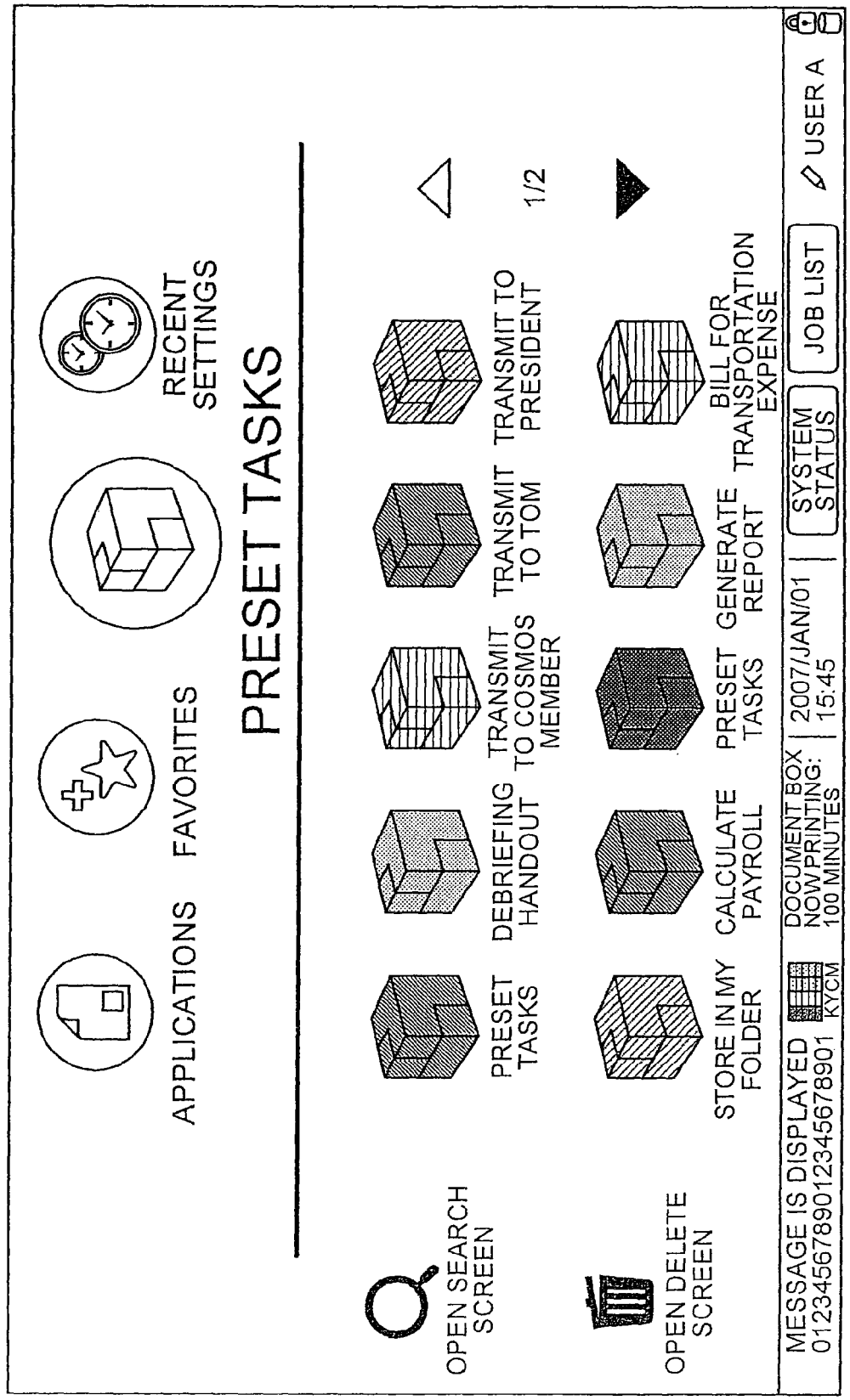
FIG. 29 is an example of a routine work screen according to the modification.

FIG. 29 is an example of a routine work screen according to the modification. As shown in FIG. 29, the selected category (Routine work) is enlargedly selected on the routine work screen. Jobs designated as routine processes are selectably displayed on the routine work screen.

Figure 30:
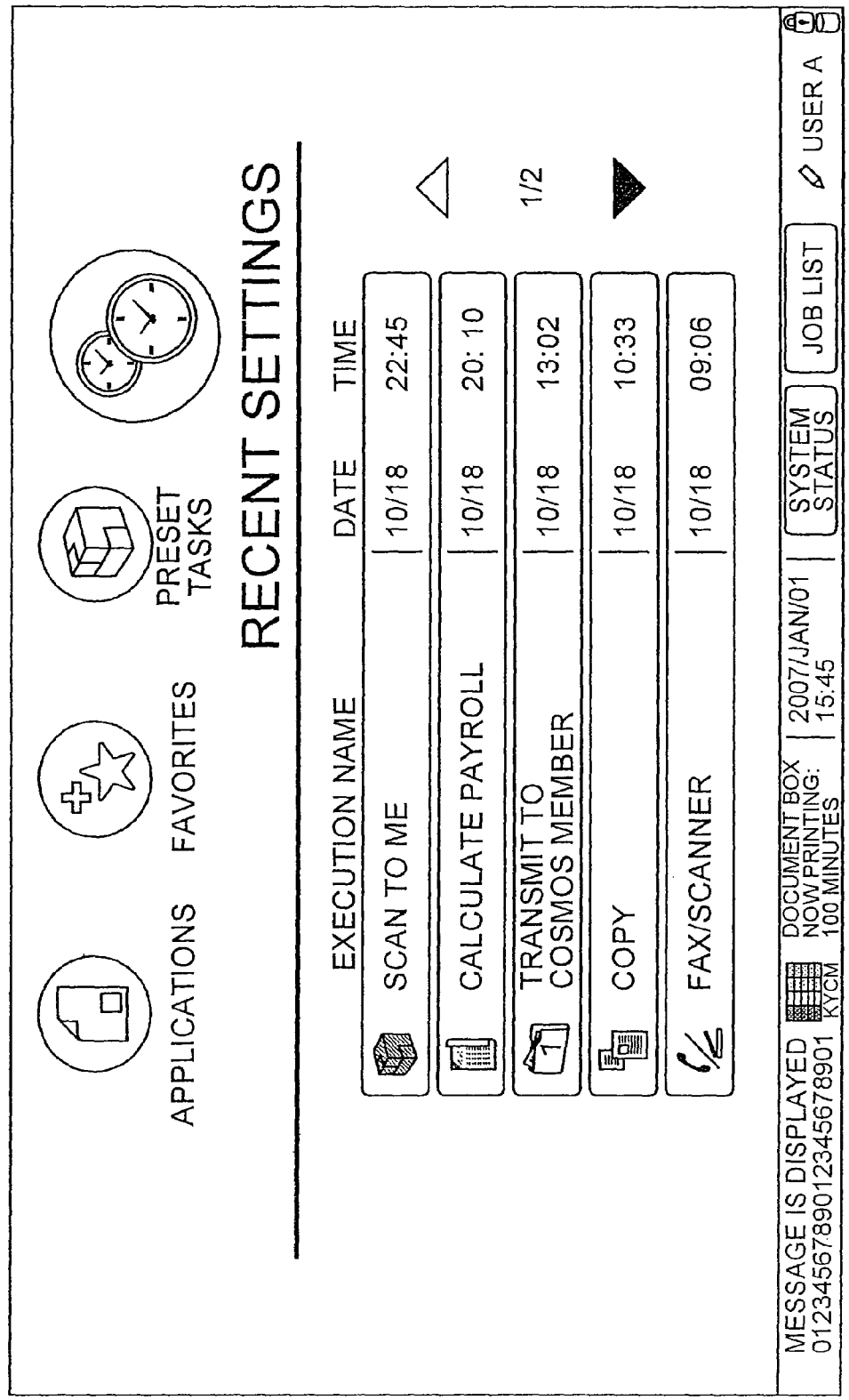
FIG. 30 is an example of a history screen according to the modification.

FIG. 30 is an example of a history screen according to the modification. As shown in FIG. 30, the selected category (History) is displayed in a larger format on the history screen. A list of dates and times of execution of applications or jobs recently executed, and the like are displayed on the history screen.

Figure 31:
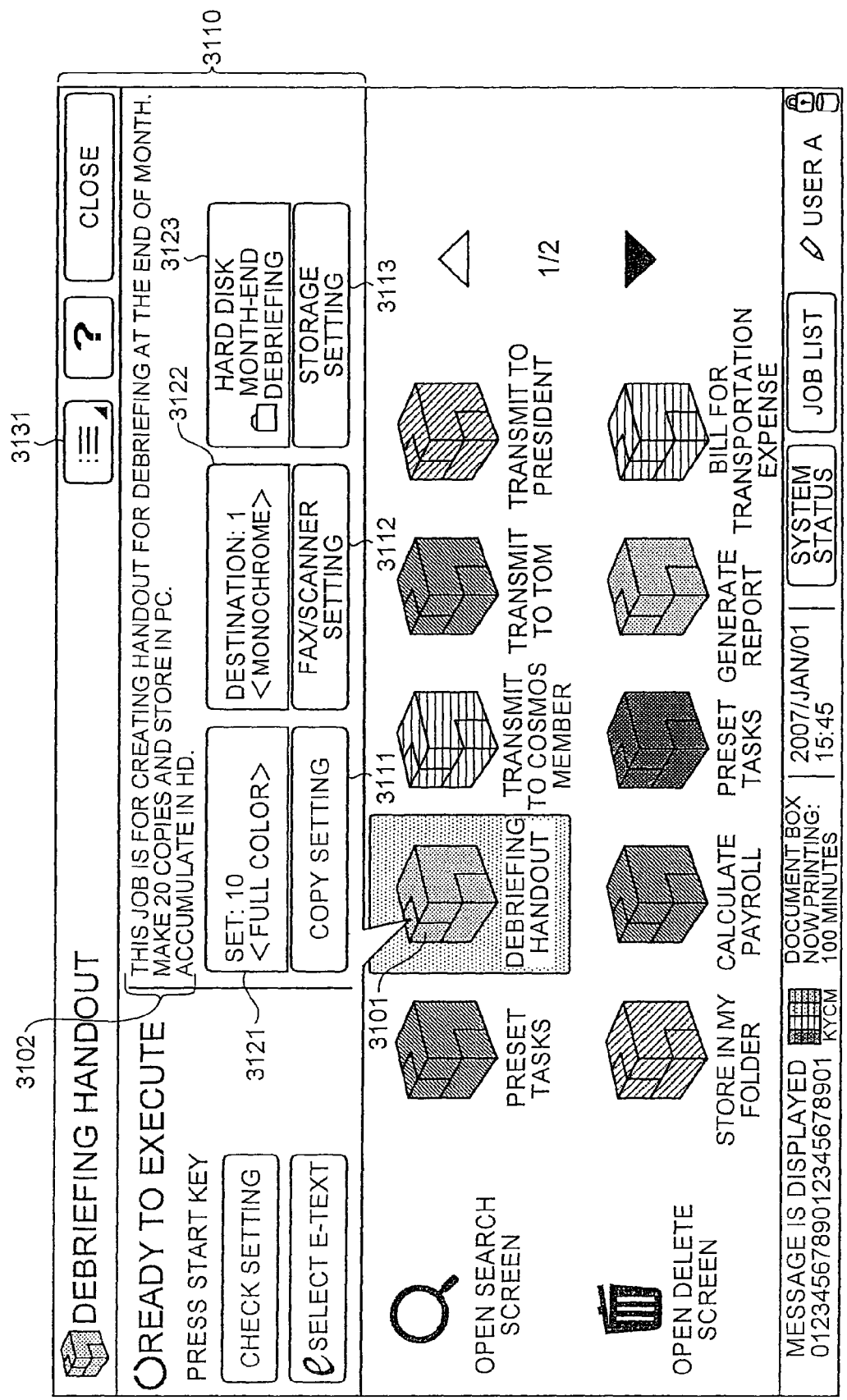
FIG. 31 is an example of the routine work screen when a job key is pressed on the screen as shown in FIG. 29.

FIG. 31 is an example of the routine work screen displayed when a job key 3101 corresponding to a job "Debriefing handout" is pressed on the screen, as shown in FIG. 29. As shown in FIG. 31, in this modification, a comment 3102 on the designated job, and a universal menu key 3131 for displaying a predetermined menu are displayed in a display area 3110 in the form of a balloon. In this modification, overview information 3121 to 3123 in the form of text, indicating overviews of settings of the functions (applications) such as copy is displayed linked with setting buttons 3111 to 3113 for displaying detailed setting screens to change settings of the corresponding functions (applications), respectively.

According to this modification, overviews of settings of the functions (applications) associated with a job can be easily checked based on text information displayed in the form of list, and execution of the functions (applications) can be started together by pressing a start key.

Figure 32:
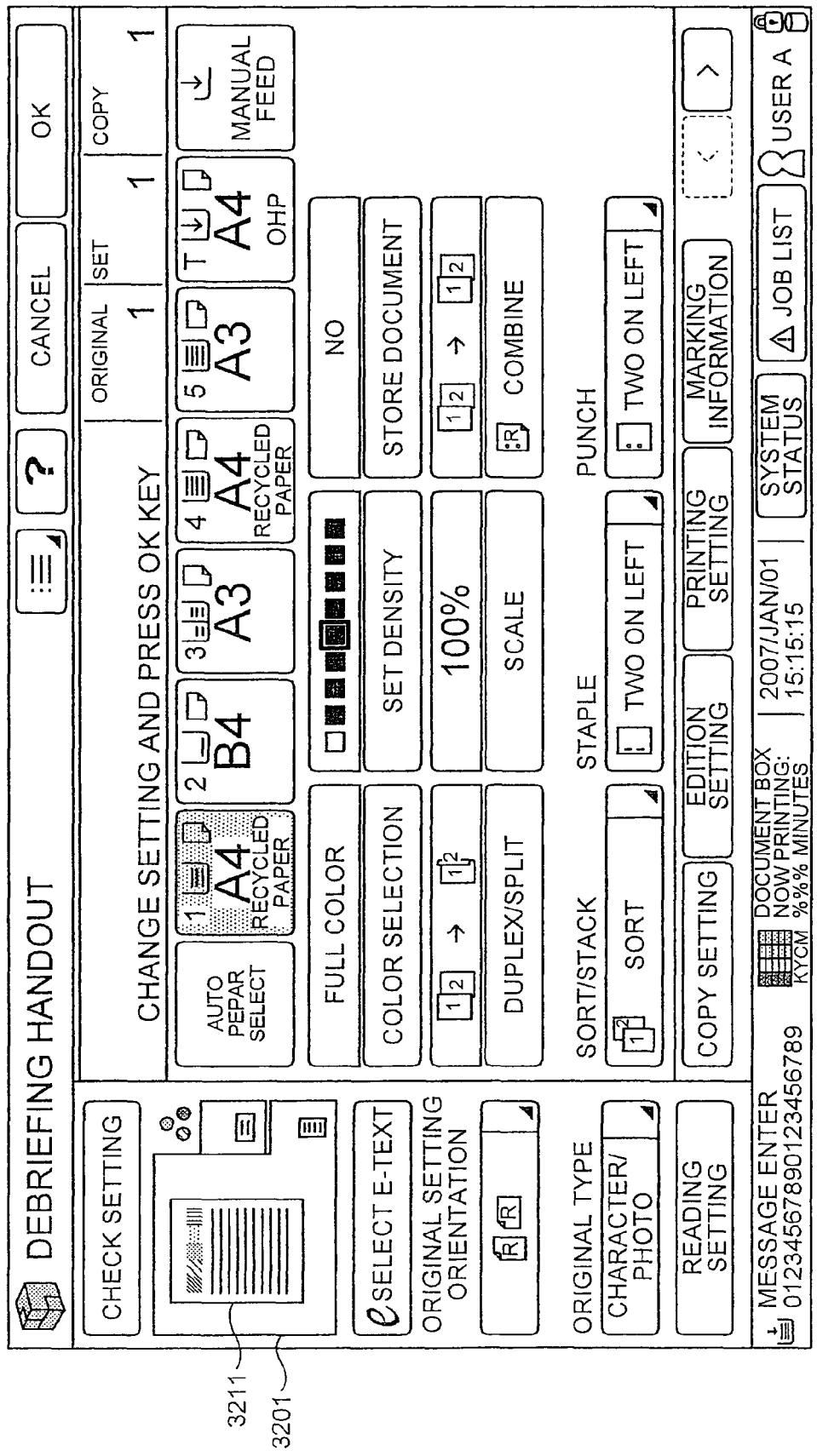
FIG. 32 is an example of a detailed setting screen according to the modification.

FIG. 32 is an example of the detailed setting screen displayed when the setting button 3111 corresponding to the copy function (copy application) on the screen as shown in FIG. 31 is pressed. As shown in FIG. 32, setting items associated with the corresponding function (application) are displayed on the detailed setting screen. The detailed setting screen includes a preview-image display area 3201 that displays a preview image 3211 indicating a result of image processing according to the specified setting items.

Figure 33:
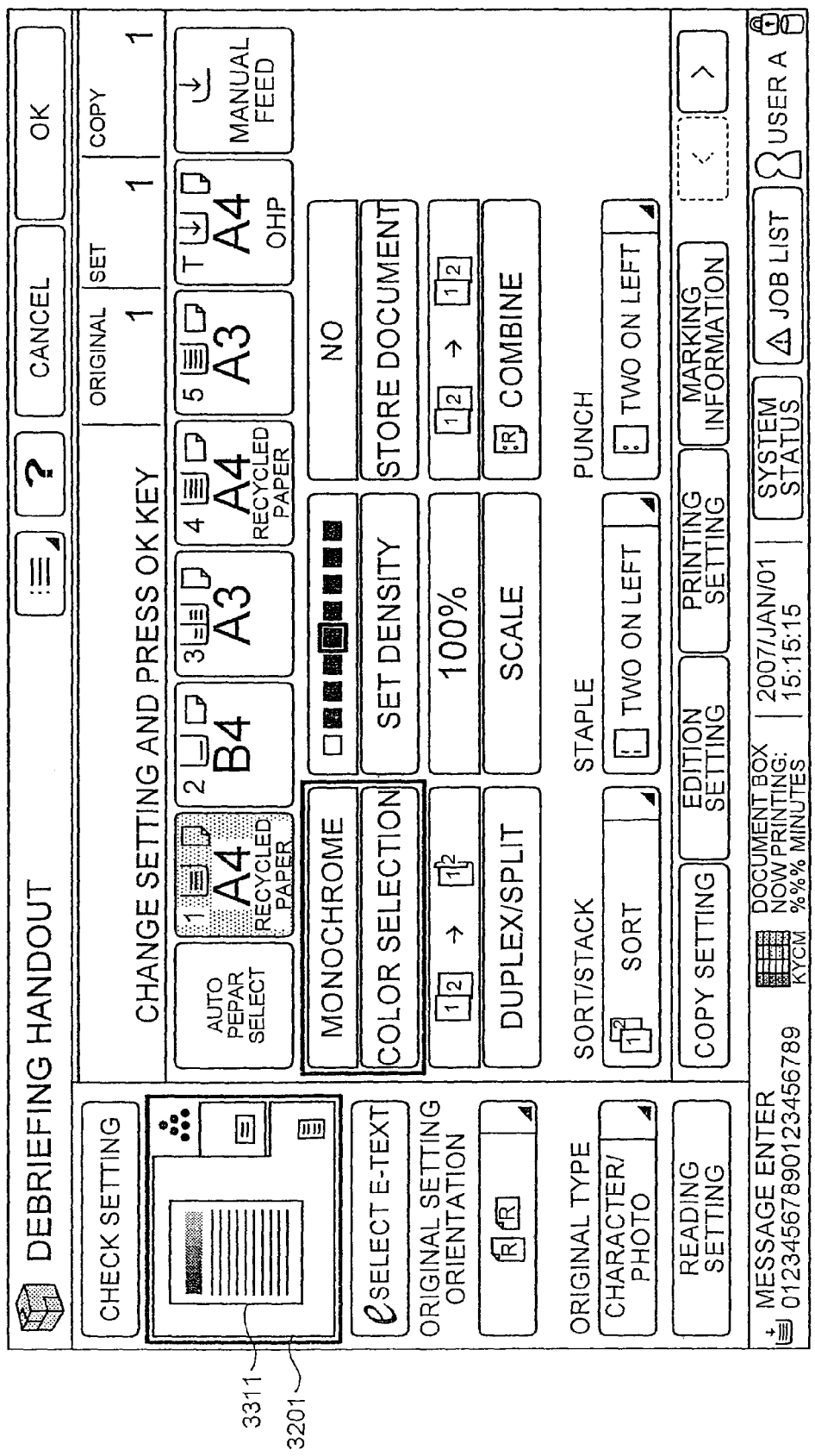
FIG. 33 is another example of the detailed setting screen according to the modification.

FIG. 33 is an example of the detailed setting screen displayed when color selection, which is one of the displayed setting items in FIG. 32, is changed from "Full color" to "Monochrome". As shown in FIG. 33, when the setting is changed, a preview image 3311 indicating a result of image processing according to the changed settings is displayed in the preview-image display area 3201.

Figure 34:
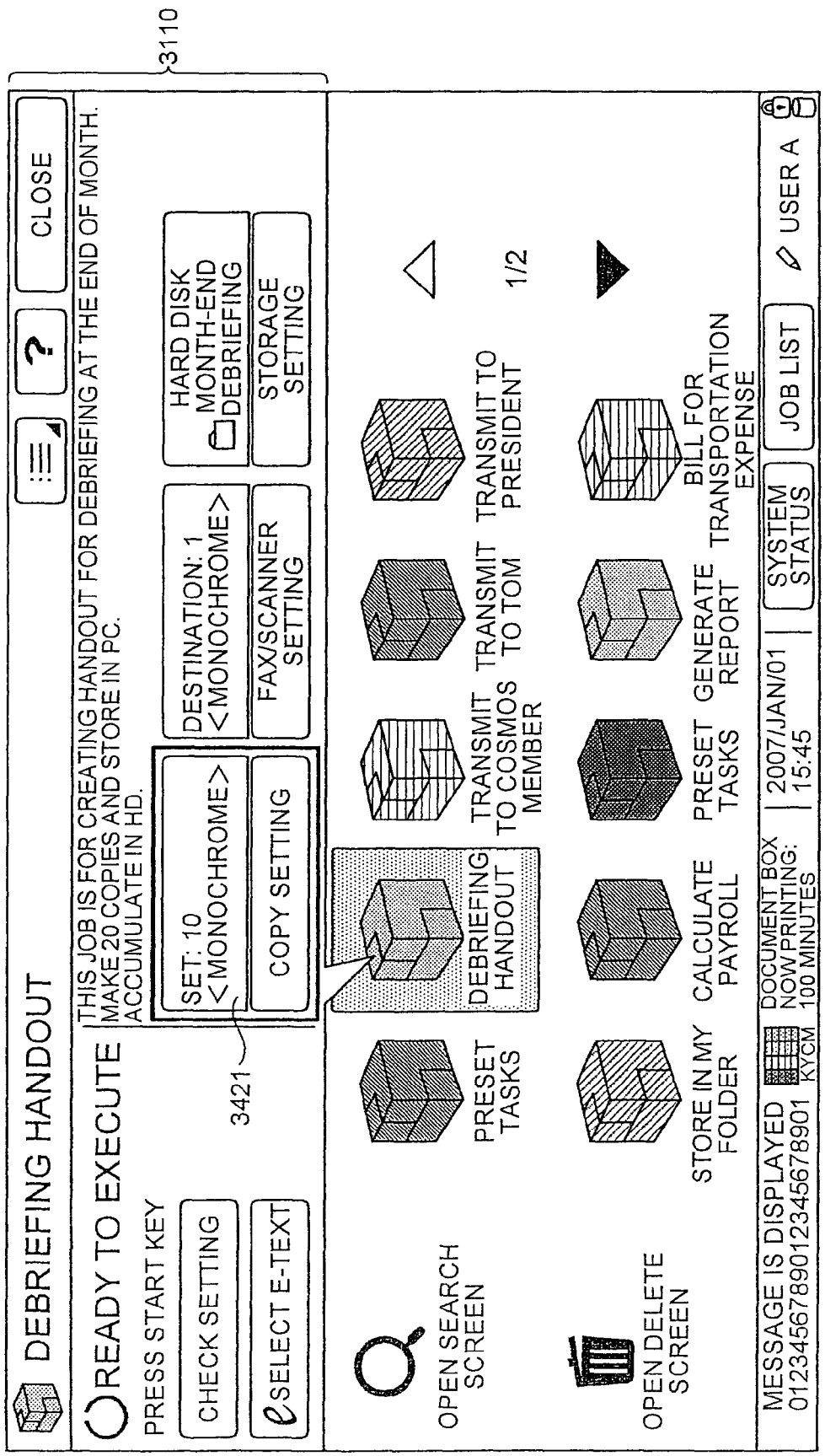
FIG. 34 is another example of the routine work screen according to the modification.

FIG. 34 is an example of the routine work screen displayed when the OK button is pressed on the screen as shown in FIG. 33. As shown in FIG. 34, when the setting item is changed, details displayed in the display area 3110 are updated with overview information 3421 indicating an overview of the changed setting item. More specifically, "Full color" in the overview information is updated with "Monochrome" according to the change in the color selection.

Figure 35:
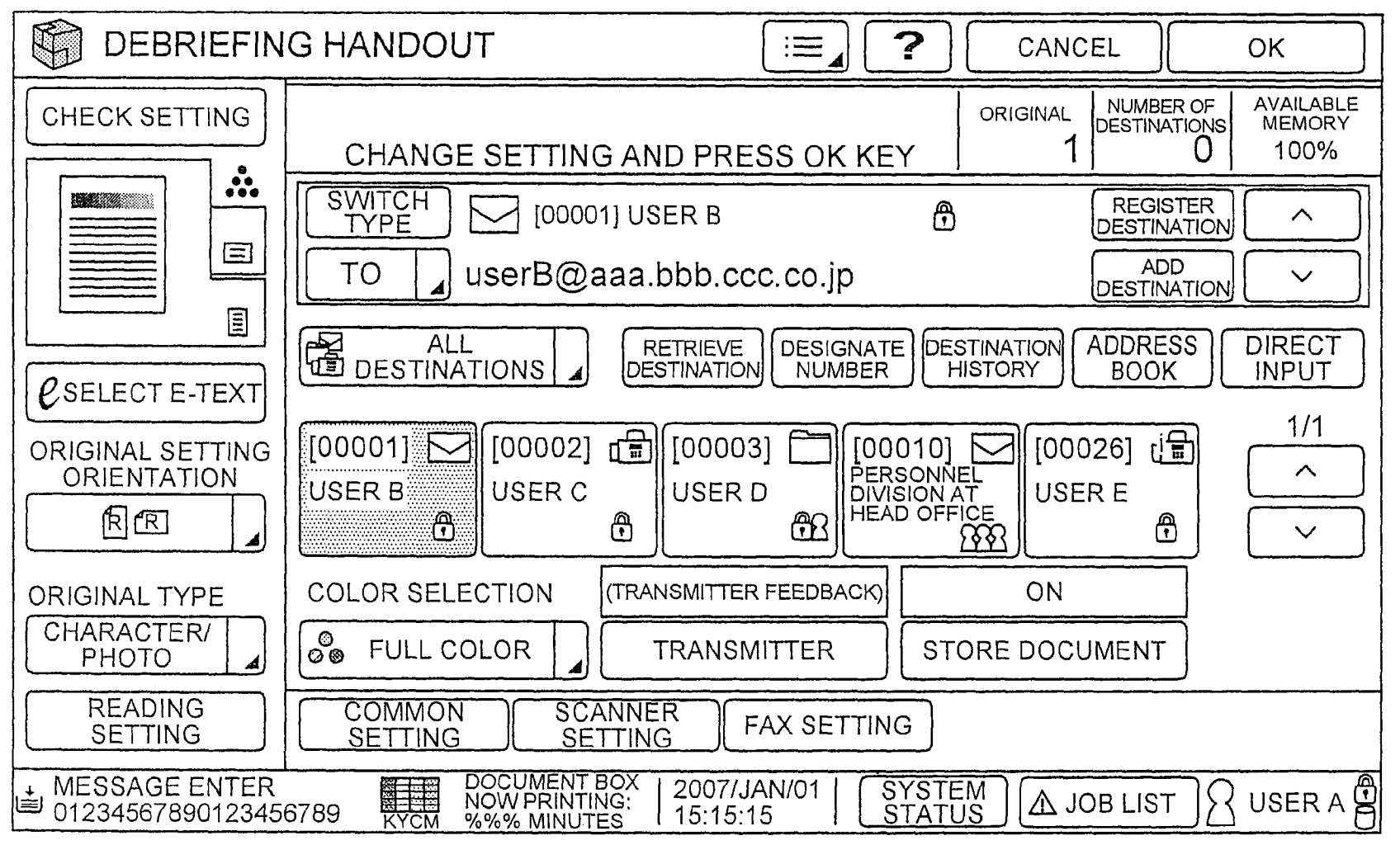

FIG. 35 is an example of the detailed setting screen displayed when the setting button 3112 corresponding to a fax/scanner function (fax/scanner application) is pressed on the screen as shown in FIG. 31. The fax/scanner function corresponds to the transmitting function in the first embodiment. FIG. 35 is an example where only a user B is designated as a destination of the transmission.

Figure 36:
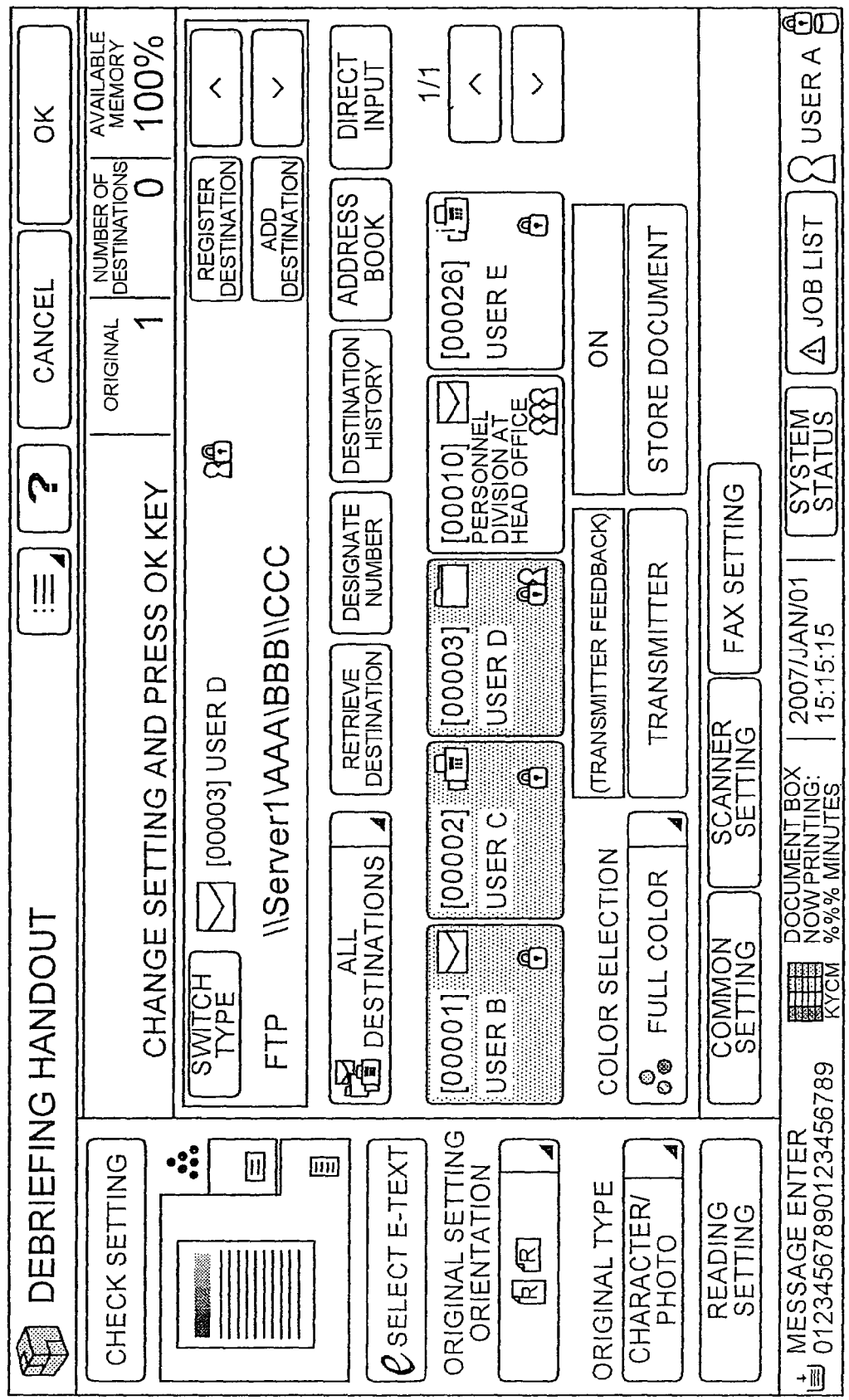
FIG. 36 is still another example of the detailed setting screen according to the modification.

FIG. 36 is an example of the detailed setting screen displayed when users are added as destinations. FIG. 36 is an example where users C and D are added as the destinations of the transmission.

Figure 37:
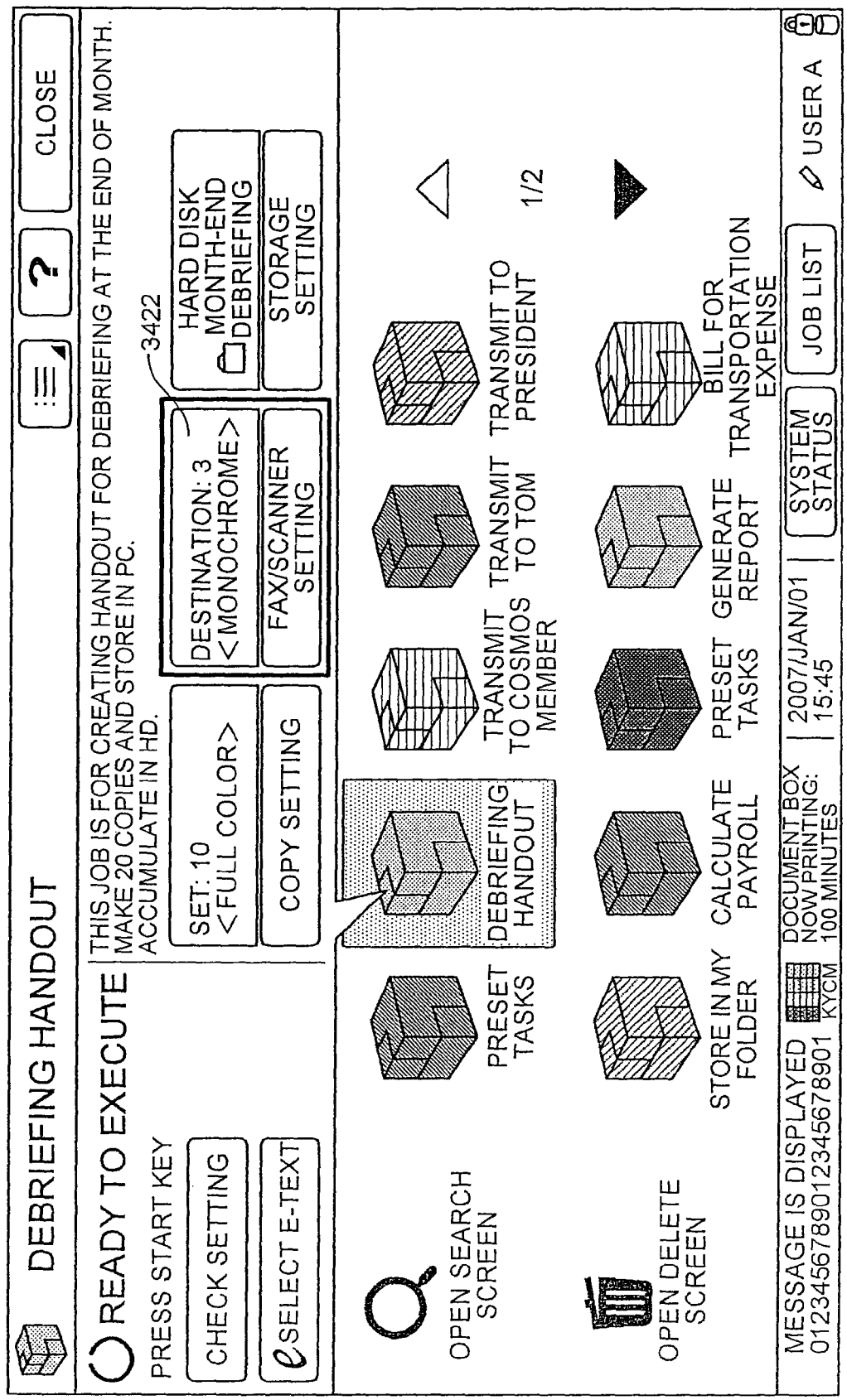
FIG. 37 is still another example of the routine work screen according to the modification.

FIG. 37 is an example of the routine work screen displayed when the OK button is pressed on the screen as shown in FIG. 36. As shown in FIG. 37, when the setting item is changed, the details displayed in the display area 3110 are updated with overview information 3422 indicating an overview of the changed setting item. More specifically, "Destination: 1 " in the overview information is updated with "Destination: 3" based on the addition of the destinations.

Figure 38:
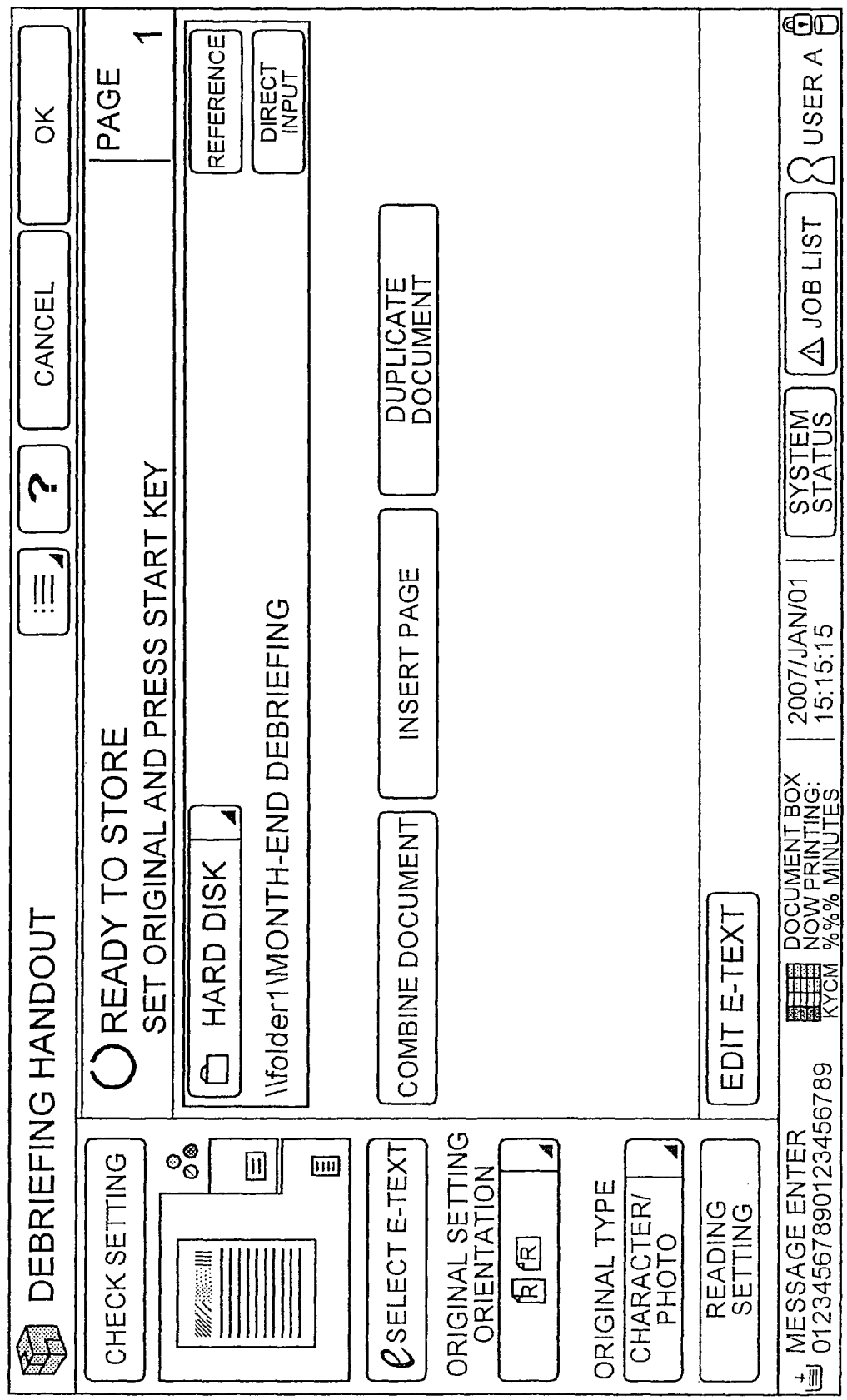
FIG. 38 is still another example of the detailed setting screen according to the modification.

FIG. 38 is an example of the detailed setting screen displayed when the setting button 3113 corresponding to the storage function (storage application) on the screen as shown in FIG. 31 is pressed. As shown in FIG. 38, in the storage function (storage application), a setting item for specifying a medium as a storage destination in which a document is stored, and the like are displayed on the detailed setting screen.

Figure 39:
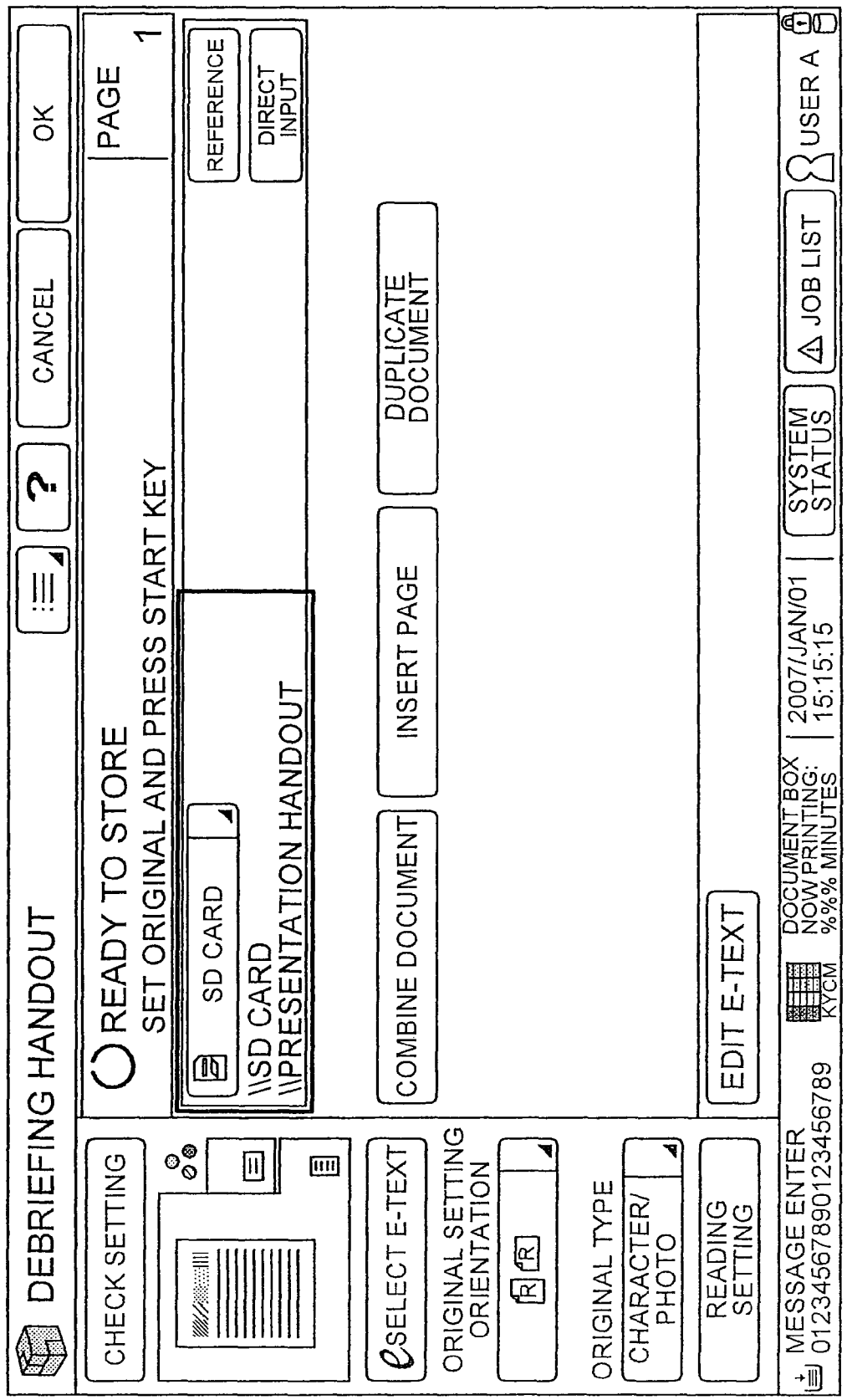
FIG. 39 is still another example of the detailed setting screen according to the modification.

FIG. 39 is an example of the detailed setting screen displayed when the storage destination is changed. FIG. 39 is an example where the storage destination is changed from "hard disk drive" to "secure digital (SD) card".

Figure 40:
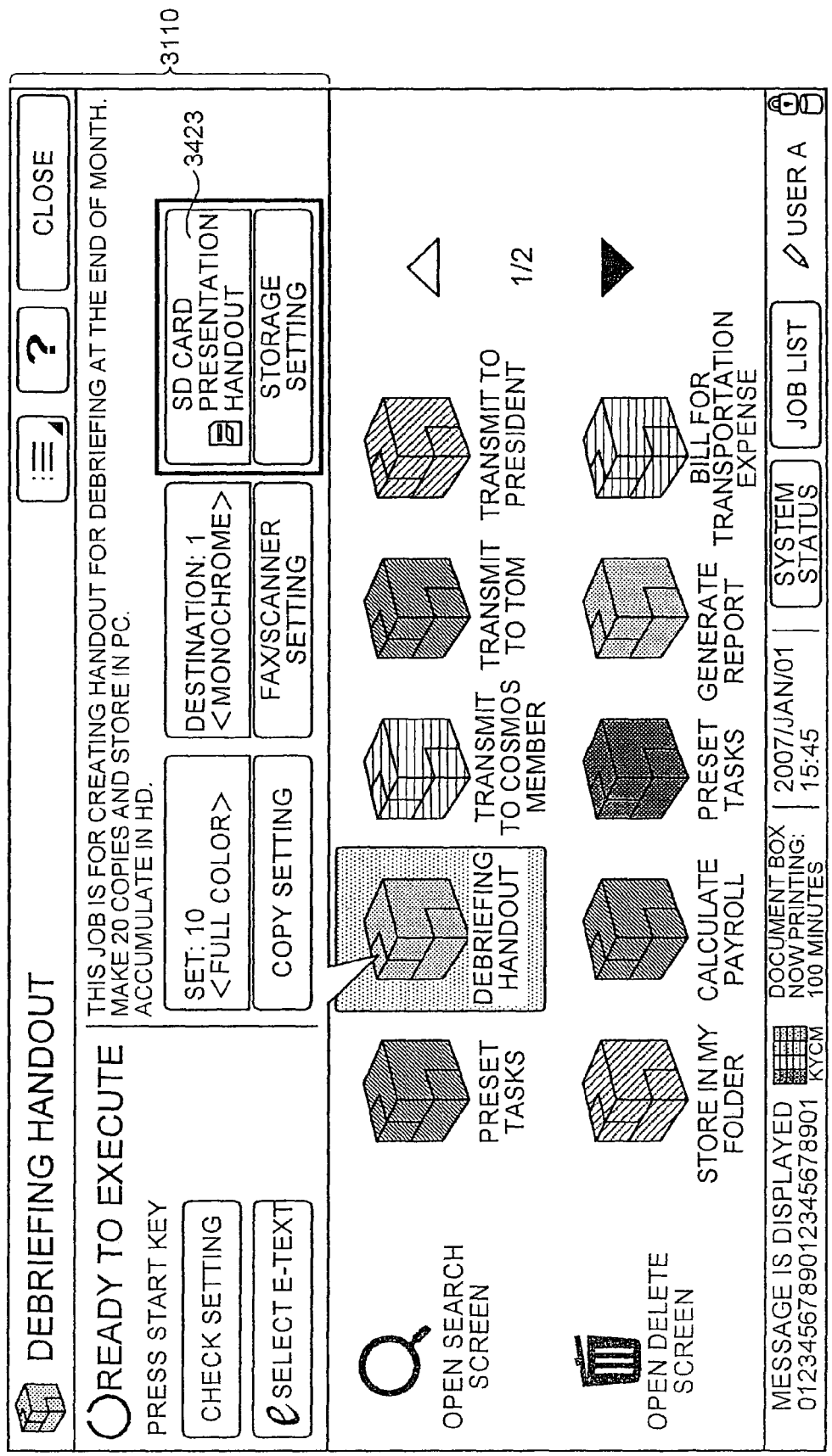
FIG. 40 is still another example of the routine work screen according to the modification.

FIG. 40 is an example of the routine work screen displayed when the OK button is pressed on the screen as shown in FIG. 39. As shown in FIG. 40, when the setting item is changed, details displayed in the display area 3110 are updated with overview information 3423 indicating an overview of the changed setting item. More specifically, "Hard disk, Month-end debriefing" in the overview information is updated with "SD card, Presentation handout" according to the change of the storage destination.

The names or icons of the jobs registered on the routine work screen, etc., and functions (applications) to be used in the jobs can be set by the user at registration of the jobs. The user can change the names or icons of the jobs after the registration of the jobs.

Figure 41:
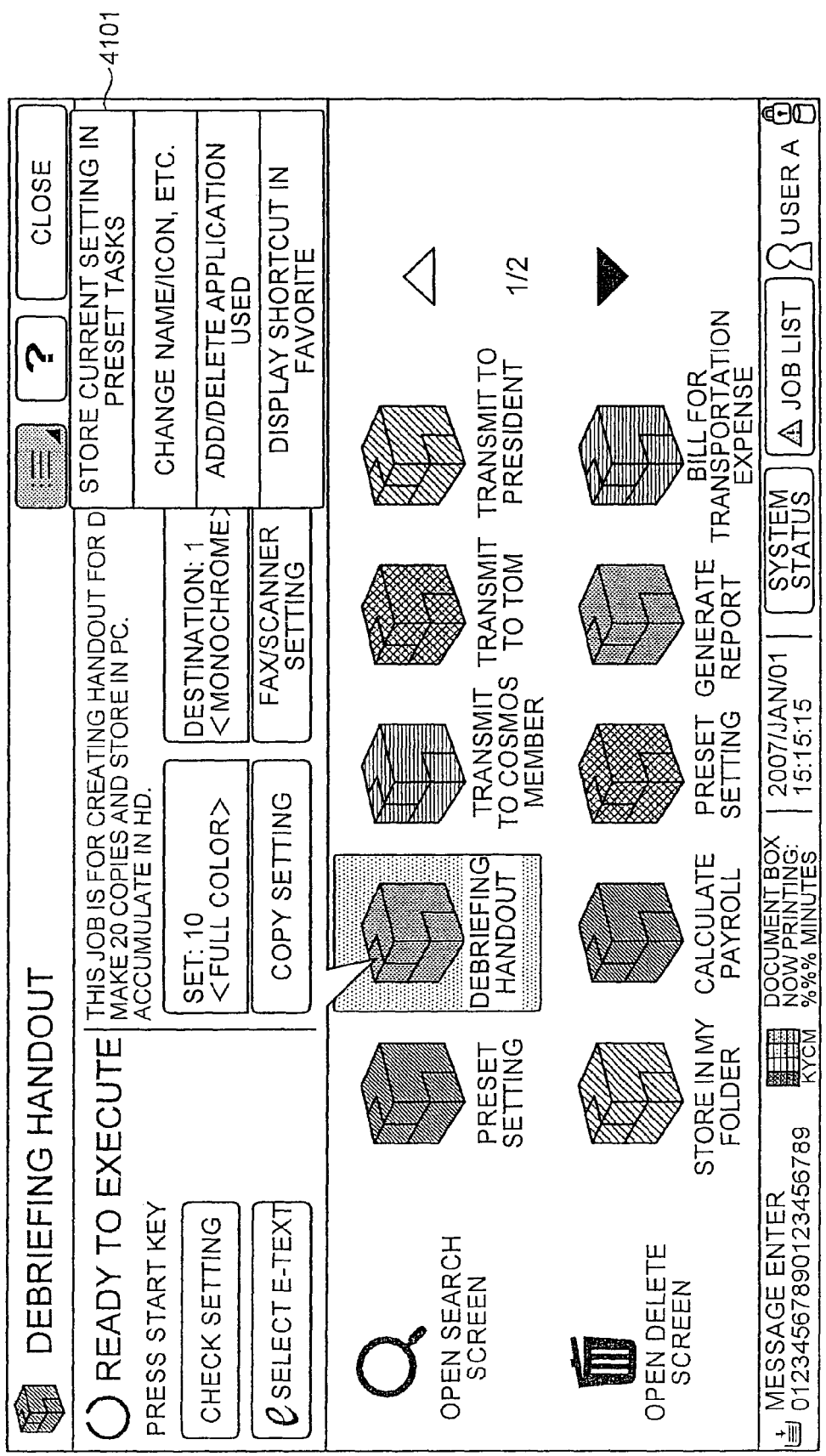
FIG. 41 is still another example of the routine work screen according to the modification.

FIG. 41 is an example of the debriefing handout screen displayed when the universal menu key 3131 is pressed on the routine work screen as shown in FIG. 31. As shown in FIG. 41, upon pressing of the universal menu key 3131, a menu 4101 for registering or changing a routine work is displayed at the upper-right corner of the routine work screen. When "Display shortcut in Favorite" in the menu 4101 is selected, a shortcut icon for directly accessing a currently displayed screen is added on the favorite screen. Details of the shortcut icon are explained later.

FIG. 42 is an example of a routine-work registration screen displayed when "Change name/icon etc." in the menu 4101 is selected. As shown in FIG. 42, on the routine-work registration screen, an icon to be assigned to a job, the name of the job, a comment to be attached thereto, and the like can be specified.

Figure 43:
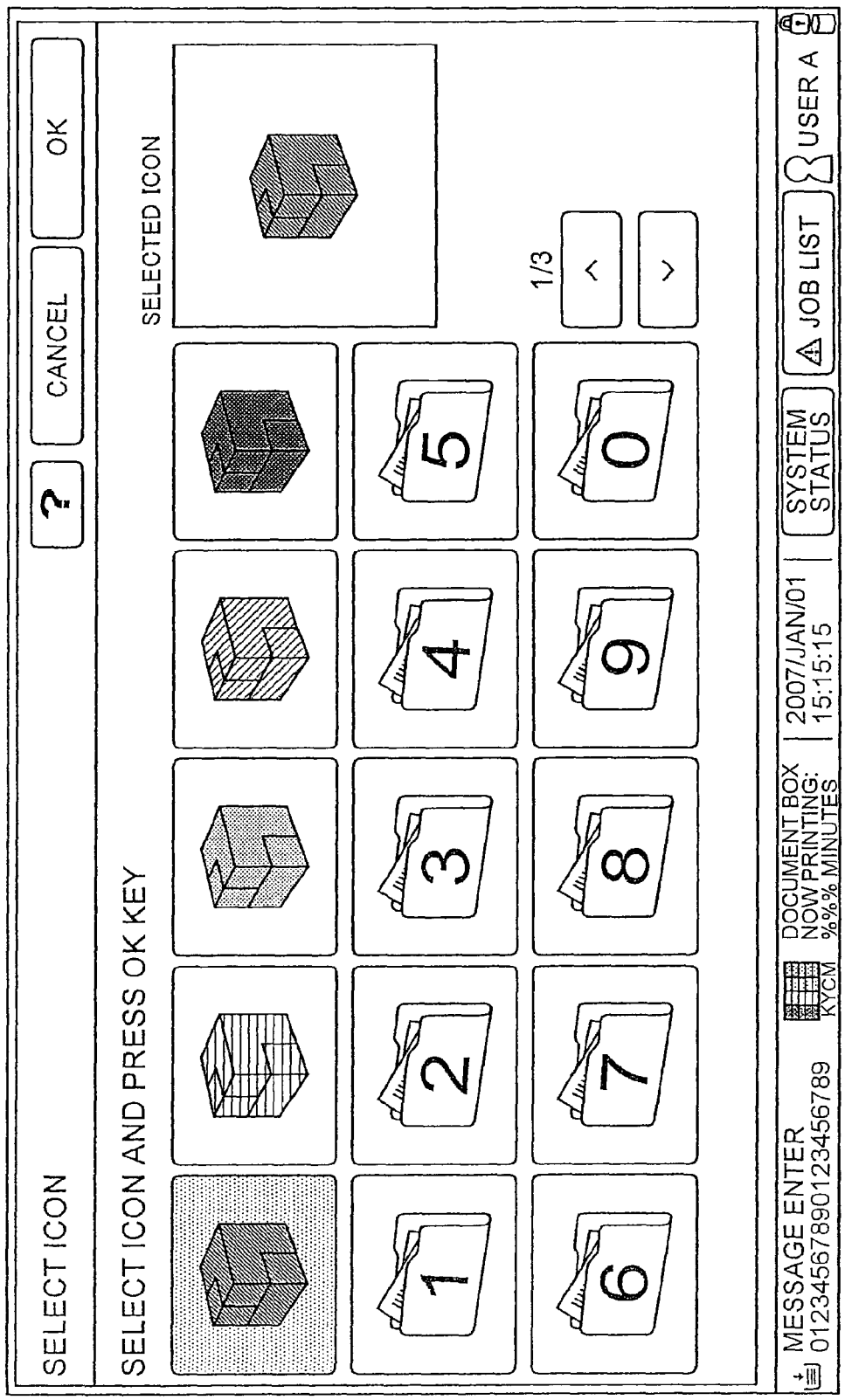
FIGS. 43 to 45 are examples of an icon selection screen.
Figure 44:
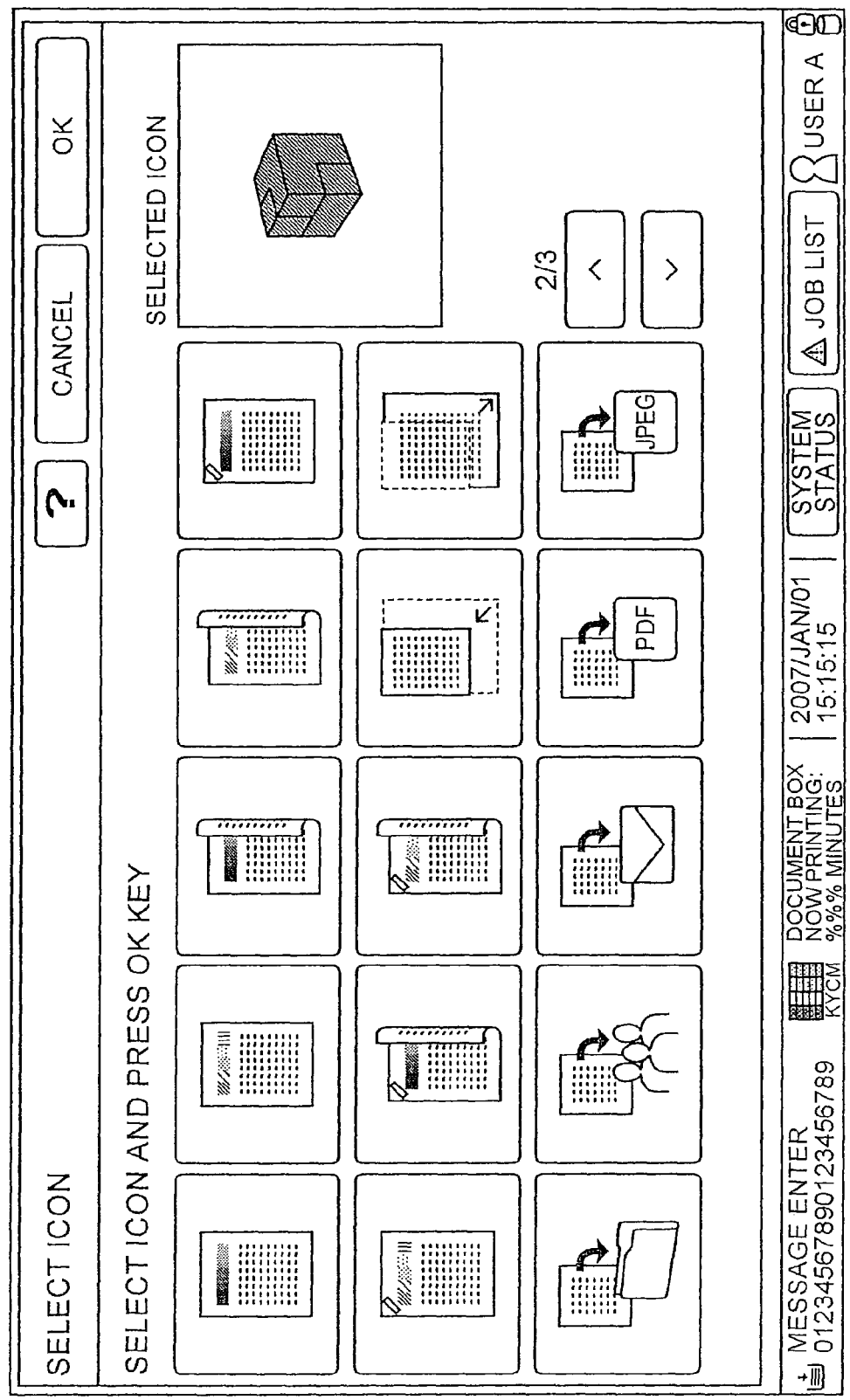
Figure 45:
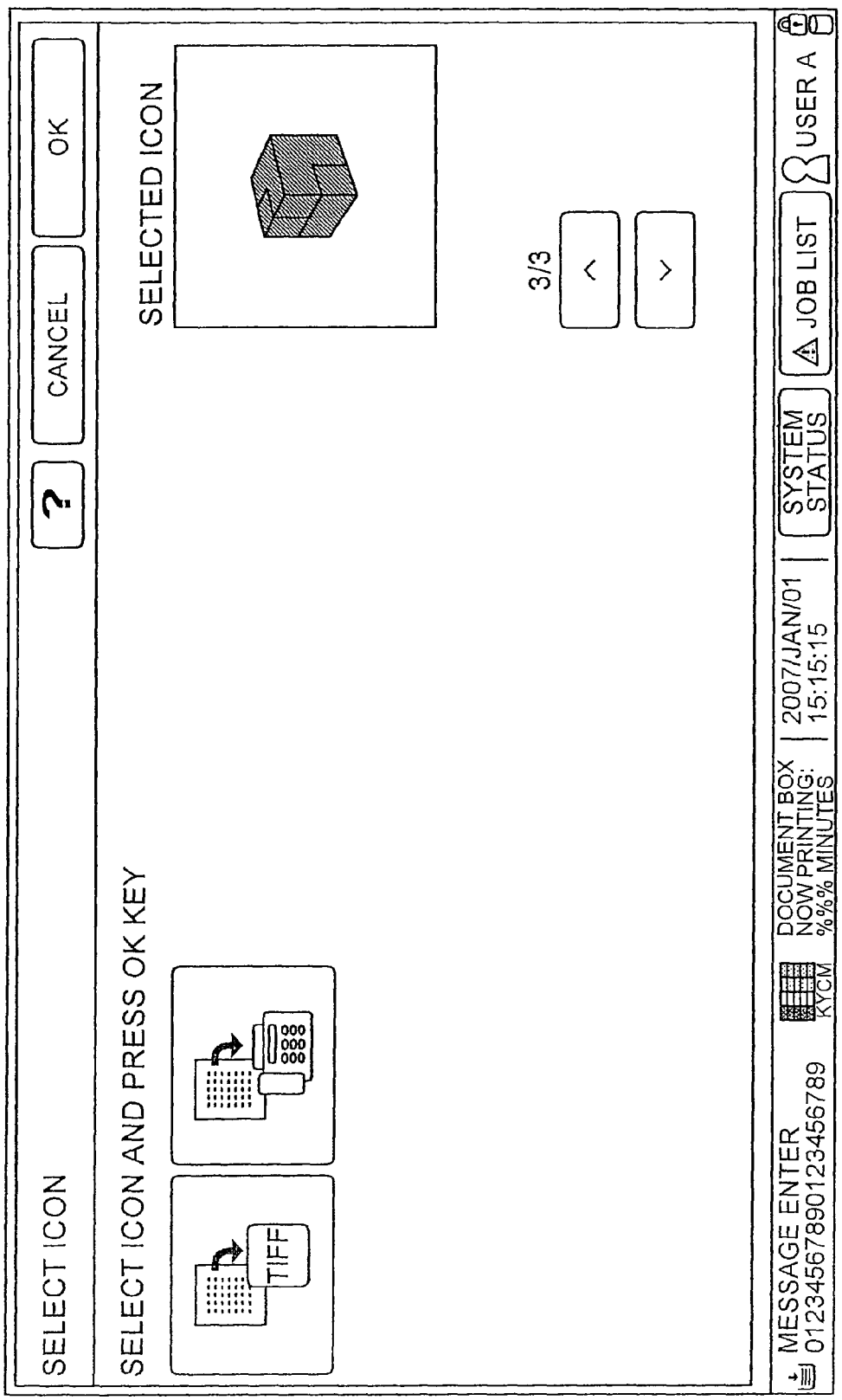

FIGS. 43 to 45 are examples of an icon selection screen displayed when an icon selecting button is pressed on the screen shown in FIG. 42. As shown in FIG. 43, icons in the form of blocks having different colors, or icons in the form of numbered folders can be assigned to jobs. As shown in FIGS. 44 and 45, icons that conjure up setting details (hereinafter, "set value icons") can be also assigned to the jobs.

In FIG. 44, set value icons corresponding to monochrome copy, color copy, monochrome duplexing, color duplexing, and monochrome copy stapled are displayed from left to right in the upper portion of the screen. From left to right in the middle of the screen, set value icons corresponding to color copy stapled, monochrome duplexing stapled, color duplexing stapled, reduction, and enlargement are displayed. From left to right in the lower portion of the screen, set value icons corresponding to scanning to folder, group transmission, scanning to e-mail, transmission in portable document format (PDF), and transmission in Joint Photographic Experts Group (JPEG) format are displayed. In FIG. 45, set value icons corresponding to transmission in tag image file format (TIFF) and facsimile transmission are displayed from left to right in the upper portion of the screen.

Instead of selecting an icon by the user on the icon selection screen as shown in FIGS. 43 to 45, the MFP 1 can be adapted to select an icon corresponding to the setting details.

Figure 46:
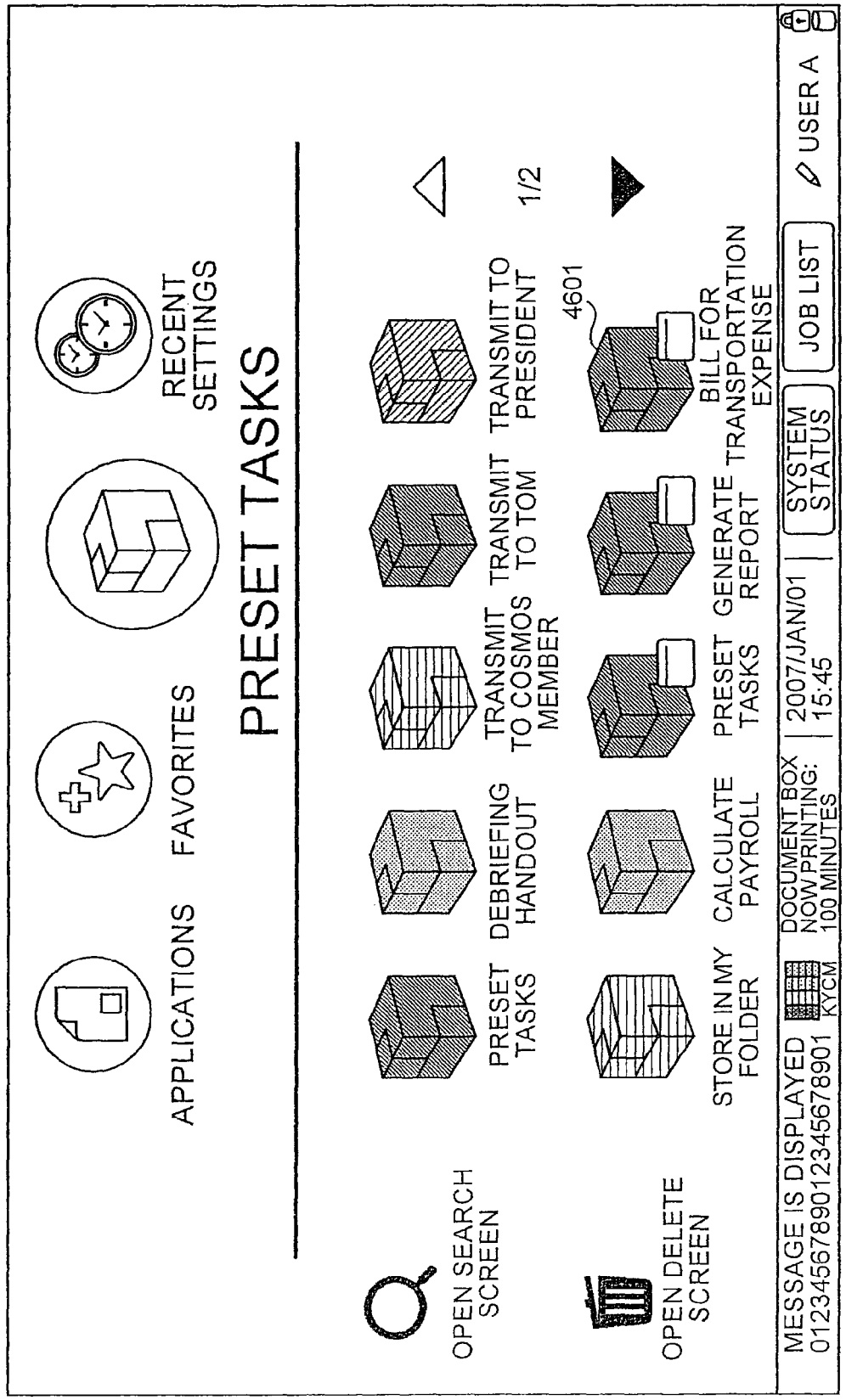
FIGS. 46 to 48 are other examples of the routine work screen according to the modification.
Figure 47:
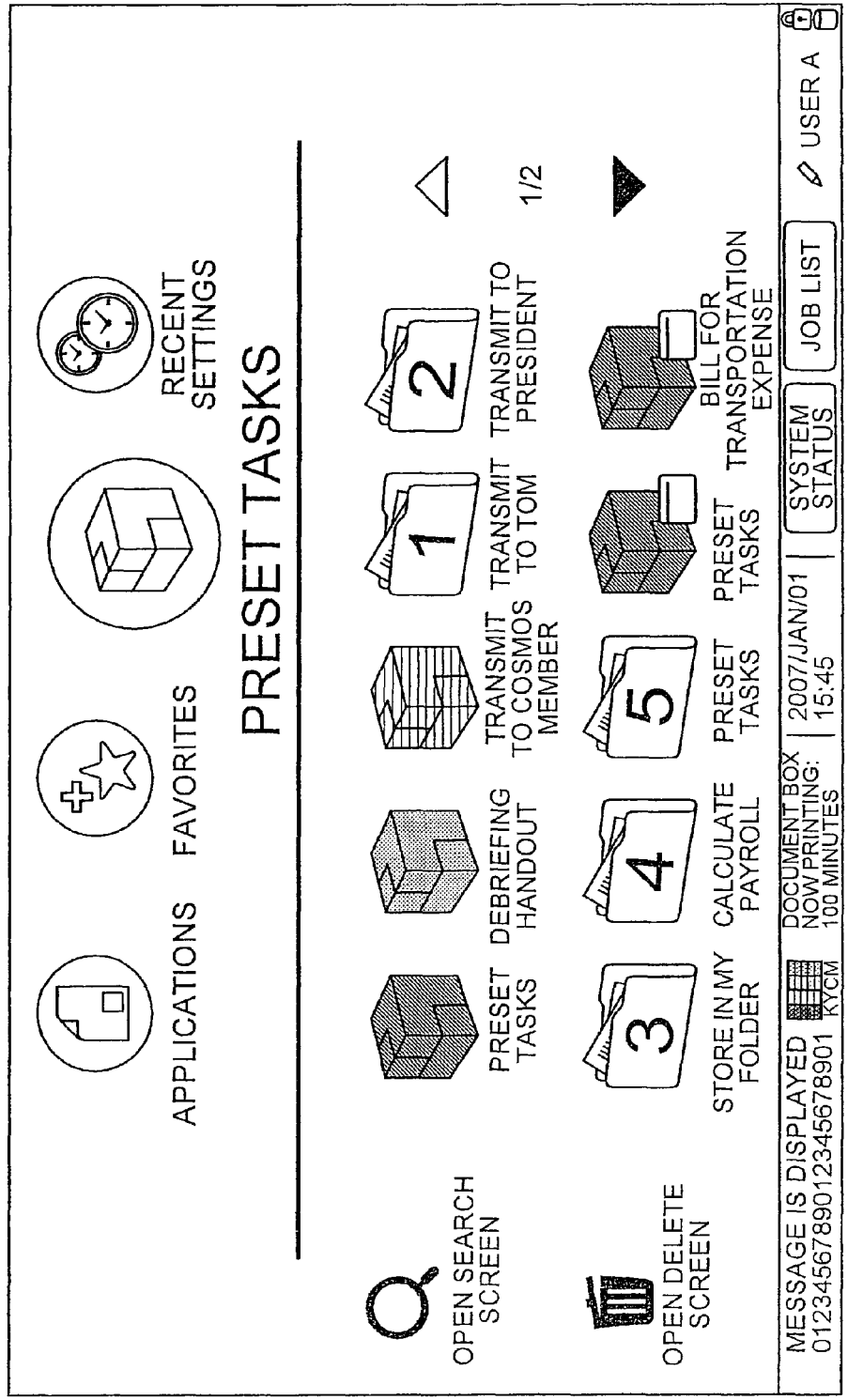
Figure 48:
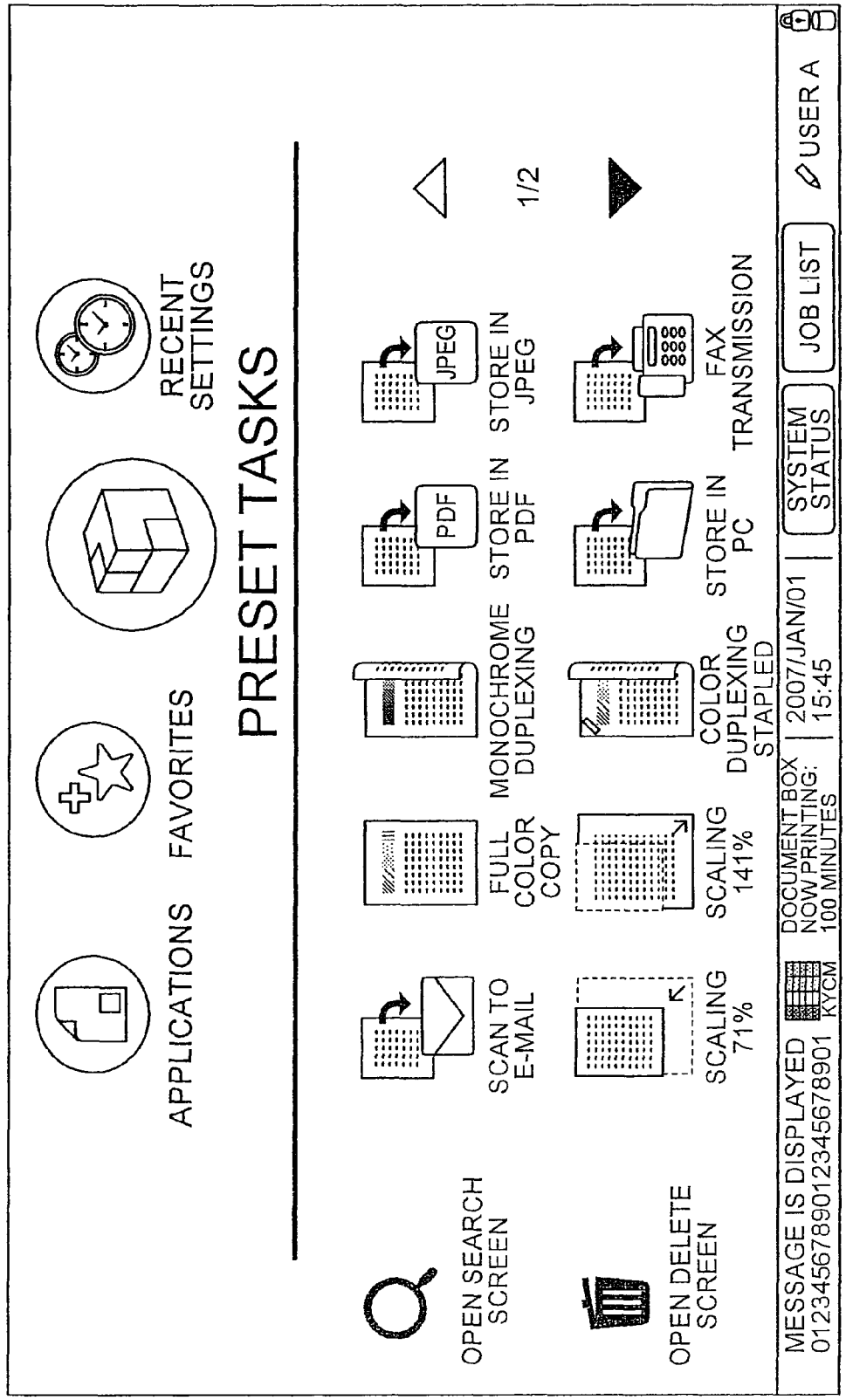
Figure 49:
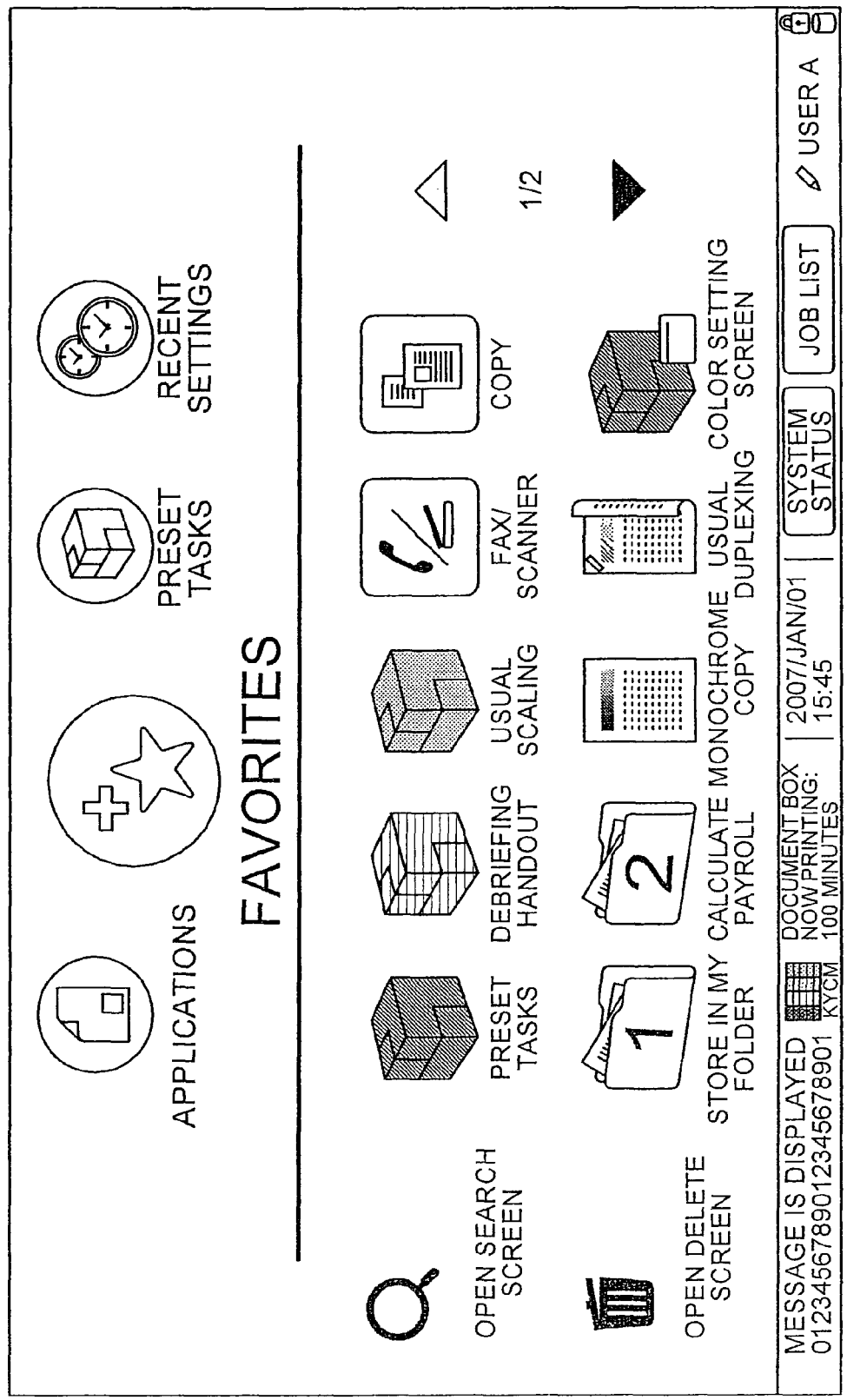
FIGS. 49 to 52 are other examples of the favorite screen according to the modification.
Figure 50:
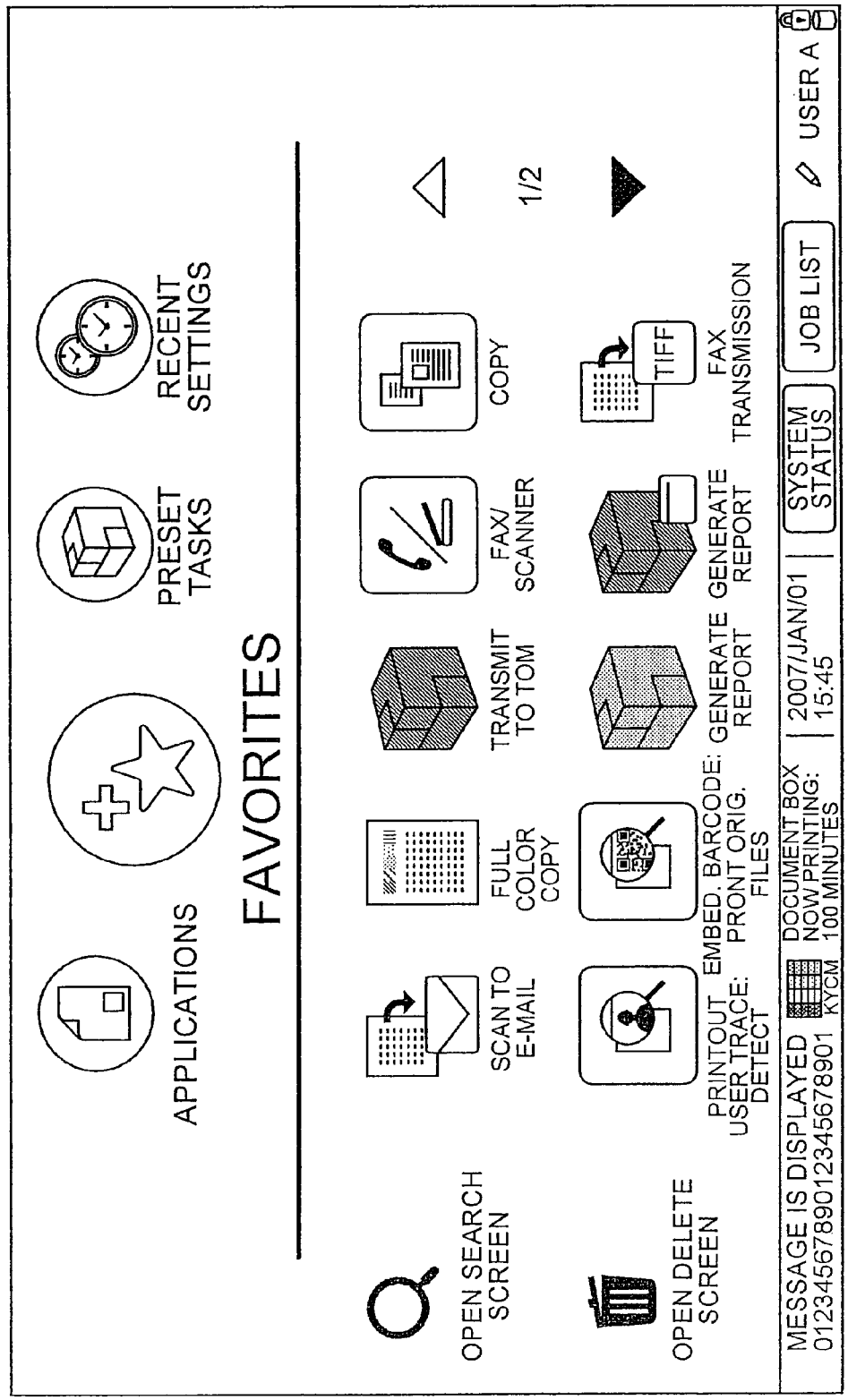
Figure 51:
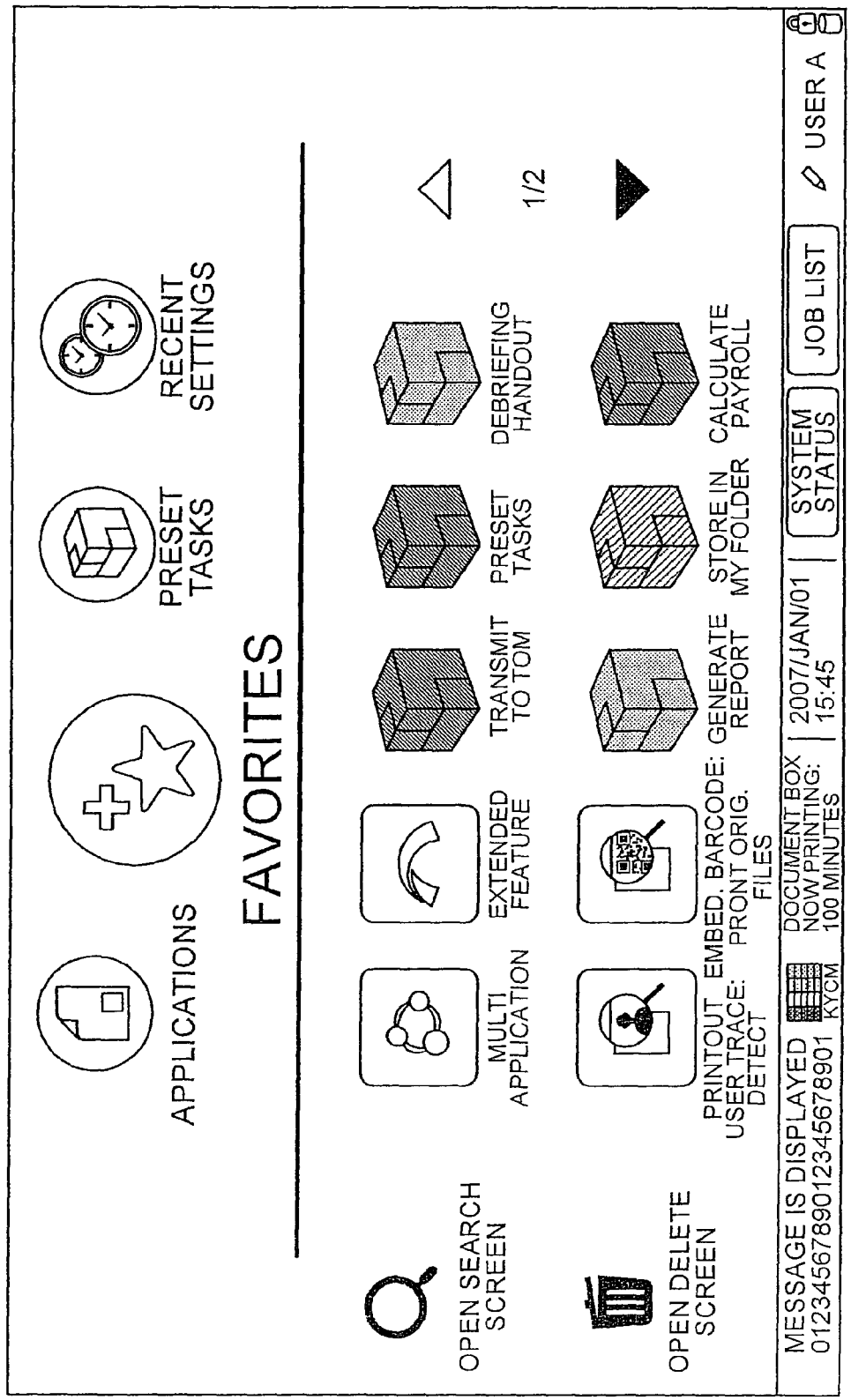
Figure 52:
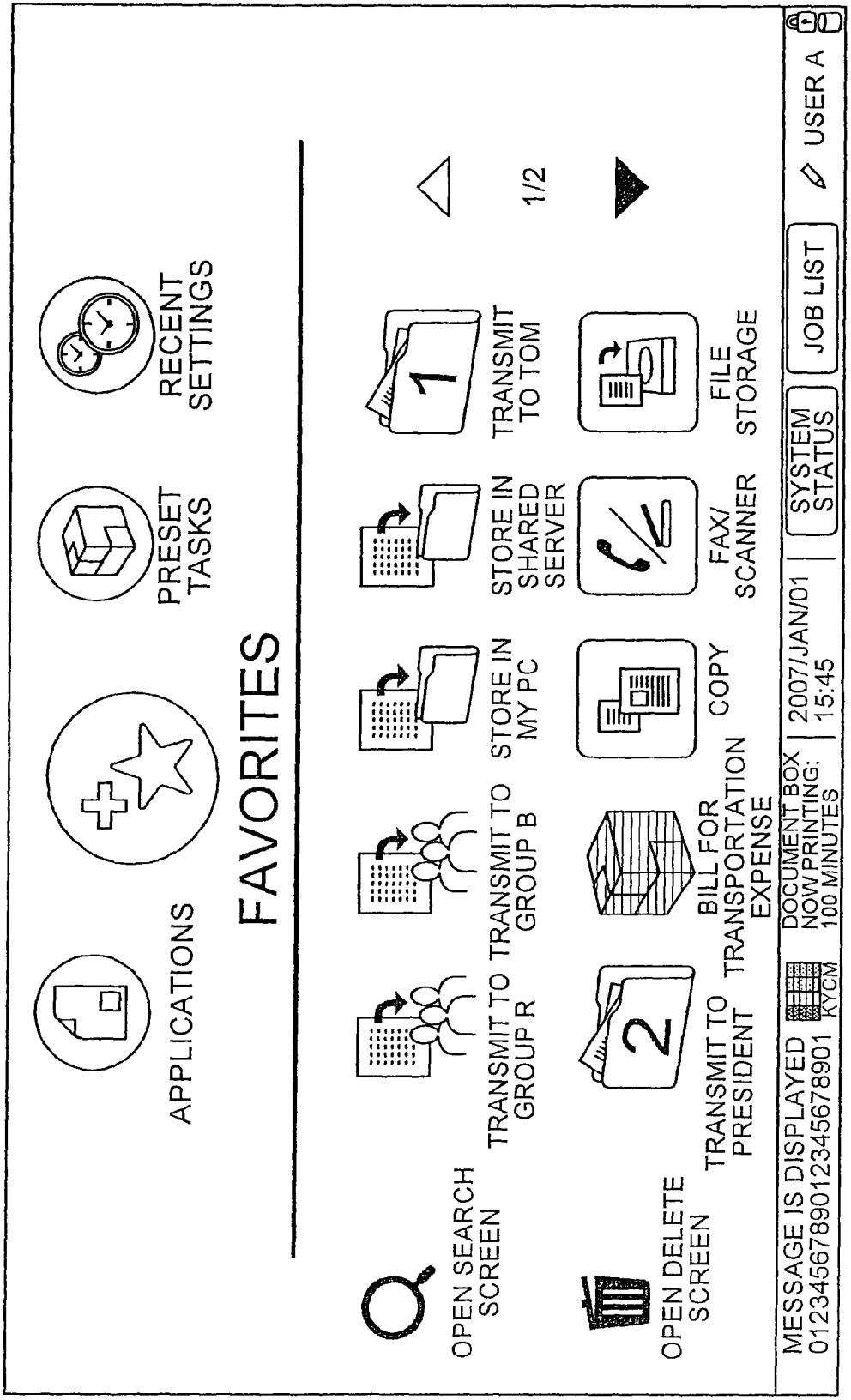

FIGS. 46 to 48 are examples of the routine work screen including jobs that are assigned with various icons. FIG. 46 is an example of the routine work screen including icons in the form of blocks, and shortcut icons. As shown in FIG. 46, a shortcut icon 4601 has a form attached with a rectangle so as to be distinguished from other icons.

FIG. 47 is an example of the routine work screen including icons in the form of numbered folders. FIG. 48 is an example of the routine work screen including only set value icons.

FIGS. 49 to 52 are example of the favorite screen including jobs that are assigned with various icons. As shown in FIGS. 49 to 52, also the favorite screen can include icons indicating jobs and applications designated by the user, to which various icons are assigned.

Figure 53:
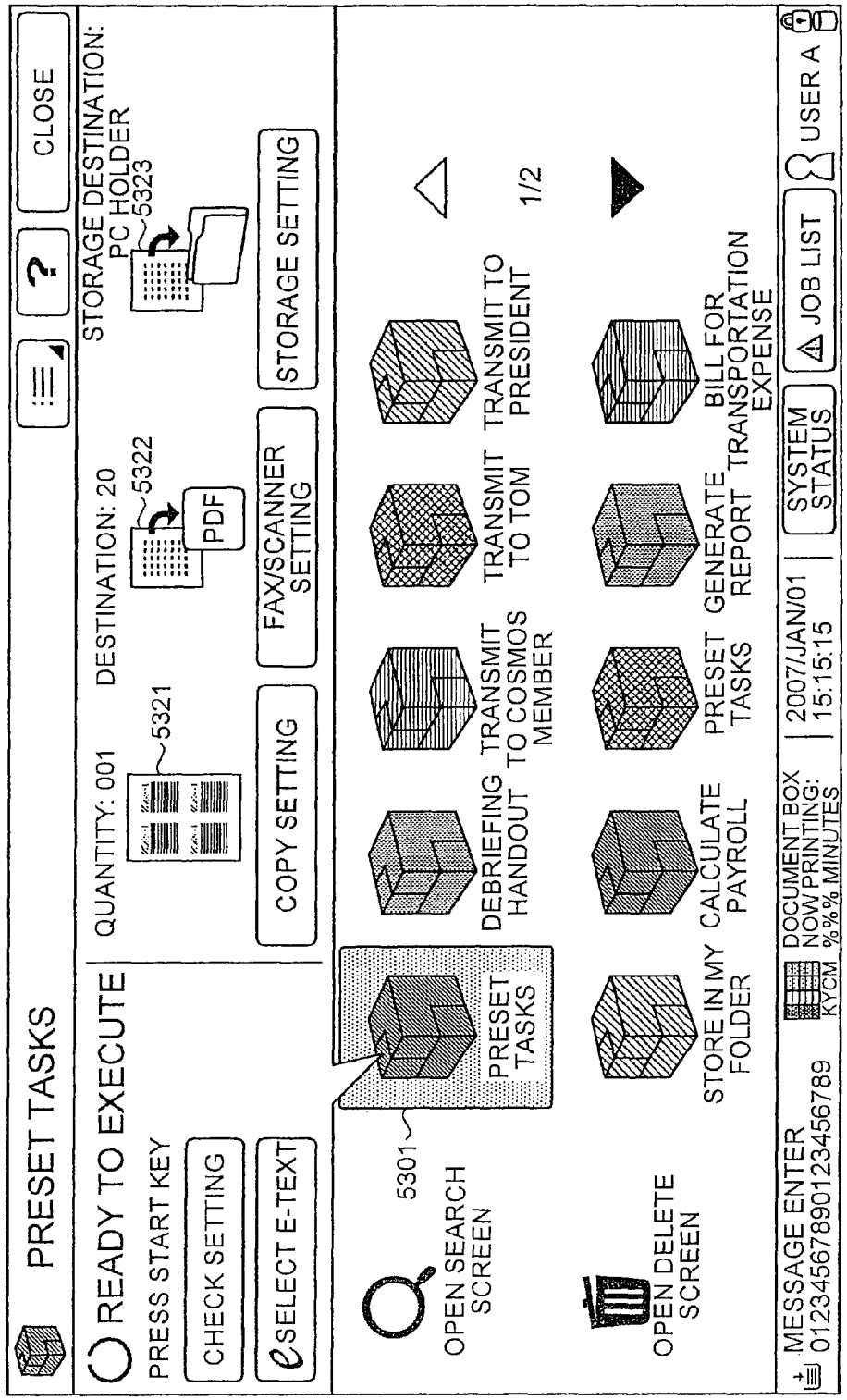
FIG. 53 is still another example of the routine work screen.

FIG. 53 is another example of the routine work screen. FIG. 53 is an example of the routine work screen displayed when a job key 5301 corresponding to a job "Routine work" is pressed. In FIG. 53, overview information 5321 to 5323 in the form of icons indicating overviews of setting details of the functions (applications) is displayed, instead of the overview information 3121 to 3123 in the form of text as shown in FIG. 31.

Figure 54:
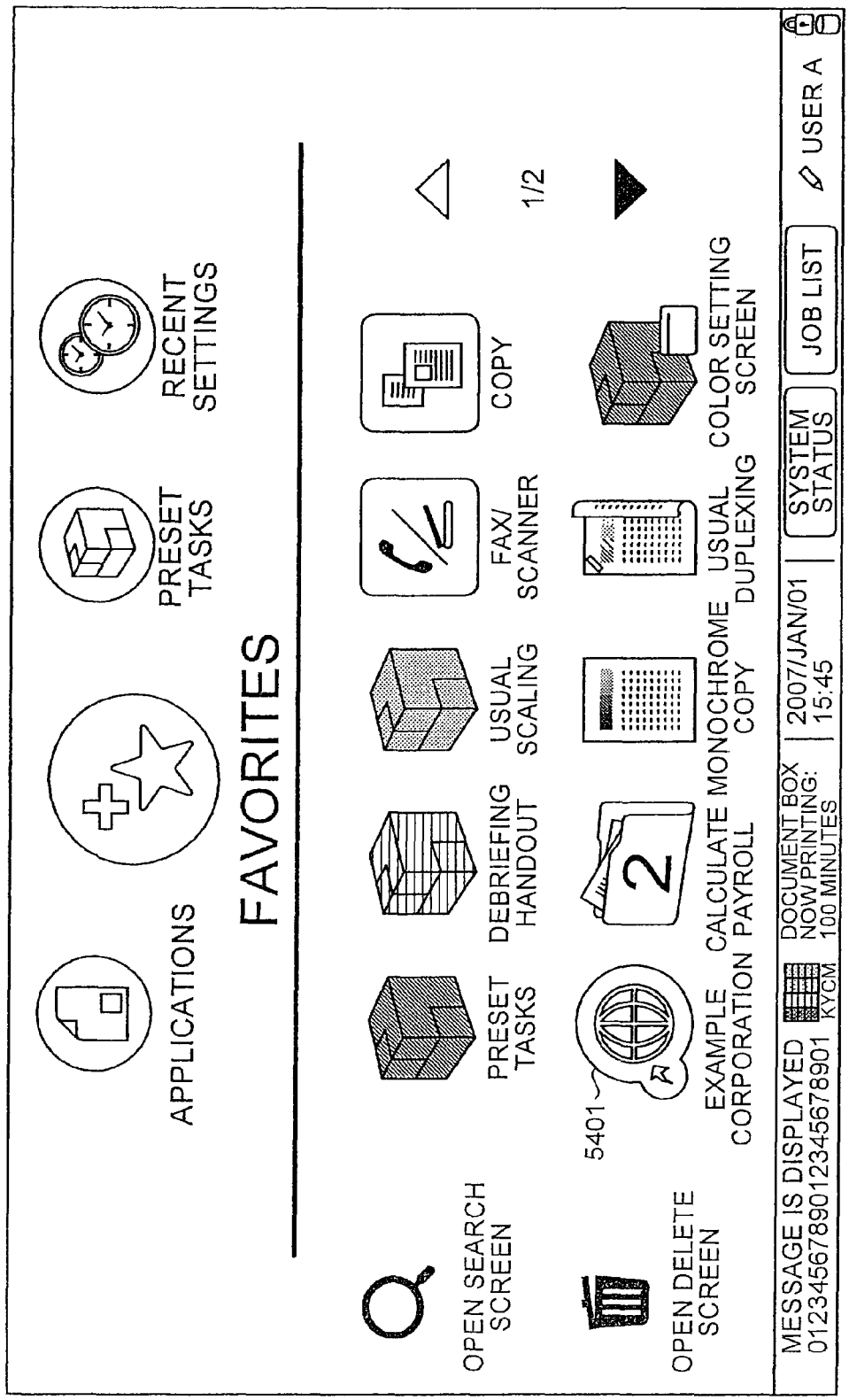
FIG. 54 is still another example of the favorite screen.

FIG. 54 is another example of the favorite screen. FIG. 54 is an example in which an icon 5401 for activating a browser that enables the display of a linked page previously designated. In this way, the display processing unit 101 can be adapted to display an icon for activating a browser so that the browser is activated to display the linked page when the icon is designated.

Figure 55:
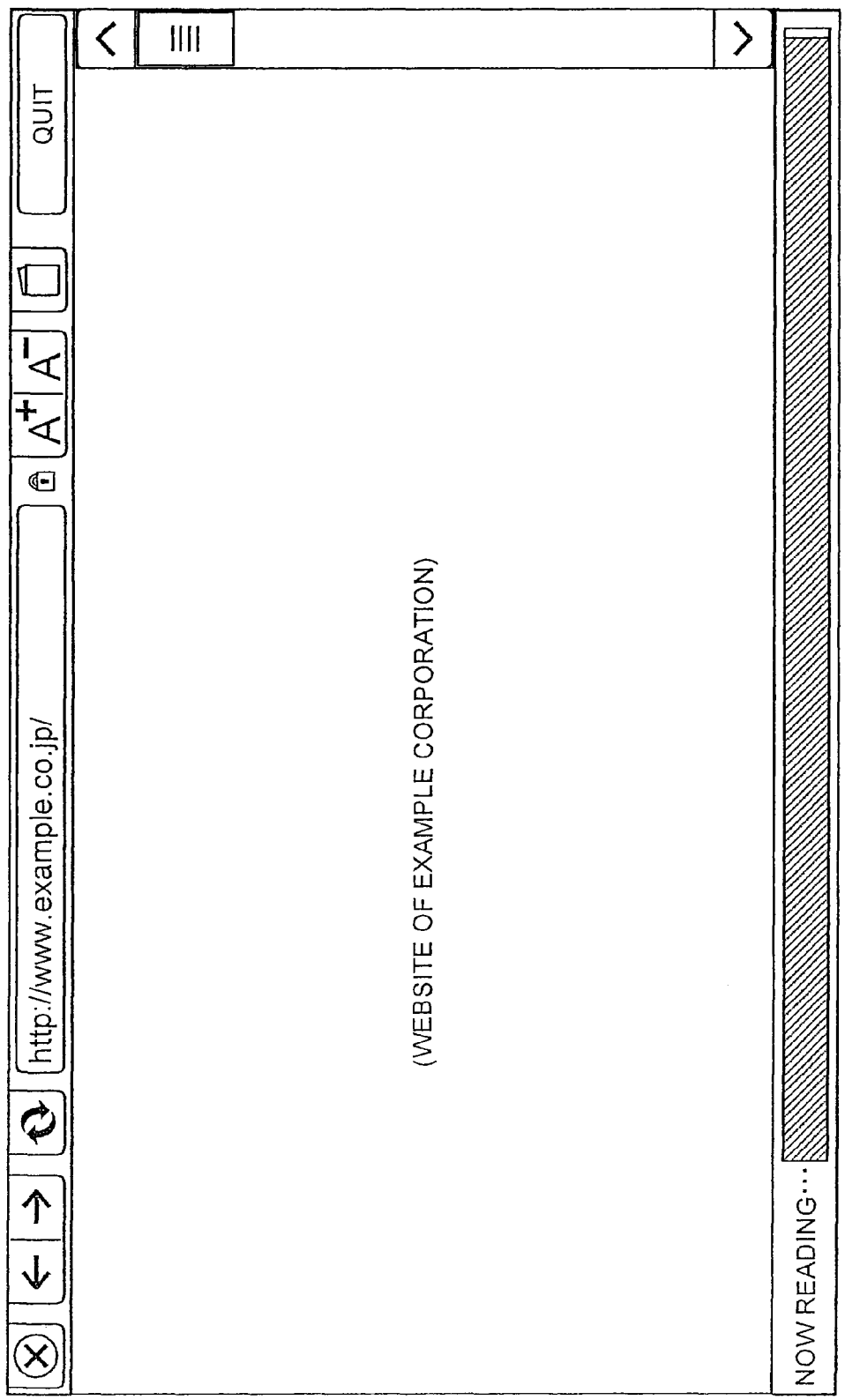
FIG. 55 is an example of a browser screen.

FIG. 55 is an example of a browser screen displayed when the icon 5401 is pressed on the screen as shown in FIG. 54. FIG. 55 is an example of the browser screen that displays a website of "Example Corporation", represented by "www.example.co.jp" as a linked page previously designated by the user.

As described above, in the display processing apparatus according to the modification, overviews of the setting details of the functions (applications) included in a job can be displayed associated with the corresponding functions (applications), respectively, in the same manner as in the first embodiment. Thus, details of plural image processes previously set can be easily checked on one screen. When the user that has checked the overviews of the applications designates the applications by pressing a start key, execution of the designated applications is started together as a group. When the settings of the applications are changed, the overview information is updated with the changed setting details, and updated overview information is displayed. Accordingly, the operability in executing plural image processes having different combinations of input and output forms can be enhanced.

The invention claimed is:

1. An image processing apparatus, comprising:
a designation receiving unit configured to receive a designation of a job key displayed on a screen and corresponding to plural applications having mutually different combinations of an input format of image data and an output format of the image data;
an overview information display processing unit configured to display an overview screen showing overview information indicating an overview of setting details of each application of the plural applications, wherein the overview information display processing unit is configured to display the job key in a manner that indicates a selected state, and to display a balloon lead line that indicates that the job key is related to the overview screen;
a request receiving unit configured to receive a setting request for requesting a change in the setting details of a selected application of the plural applications;
a detailed setting screen display processing unit configured to display a detailed setting screen for checking or changing setting items of the selected application, when the request receiving unit receives the setting request for requesting a change in the setting details of the selected application;
a display updating unit configured to update, in the overview screen, the overview information of the selected application for which the setting request is received with the setting details changed on the detailed setting screen; and
an execution processing unit configured to collectively execute the designated plural applications together as a single job.

2. The image processing apparatus according to claim 1, wherein the designation receiving unit is configured to receive the designation of the plural applications from among a first plurality of applications, wherein, in each of the designated applications, the image data is inputted in at least one input format and is outputted in at least one output format.

3. The image processing apparatus according to claim 1, wherein the execution processing unit is configured to start execution of a first application contained in the plural designated applications, and then to start execution of a second application contained in the plural designated applications, depending on execution conditions of the first application.

4. The image processing apparatus according to claim 3, wherein the execution processing unit is configured to start execution of the second application during the execution of the first application.

5. The image processing apparatus according to claim 3, wherein the execution processing unit is configured to start execution of the second application after completing the execution of the first application.

6. The image processing apparatus according to claim 1, wherein the execution processing unit is configured to concurrently start execution of the plural designated applications.

7. The image processing apparatus according to claim 1, wherein when the setting request is received, the detailed setting screen display processing unit displays the detailed setting screen for changing the setting details of the selected application for which the setting request is received, and the detailed setting screen includes a preview image indicating a result of processing according to the setting details.

8. The image processing apparatus according to claim 7, wherein if the setting details are changed, the detailed setting screen display processing unit updates the preview image according to a result of processing according to the changed setting details, and displays the updated preview image.

9. An image processing method, comprising:
receiving a designation of a job key displayed on a screen and corresponding to plural applications having mutually different combinations of an input format of image data and an output format of the image data;
displaying an overview screen showing overview information indicating an overview of setting details of each application of the plural applications, the displaying step including displaying the job key in a manner that indicates a selected state, and displaying a balloon lead line that indicates that the job key is related to the overview screen;
receiving a setting request for requesting a change in the setting details of a selected application of the plural applications;
displaying a detailed setting screen for checking or changing setting items of the selected application, when the setting request for requesting a change in the setting details of the selected application is received;
updating, in the overview screen, the overview information of the selected application for which the setting request is received with the setting details changed on the detailed setting screen; and
executing the plural designated applications in a collective manner as a single job on an information processing apparatus.

10. The image processing method according to claim 9, wherein the step of receiving the designation comprises receiving the designation of the plural applications from among a first plurality of applications, wherein, in each of the plural designated applications, the image data is inputted in at least one input format and is outputted in at least one output format.

11. The image processing method according to claim 9, wherein the executing step comprises starting execution of a first application contained in the plural designated applications, and then starting execution of a second application contained in the plural designated applications, depending on execution conditions of the first application.

12. The image processing method according to claim 11, wherein the executing step comprises starting execution of the second application during the execution of the first application.

13. The image processing method according to claim 11, wherein the executing step comprises starting execution of the second application after completing the execution of the first application.

14. The image processing method according to claim 9, wherein the executing step comprises starting execution of the plural designated applications concurrently.

15. The image processing method according to claim 9, further comprising:
 displaying the detailed setting screen for changing the setting details of the selected application for which the setting request is received, when the setting request is received,
 wherein the detailed setting screen includes a preview image indicating a result of processing according to the setting details.

16. The image processing method according to claim 15, further comprising:
 updating the preview image according to a result of processing according to the changed setting details, and displaying the updated preview image, if the setting details are changed.

17. A non-transitory computer-readable medium having embedded therein a computer program, which when executed by a computer, causes the computer to execute a method comprising:
 receiving a designation of a job key displayed on a screen and corresponding to plural applications having mutually different combinations of an input format of image data and an output format of the image data;
 displaying an overview screen showing overview information indicating an overview of setting details of each application of the plural applications, the displaying step including displaying the job key in a manner that indicates a selected state, and displaying a balloon lead line that indicates that the job key is related to the overview screen;
 receiving a setting request for requesting a change in the setting details of a selected application of the plural applications;
 displaying a detailed setting screen for checking or changing the setting items of the selected application, when the setting request for requesting a change in the setting details of the selected application is received;
 updating, in the overview screen, the overview information of the selected application for which the setting request is received with the setting details changed on the detailed setting screen; and
 executing the plural designated applications in a collective manner as a single job on an information processing apparatus.

* * * * *